United States Patent
Maekawa et al.

(10) Patent No.: US 7,851,241 B2
(45) Date of Patent: Dec. 14, 2010

(54) METHOD FOR SEVERING BRITTLE MATERIAL SUBSTRATE AND SEVERING APPARATUS USING THE METHOD

(75) Inventors: Kazuya Maekawa, Osaka (JP); Hiroshi Soyama, Nagano (JP)

(73) Assignee: Mitsuboshi Diamond Industrial Co., Ltd., Osaka (JP)

( * ) Notice: Subject to any disclaimer, the term of this patent is extended or adjusted under 35 U.S.C. 154(b) by 765 days.

(21) Appl. No.: 10/509,895

(22) PCT Filed: Apr. 1, 2003

(86) PCT No.: PCT/JP03/04159
§ 371 (c)(1),
(2), (4) Date: Oct. 1, 2004

(87) PCT Pub. No.: WO03/082542
PCT Pub. Date: Oct. 9, 2003

(65) Prior Publication Data
US 2005/0245051 A1 Nov. 3, 2005

(30) Foreign Application Priority Data
Apr. 1, 2002 (JP) .............................. 2002-098397

(51) Int. Cl.
*H01L 21/00* (2006.01)
*H01L 21/30* (2006.01)
(52) U.S. Cl. ........................... 438/33; 438/68; 438/113; 438/115; 438/458; 438/460
(58) Field of Classification Search .................. 438/33, 438/68, 113, 114, 458, 460
See application file for complete search history.

(56) References Cited

U.S. PATENT DOCUMENTS

| | | | | | |
|---|---|---|---|---|---|
| 4,275,494 | A | * | 6/1981 | Kohyama et al. | 29/592.1 |
| 4,306,351 | A | * | 12/1981 | Ohsaka et al. | 438/33 |
| 5,238,876 | A | * | 8/1993 | Takeuchi et al. | 438/464 |
| 5,836,229 | A | * | 11/1998 | Wakayama et al. | 83/886 |
| 6,121,118 | A | * | 9/2000 | Jin et al. | 438/460 |
| 6,461,940 | B1 | * | 10/2002 | Hasegawa et al. | 438/460 |
| 6,465,329 | B1 | * | 10/2002 | Glenn | 438/462 |

(Continued)

FOREIGN PATENT DOCUMENTS

DE 21 45 552 B1 10/1972

(Continued)

OTHER PUBLICATIONS

Supplementary European Search Report for the Application No. EP 03 71 5694 dated Dec. 21, 2007.

(Continued)

*Primary Examiner*—Matthew C Landau
*Assistant Examiner*—James M Mitchell
(74) *Attorney, Agent, or Firm*—Cheng Law Group, PLLC

(57) ABSTRACT

There are provided a scribing step of performing scribing in a state in which a protective material is applied on at least one surface of a brittle material substrate, and a first scribing device that performs this scribing step. Accordingly, it is possible to form a vertical crack that reaches deep inside of the substrate, while effectively removing cullets produced at the time of severing the substrate, thus performing precise severing along a scribe line.

57 Claims, 30 Drawing Sheets

U.S. PATENT DOCUMENTS

| | | | |
|---|---|---|---|
| 6,521,513 B1 * | 2/2003 | Lebens et al. | 438/462 |
| 6,908,784 B1 * | 6/2005 | Farnworth et al. | 438/106 |
| 2001/0001215 A1 * | 5/2001 | Siniaguine et al. | 257/618 |
| 2002/0031864 A1 * | 3/2002 | Ball | 438/113 |
| 2002/0115235 A1 * | 8/2002 | Sawada | 438/113 |

FOREIGN PATENT DOCUMENTS

| | | | |
|---|---|---|---|
| JP | 356067933 | * | 6/1981 |
| JP | 5-297334 A | | 11/1993 |
| JP | 06-183765 A1 | | 7/1994 |
| JP | 07-201787 A1 | | 8/1995 |
| JP | 08-325027 A1 | | 12/1996 |
| JP | 09-017756 A1 | | 1/1997 |
| JP | 10-020291 A1 | | 1/1998 |
| JP | 11-116260 A | | 4/1999 |
| JP | 2000-124159 A1 | | 4/2000 |
| JP | 02000150426 | * | 5/2000 |
| JP | 2000-219527 A1 | | 8/2000 |
| JP | 2002-182185 A | | 6/2002 |

OTHER PUBLICATIONS

International Search Report for PCT/JP03/04159 mailed on Jul. 22, 2003.

International Preliminary Examination Report for PCT/JP03/04159 completed on Jul. 1, 2004.

* cited by examiner (a)

(b)

(c)

(d)

(e)

(a)

P1 : PROTECTIVE MATERIAL PROCESSING DEVICE (201)
R1~R4 : TRANSPORT ROBOTS
S1 : SCRIBING DEVICE (202)
B1 : BREAKING DEVICE (203)
E1 : SEPARATING DEVICE (205)
C1 : PROTECTIVE MATERIAL CUTTING DEVICE (204)

(b)

(a)

(b)

(c)

(d)

(a)

| | | |
|---|---|---|
| P1 | : | PROTECTIVE MATERIAL PROCESSING DEVICE (221) |
| R1~R3 | : | TRANSPORT ROBOTS |
| S1 | : | SCRIBING DEVICE (222) |
| B1 | : | BREAKING DEVICE (223) |
| E1 | : | SEPARATING DEVICE (224) |

(b)

(a)

| P1 | : PROTECTIVE MATERIAL PROCESSING DEVICE (261) |
| R1~R7 | : TRANSPORT ROBOTS |
| F1~F3 | : FILM PROCESSING DEVICES (262, 264, 266) |
| S1 | : SCRIBING DEVICE (263) |
| B1 | : BREAKING DEVICE (265) |
| E1 | : SEPARATING DEVICE (268) |
| C1 | : PROTECTIVE MATERIAL CUTTING DEVICE (267) |

(b)

(a)

| | | |
|---|---|---|
| P1 | : | PROTECTIVE MATERIAL PROCESSING DEVICE (281) |
| R1~R4 | : | TRANSPORT ROBOTS |
| F1 | : | FILM PROCESSING DEVICE (283) |
| S1 | : | SCRIBING DEVICE (282) |
| B1 | : | BREAKING DEVICE (284) |
| E1 | : | SEPARATING DEVICE (285) |

(b)

(a)

(b)

(a)

(b)

(a)

(b)

(a)

| | | |
|---|---|---|
| P1 | : | PROTECTIVE MATERIAL PROCESSING DEVICE (361) |
| R1~R8 | : | TRANSPORT ROBOTS |
| F1~F3 | : | FILM PROCESSING DEVICES (362, 365, 367) |
| S1·S2 | : | SCRIBING DEVICES (363, 366) |
| B1·B2 | : | BREAKING DEVICES (364, 368) |
| E1 | : | SEPARATING DEVICE (369) |

(b)

(a)

(b)

(c)

(d)

(e)

(a)

| | | |
|---|---|---|
| P1 | : | PROTECTIVE MATERIAL PROCESSING DEVICE (381) |
| R1~R4 | : | TRANSPORT ROBOTS |
| S1 | : | SCRIBING DEVICE (382) |
| B1 | : | BREAKING DEVICE (383) |
| E1 | : | SEPARATING DEVICE (385) |
| C1 | : | PROTECTIVE MATERIAL CUTTING DEVICE (384) |

(b)

(a)

| | | |
|---|---|---|
| P1 | : | PROTECTIVE MATERIAL PROCESSING DEVICE (401) |
| R1~R7 | : | TRANSPORT ROBOTS |
| F1~F3 | : | FILM PROCESSING DEVICES (402, 404, 406) |
| S1 | : | SCRIBING DEVICE (403) |
| B1 | : | BREAKING DEVICE (405) |
| E1 | : | SEPARATING DEVICE (408) |
| C1 | : | PROTECTIVE MATERIAL CUTTING DEVICE (407) |

(b)

(a)

| R1~R9 | : TRANSPORT ROBOTS |
|---|---|
| F1~F5 | : FILM PROCESSING DEVICES (421, 423, 425, 427, 429) |
| S1·S2 | : SCRIBING DEVICES (422, 426) |
| B1·B2 | : BREAKING DEVICES (424, 428) |
| E | : SEPARATING DEVICE (430) |

(b)

(a)

(b)

(c)

METHOD FOR SEVERING BRITTLE MATERIAL SUBSTRATE AND SEVERING APPARATUS USING THE METHOD

TECHNICAL FIELD

The present invention relates to methods for scribing and breaking bonded brittle material substrates that are formed by bonding brittle material substrates and used for various flat display panels, and pre-bonded, single-plate brittle material substrates, as well as to severing apparatuses for the brittle material substrates using such methods. Terminology 'severing' is used throughout the specification to denote either 'scribing and breaking' or 'breaking process after scribing process.'

BACKGROUND ART

Products related to the flat display panels, such as liquid crystal display panels, organic EL devices and liquid crystal projector substrates have been used as means for transmitting information between machines and human beings in various applications. The bonded brittle material substrates used for such flat display panel-related products have a configuration in which two substrates with various electronic control circuit means and the like required for display functions formed on their inner surfaces are bonded together in such a manner that they face each other. In this configuration, a material sealed in a gap formed between the two substrates is electronically controlled by the above-described electronic control circuit, whereby the substrates serve as display devices for displaying visual images.

The methods for producing the flat display panels can be divided into methods of bonding together single-plate brittle material substrates (mother substrates) and thereafter severing the bonded substrate into flat display panels of predetermined dimensions and methods of severing mother substrates into predetermined dimensions and thereafter bonding them together. Here, methods for severing the bonded brittle material substrates are described mainly.

FIGS. 31(a) to (d) are side views schematically showing a method for severing a bonded brittle material substrate used as a flat display panel.

The figures show how a mother substrate that is a bonded brittle substrate made up of brittle material substrates and that has large dimensions, in which in the length of one side may be 1 m or more, is severed into bonded brittle material substrates of smaller dimensions. More specifically, the figures sequentially show the steps of an exemplary conventional severing procedure in which a bonded brittle material substrate is scribed at a desired severing position and then severed.

This severing method is described for a bonded glass substrate formed by bonding together a pair of glass substrates facing each other as a pair of brittle material substrates. Such a bonded brittle material substrate is used, for example, as a liquid crystal display panel. A bonded brittle material substrate 71 made up of a pair of glass substrates is severed, and one of the glass substrates is a substrate 7A and the other glass substrate is a substrate 7B.

(1) First, as shown in FIG. 31(a), a scribe line Sa is formed on the substrate 7A on the upper side of the bonded brittle material substrate 71 by scribing using a glass cutter wheel 72.

(2) Next, the bonded brittle material substrate 71 is turned over and transported to a breaking device, and as show in FIG. 31(b), the substrate 7A on the lower side is broken along the scribe line Sa by pressing a breaker bar 73 against the bonded brittle material substrate 71 on a mat 74 along the scribe line Sa.

(3) Next, without reversing the upper and lower positions of the substrate 7A and the substrate 7B, the bonded brittle material substrate 71 is transported to a scribing device, with the glass substrate 7B placed on the upper side, and as shown in FIG. 31(c), a scribe line Sb is formed on the substrate 7B by scribing using the glass cutter wheel 72.

(4) Next, the bonded brittle material substrate 71 is turned over and transported to the breaking device, and as shown in FIG. 31(d), the substrate 7B on the lower side is broken along the scribe line Sb by pressing the breaker bar 73 against the bonded brittle material substrate 71 on the mat 74 along the scribe line Sb.

By executing steps (1) to (4) described above, the bonded brittle material substrate 71 can be severed at a desired position. By performing similar scribing and breaking processes on the bonded brittle material substrate 71 in the transverse and longitudinal directions, desired bonded brittle material substrates with small dimensions can be obtained from the mother bonded brittle material substrate with large dimensions.

In such consecutive severing processes, scribing devices are used, by which a scribe line (a line of a vertical crack) is produced as described above in the thickness direction of the substrate by scribing the surface of each substrate with a cutter wheel made of carbide metal or diamond with a thickness of about 0.6 mm to about 2 mm, and severing of the substrate is carried out by further extending the vertical crack in the thickness direction of the substrate by, for example, exerting a bending moment on the scribing line. Whether few or many in number, chips (cullets) are unavoidably produced in the scribing process. The bonded brittle material substrate that has undergone the severing processes or the brittle material substrate that has been bonded after the severing are used as, for example, organic EL devices or liquid crystal display panels; however, when such cullets remain on the substrates during the severing process, abrasion can be caused to the substrates, thus becoming a cause of damage to the quality of flat display panels. For this reason, it is necessary to carry out cullet removal operations as appropriate.

However, operations to remove the cullets produced in scribing are troublesome, and moreover, it is very difficult to completely remove the cullets. When the cullets remain in the periphery of the devices used for the severing process, there is the problem that the surface of the glass substrate may be scratched by the cullets. Such scratching is not desirable for a liquid crystal display substrate, and especially for projector substrates, strict quality control is required. The reason is that even slight scratches caused on the substrate are enlarged by projection when the substrate is placed in a projector and light is applied to the substrate. Once scratches are caused on the glass substrate, its quality as a projector substrate is reduced significantly and thus reliability cannot be ensured, resulting in a reduced yield.

As bonded brittle material substrates for projectors, a combination of two glasses is used for transmissive-type projectors and a combination of a glass and a semiconductor wafer is used for reflective-type projectors. In this case, quartz glass is used as the glass because of the desired heat resistance to the radiated luminous energy. However, it is more difficult to form a crack on quartz glass by scribing than on a commonly used glass such as soda glass, and thus scribing has to be carried out with a large scribing load; accordingly, there is an important interest in providing measures preventing the occurrence of cullets, or to remove the produced cullets effectively.

The present invention was made in order to solve the above-described problems effectively, and provides a method for severing a substrate without degrading the quality that is capable of avoiding surface scratching caused by cullets produced during severing a bonded brittle material substrate and a pre-bonded single-plate brittle material substrate, in particular a projector substrate, thus improving the surface strength. Furthermore, the invention provides a method for severing a bonded brittle material substrate and a pre-bonded single-plate brittle material substrate that is capable of precisely severing the substrates along a scribe line by forming a vertical crack that reaches deep inside of the substrates, while removing cullets produced during severing of the substrates, and a severing apparatus using such method.

DISCLOSURE OF THE INVENTION

In order to achieve the foregoing objects, a method for severing a brittle material substrate according to the present invention is a method for severing a brittle material substrate by inscribing a scribe line on a brittle material substrate, while simultaneously forming a vertical crack extending from the scribe line in a thickness direction of the brittle material substrate, wherein the scribe line is formed with a scribe head including a cutter wheel with grooves formed in a blade-edge ridge thereof and a tip holder that rotatably supports the cutter wheel, and wherein the method includes a first scribing step of pressing and rolling the cutter wheel on a protective material by moving the tip holder in a horizontal direction, in a state in which the protective material is provided on at least one substrate surface of the brittle material substrate, thereby inscribing a scribe line on the brittle material substrate, while simultaneously forming a vertical crack extending from the scribe line in a thickness direction of the brittle material substrate.

It is preferable that the severing method with this constitution further includes a protective material processing step of providing a protective material on at least one substrate surface of the brittle material substrate, before the scribing.

In the above-described constitution, the brittle material substrate has either one of the following structures (1), (2) and (3). The respective structures are described below.

(1) The brittle substrate is a single-plate brittle material substrate.

In the case of this brittle material substrate, the above-described severing method may include a breaking step of breaking the brittle material substrate, after the scribing. In this case, the severing method may include a protective material cutting step of cutting the protective material, after the breaking.

Further, the severing method may include a protective material cutting step of cutting the protective material, after the scribing, or it may include a first film processing step of applying a first protective film to a first substrate surface that has been scribed, after the scribing and before breaking the brittle material substrate.

The severing method with the above-described constitution may include a second film processing step of applying a second protective film on a second substrate surface that is different from the first substrate surface that is to be scribed, before the scribing.

Further, the method may include a breaking step of breaking the brittle material substrate, after applying the first film.

It may include a third film processing step of peeling off the second protective film, after the breaking.

Furthermore, the method may include a protective material cutting step of cutting the protective material and/or the protective film provided on the second substrate surface.

(2) The brittle material substrate is a bonded brittle material substrate formed by bonding together a first substrate and a second substrate.

In the case of this brittle material substrate, it is preferable in the above-described method that the scribe line is formed with a scribe head including a cutter wheel with grooves formed in a blade-edge ridge thereof and a tip holder that rotatably supports the cutter wheel, and that the method further includes, before scribing the first substrate in the first scribing step, a second scribing step of pressing and rolling the cutter wheel on a protective material by moving the tip holder in a horizontal direction, in a state in which the protective material is provided on a surface of at least one of the first substrate and the second substrate, thereby inscribing a scribe line on the second substrate, while simultaneously forming a vertical crack extending from the scribe line in a thickness direction of the brittle material substrate.

The severing method with this constitution may include a first breaking step of breaking the first substrate, after scribing the first substrate in the first scribing step.

Moreover, the method may include a second breaking step of breaking the second substrate, after scribing the second substrate in the second scribing step.

Furthermore, the method may include: a first film processing step of applying a first protective film on the second substrate, before scribing the first substrate in the first scribing step; and a second film processing step of peeling off the first protective film from the second substrate, before scribing the second substrate in the second scribing step.

The method may include a second film processing step of applying a second protective film on the second substrate, after scribing the second substrate in the second scribing step and before breaking the scribed second substrate in the second breaking step.

Further, it is preferable that the method includes a third film processing step of applying a third protective film on the first substrate, after scribing the first substrate in the first scribing step and before breaking the first substrate in the first breaking step.

(3) The brittle material substrate is a brittle material substrate provided with a functional layer.

In the case of this brittle material substrate, the above-described severing method may include a breaking step of breaking the brittle material substrate provided with the functional layer, after the scribing in the first scribing step.

It is preferable that the method with this constitution includes a protective material cutting step of cutting the protective material, after breaking the brittle material substrate provided with the functional layer in the breaking step.

Alternatively, in the case of this brittle material substrate, the method may include: a first film processing step of applying a first protective film on a surface of the brittle material substrate provided with the functional layer that is different from a surface on which the functional layer is provided, before the scribing in the first scribing step; and a protective material cutting step of cutting the protective material and/or the first protective film.

The method with this constitution may include a breaking step of breaking the brittle material substrate provided with the functional layer, after the scribing in the first scribing step. Further, it is preferable that the method includes: a second film processing step of applying a second protective film on that surface of the brittle material substrate provided with the functional layer on which the functional layer is provided, after the scribing in the first scribing step and before breaking the brittle material substrate provided with the functional layer in the breaking step; and a third film processing step of peeling off the second protective film, after breaking the brittle material substrate provided with the functional layer in the breaking step.

In the above-described severing method, it is preferable that the functional layer is a protective material also having a function to protect the brittle material substrate. Alternatively, it is preferable that the protective material provided on a surface of the brittle material substrate is a coating.

Next, a severing apparatus for a brittle material substrate that inscribes a scribe line on a brittle material substrate, while simultaneously forming a vertical crack extending from the scribe line in a thickness direction of the brittle material substrate, wherein the scribe line is formed with a scribe head including a cutter wheel with grooves formed in a blade-edge ridge thereof and a tip holder that rotatably supports the cutter wheel, and wherein the apparatus includes a first scribing device that presses and rolls the cutter wheel on a protective material by moving the tip holder in a horizontal direction, in a state in which the protective material is provided on at least one substrate surface of the brittle material substrate, thereby inscribing a scribe line on the brittle material substrate, while simultaneously forming a vertical crack extending from the scribe line in a thickness direction of the brittle material substrate.

It is preferable that the apparatus with this constitution includes a protective material processing device that applies a protective material on at least one substrate surface of the brittle material substrate.

Also in the apparatus with the above-described constitution, the brittle substrate has either one of the following structures (a), (b) and (c). The respective cases are described below.

(a) The brittle substrate is a single-plate brittle material substrate.

In the case of this brittle material substrate, the severing apparatus may include a breaking step of breaking the brittle material substrate.

The apparatus with this constitution may include a protective material cutting device that cuts the protective material.

Moreover, the apparatus may include a first film processing device that applies a first protective film on a first substrate surface that is to be scribed. The apparatus with this constitution may include a second film processing device that applies a second protective film on a second substrate surface that is different from the first substrate surface. Furthermore, it is preferable that the apparatus includes a breaking device that breaks the brittle material substrate. It is also preferable that the apparatus includes a third film processing device that peels off the second protective film.

It is preferable that the apparatus with the above-described constitution includes a protective material cutting device that cuts the protective material and/or the protective film provided on the second substrate surface.

(b) The brittle material substrate is a bonded brittle material substrate formed by bonding together a first substrate and a second substrate.

In the case of this brittle material substrate, in the above-described severing apparatus, the scribe line may be formed with a scribe head including a cutter wheel with grooves formed in a blade-edge ridge thereof and a tip holder that rotatably supports the cutter wheel, and the apparatus further may include a second scribing device that presses and rolls the cutter wheel on a protective material by moving the tip holder in a horizontal direction, in a state in which the protective material is provided on a surface of at least one of the first substrate and the second substrate, at the same time of inscribing the scribing line on the first substrate with the first scribing device and before forming the vertical crack extending from the scribe line in a thickness direction of the brittle material substrate, thereby inscribing a scribe line on the second substrate, while simultaneously forming a vertical crack extending from the scribe line in a thickness direction of the brittle material substrate.

It is preferable that the apparatus with this constitution includes a first breaking device that breaks the first substrate. Furthermore, it is preferable that the apparatus includes a second breaking device that breaks the second substrate.

The apparatus also may include: a first film processing device that applies a first protective film on the second substrate; and a second film processing device that peels off the first protective film from the second substrate.

Moreover, the apparatus may include a second film processing device that applies a second protective film on the second substrate. Furthermore, the apparatus may include a third film processing device that applies a third protective film on the first substrate.

(c) The brittle material substrate is a brittle material substrate provided with a functional layer.

In the case of this brittle material substrate, the above-described severing apparatus may include a breaking device that breaks the brittle material substrate provided with the functional layer. In this case, the apparatus may include a protective material cutting device that cuts the protective material.

Furthermore, the apparatus may include: a first film processing device that applies a first protective film on a surface of the brittle material substrate provided with the functional layer that is different from a surface on which the functional layer is provided; and a protective material cutting device that cuts the protective material and/or the first protective film. The apparatus with this constitution may include a breaking device that breaks the brittle material substrate provided with the functional layer.

Moreover, the apparatus may include: a second film processing device that applies a second protective film on that surface of the brittle material substrate provided with the functional layer on which the functional layer is provided; and a third film processing device that peels off the second protective film.

In the apparatus with the above-described constitution, it is preferable that the functional layer is a protective material also having a function to protect the brittle material substrate.

In the above-described severing apparatus, it is preferable that the protective material provided on the surface of brittle material substrate is a film. Alternatively, it is preferable that the protective material applied on the surface of brittle material substrate is a coating.

In the constitution described above, two different cutter wheels are used as the means for carrying out the above-described scribing. The first cutter wheel has grooves formed in the vicinity of the entire periphery of its blade ridge portion. As the second cutter wheel, it is preferable to optionally use a cutter wheel in which an area where similar grooves are formed and an area where no groove is formed are provided at a predetermined ratio. The reason is as follows. It is difficult to perform scribing stably on a substrate with films bonded on its surface or a substrate provided with a protective coating by using an ordinary cutter wheel in which no groove is formed in its ridge. When the film or the protective coating is scribed using a cutter wheel provided with no groove in its ridge, the blade-edge ridge tends to slide since it is in line contact with the film or the protective coating, and moreover, the pressing force of the blade edge of the cutter wheel exerted on the substrate is scattered, thus making it difficult to form a scribe line. On the other hand, when a cutter wheel provided with grooves is used, the cutter wheel tends not to slide and the pressing force is concentrated on the contact point between the cutter wheel and the substrate since intermittent shocks are applied, thus making it easy to form a scribe line.

FIG. 23 shows a side view and a partially enlarged view of a first cutter wheel 21. As shown in the enlarged view A, the cutter wheel 21 is provided with projections 81 of a height h with an interval at a pitch P by cutting out U-shaped grooves 51 at a blade-edge ridge 92 shown in FIG. 26. Furthermore, the cutter wheel 21 is formed by the blade-edge ridge 92 that is displaced on one side of a center 95 between side-faces 93 and 94 (the left side-face 93 in the example shown in the drawing) of the cutter wheel 21, and an insertion through-hole 96 at the center of the cutter wheel 21.

The cutter wheel 21 shown in the example here has a wheel diameter ($\phi$) of 2 mm to 3 mm, a wheel thickness (w) of 0.65 mm, a distance K from the wheel's left-side face 93 and the blade-edge ridge 92 of 30 to 150 μm, an inner diameter d of the insertion through-hole 96 of 0.8 mm, a number of projections of 125, a projection height (h) of 5 μm, and a pitch (P) of 63 μm; however, these number and dimensions are not limiting.

In this way, a cutter wheel 21 provided with projections 81 is able to obtain a long vertical crack with a depth proportional to the applied load, while producing little horizontal cracks even when the blade-edge pressure is large. With a long vertical crack, precise breaking can be performed along the scribe line in the breaking operation of the subsequent step, thus improving yield. Furthermore, as the breaking operation is made easier, the requirements of the device configurations used in the breaking process can be relaxed or simplified, and depending on the situation it is also possible to eliminate the breaking process.

FIG. 24(a) shows an example of projections 82 that have a form different from that shown in FIG. 23. The projections 82 are formed by cutting away V-shaped grooves 42 at the blade-edge ridge 22.

FIG. 24(b) shows an example of projections 83 that have a form which is again different from that described above. The projections 83 are formed by cutting away serrated-shape grooves 43 at the blade-edge ridge 23.

FIG. 24(c) shows an example of projections 84 that have a form which is once again different from that described above. The projections 84 are formed by cutting away rectangular-shaped grooves 44 at the blade-edge ridge 24.

The above-described described forms of the blade edge can be applied to the blade-edge ridge configuration shown in FIG. 26(a), and can also be applied in a configuration as shown in FIG. 26(b) depending on the applications. The cutter wheel 121 shown in FIG. 26(b) is disk-shaped with a wheel diameter $\phi$ and a wheel thickness w, and forms a blade-edge with an obtuse blade-edge angle $\alpha$ at the periphery of the cutter wheel 121. The cutter wheel 121 is formed by a blade-edge ridge 102 at a center between side-faces 103 and 104 of the cutter wheel 121. In addition, an insertion through-hole 106 is provided at the center of the cutter wheel 121.

The cutter wheel shown in FIG. 23 is provided with grooves along the entire periphery of the cutter wheel, and the use of this cutter wheel is advantageous in that a vertical crack produced at the same time of inscribing a scribe line that extends from that scribe line is produced as a long crack that almost passes through the glass substrate in the thickness direction via the thin film and the protective coating.

In this embodiment, not only a cutter wheel provided with grooves along the entire periphery of the blade-edge ridge portion insulating filler the cutter wheel, but also a second cutter wheel provided with grooves in a portion of the cutter wheel as shown in FIG. 25. FIG. 25 is a side view showing such a second cutter wheel 40.

The second cutter wheel 40 is formed by an area Y in which grooves 6b are formed at the blade-edge ridge portion, and an area N in which no groove is formed. The cutter wheel 40 can save processing time for forming grooves 6b, and has superior workability.

The ridge portion of the second cutter wheel 40 can be applied to each of the cutter wheels shown in FIGS. 26(a) and 26(b).

The first cutter wheel 21 and the second cutter wheel 40 described above can be appropriately selected in accordance with the type of the substrate materials, the form of produced cracks and the like, and these cutter wheels are not limiting.

The use of these cutter wheels makes it possible to perform severing in accordance with the material of the brittle material substrate. Furthermore, the use of the first cutter wheel can achieve a vertical crack that reaches the lower surface of the glass substrate. On the other hand, the use of the second cutter wheel can produce a vertical crack in which the depth is periodically varied.

It is preferable that these cutter wheels are rotatably supported by a scribe head using the servomotor disclosed in WO 03/011777.

As an example of the scribe head using the servomotor, FIG. 27 shows a side view of a scribe head 131, and FIG. 28 shows a front view of the relevant part. A servomotor 133 is held inverted between a pair of side walls 132. Below the side walls 132, a holder carrying means 134 having an L-shape when viewed from the side is attached rotatably via a support shaft 135. In front (the right direction in FIG. 28) of the holder carrying means 134, a tip holder 137 is provided which rotatably supports a cutter wheel 136 via a support shaft 139. Bevel gears 138 are mounted to the rotation shaft and the support shaft 135 of the servomotor 133, mating with each other. Accordingly, by reversely rotating the servomotor 133, the holder carrying means 134 pivots vertically about the support shaft 135, moving the cutter wheel 136 vertically. Similarly to FIG. 27, the scribe head 131 itself is disposed movably along a horizontal guide rail 147 of a scribing device 146.

FIG. 29 is a front view showing another example of the scribe head using the servomotor, and the rotation axis of the servomotor 133 is directly connected to the holder carrying means 134. By rotating the servomotor by position control, the scribe heads shown in FIGS. 27 and 29 raise and lower the cutter wheel 136 and set its position. During a scribing operation in which a scribe line is formed on a brittle material substrate by moving the scribe heads horizontally, these scribe heads limits a rotation torque, which serves to return the cutter wheel 136 to a position previously set in the servomotor 133 when the cutter wheel is displaced from the pre-set position, and transmit a scribe pressure applied to the brittle material substrate to the cutter wheel 136.

The first cutter wheel 21 or the second cutter wheel 40 is rotatably supported by the tip holder 137 held by these scribe heads, and pressed and rolled on a protective material provided on the brittle material substrate, thereby forming a scribe line on the brittle material substrate.

With the use of the scribe heads using the servomotor, the rotational torque of the servomotor is immediately corrected in response to a change in the scribe pressure resulting from the fluctuation in the resistance force exerted on the cutter wheel when scribing is performed through the protective material such as a coating or a film; accordingly, it is possible to perform stable scribing, thus forming a good quality scribe line.

BEST MODE FOR CARRYING OUT THE INVENTION

First, a case is described where a protective material that protects a brittle material substrate is provided on both sides of a single-plate brittle material substrate at the time of severing the brittle material substrate.

In the following, an embodiment of the present invention is described, with reference to the accompanying drawings.

First Embodiment

Figure 1:
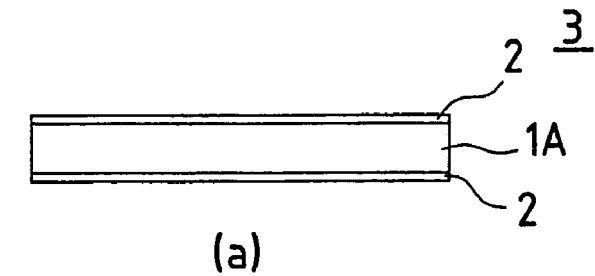
FIG. 1, consisting of FIGS. 1(a) to 1(e), is a process diagram for illustrating a first embodiment of the present invention.
Figure 1:
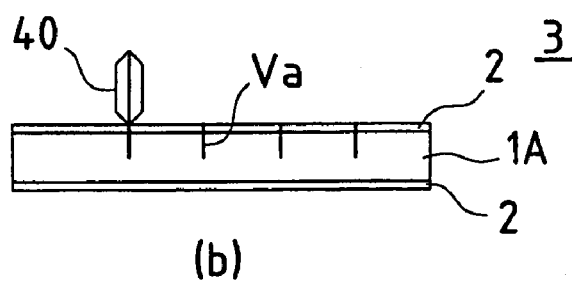
Figure 1:
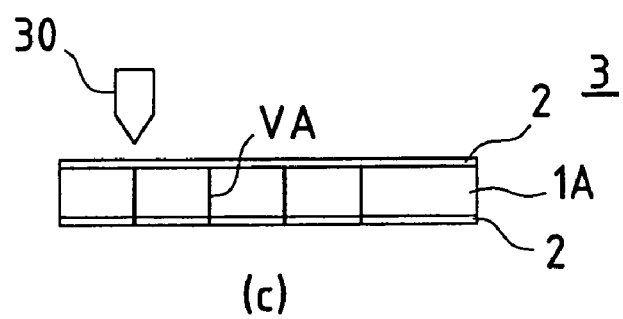
Figure 1:
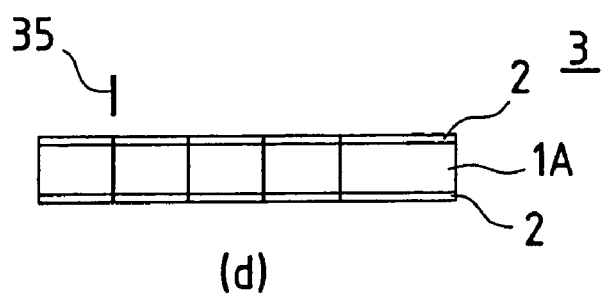
Figure 1:
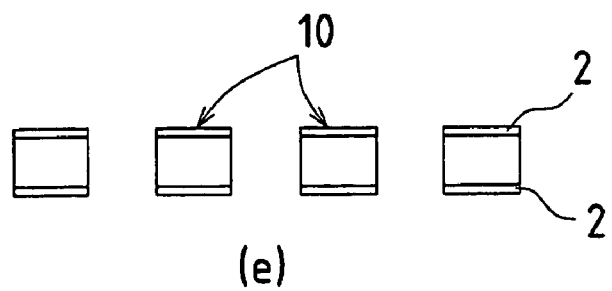
Figure 2:
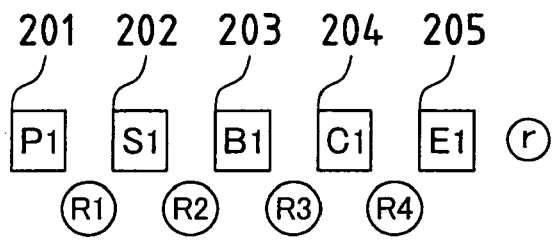
FIG. 2, consisting of FIGS. 2(a) and 2(b), is a diagram schematically showing a configuration of the component devices used in the embodiment shown in FIG. 1.
Figure 2:
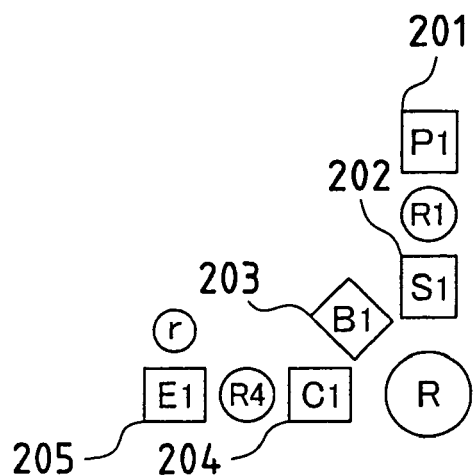

FIGS. 1(a) to (e) are process diagrams for illustrating a first embodiment of the present invention. FIG. 2 includes diagrams schematically showing a configuration of the devices used in such a process. FIG. 2(a) shows an example in which the devices of the process are configured in a simplified line. FIG. 2(b) is an example in which the devices are configured around a transport robot R. The present invention is applied to a process of severing a single-plate brittle material substrate 3, which is one kind of a brittle material substrate. The single-plate brittle material substrate 3 is a glass substrate 1A, and the material of the glass is a non-alkali glass, for example. Furthermore, the cutter wheel used is the second cutter wheel 40 shown in FIG. 25 that can achieve a vertical crack with periodically varied depths in a glass substrate.

(1) First, a protective material processing device 201 is provided with the same mechanisms as the film application mechanisms used in devices for applying polarizing plates in the manufacturing processes of liquid crystal mother glass substrates, or is a film forming device such as a spin coater that forms a film on a substrate by applying a solution of resin on the surface of the substrate while rotating the substrate, or a film forming device that forms a film using a process such as vacuum deposition, and as shown in FIG. 1(a), it applies a protective material 2 on both sides of the single-plate brittle material substrate 3. It is preferable that the protective material 2 is applied prior to this severing process of the substrate, and that it has a thickness of approximately 10 μm.

(2) Next, the single-plate brittle material substrate 3 is transported by a transport robot R1 to a scribing device 202, and as shown in FIG. 1(b), shallow vertical cracks Va with periodically varied depths are formed in the glass substrate 1A by scribing with the second cutter wheel 40 from the side of the protective material 2 on the upper side of the glass substrate 1A. By forming the vertical cracks Va, portions of the glass substrate can be prevented from coming off from the single-plate brittle material substrate when this single-plate brittle material substrate is transported to later devices, and at the same time it is also possible to simplify the severing operation in the breaking process.

(3) Furthermore, the single-plate brittle material substrate 3 is turned over, and transported by a transport robot R2 to a breaking device 203, and by applying pressure to the upper side of the glass substrate 1A along the scribe lines Va with a breaker bar 30 as shown in FIG. 1(c), the shallow vertical cracks Va with periodically varied depths formed in the glass substrate 1A are elongated to vertical cracks VA, and the glass substrate 1A is severed.

(4) Then, the single-plate brittle material substrate 3 is transported in this state by a transport robot R3 to a protective material cutting device 204, and the protective material 2 is cut with a film cutter 35 along the scribe lines Va formed in step (2). In this stage, however, the single-plate brittle material substrate 3 is not necessarily completely severed into products 10.

(5) Next, the single-plate brittle material substrate 3 is transported by a transport robot R4 to a separating device 205. The separating device 205 is provided with a spherically shaped table, a suction clamping means that suction-clamps and secures to the table a substrate placed on the table, a thrust-up pin that thrusts up the substrate above the table, and a robot r that picks up a product, and as shown in FIG. 1(e), the single-plate brittle material substrate 3 is placed on the spherically shaped table (shown as a flat-surface table in FIG. 1 in order to make the separated condition of the substrates easier to understand), and suction-clamped and secured to separate each product 10 individually. Then, a pin is thrust out from the lower side of the spherically shaped table toward the product 10, and the product 10 provided with the protective material 2 is supported and discharged by the robot r.

The above-described processes of the first embodiment includes step (1) of providing the thin protective material on both sides of the single-plate brittle material substrate 3, and step (2) of performing scribing on the thin protective material 2. At this time, even if cullets are produced, they are merely scattered in the cut portion and the vicinity of the thin protective material 2, and do not attach to the glass substrate 1A, and therefore it is possible to avoid causing scratches to the glass substrate 1A. Furthermore, the protective material 2 is also applied on the lower surface of the brittle material substrate 3, and since there is no direct contact during scribing between the glass substrate 1A and the table that supports the single-plate brittle material substrate 3 due to the protective material 2 positioned on the lower surface of the single-plate brittle material substrate 3, the substrate surface is protected from scratching. In step (3), the single-plate brittle material substrate 3 is turned over, and placed on the table of the breaking device, and the glass substrate 1A is severed with the breaker bar 30. In step (4), the single-plate brittle material substrate 3 is transported in this state to a substrate holding unit of the protective material cutting device, and the protective material 2 is cut with the film cutter 35 along the scribe lines formed in step (2).

It should be noted that the protective material 2 may be formed by applying a thin film made of polyethylene on the substrate, or by forming on the substrate a protective coating appropriately selected from a resinous polyimide coating, a metal coating, an ITO coating, a resist coating, an aluminum coating and the like, depending on the application used.

Additionally, when the protective material is provided on the single-plate brittle material substrate in a process prior to the severing process of the brittle material substrate, it is possible to omit step (1) (step (a) in FIG. 1), as well as the protective material processing device 201 in FIGS. 2(a) and (b) in the first embodiment.

Furthermore, when the first cutter wheel 21 is used in step (2), that is, the scribing process, a deep vertical crack that almost passes through the glass substrate 1A can be formed. In this case, it is therefore possible to omit the breaking device 203 in step (3) (step (c) in FIG. 1). In this case, the substrate is not turned over, so that the protective material 2 may be cut from below with the film cutter 35 in step (4) (step (d) in FIG. 1).

In the first embodiment, the product 10 is provided with the protective material 2 in FIG. 1(e); however, when the protective material 2 is not necessary, a process of peeling off the protective material 2 may be appropriately added after the severing process of the present embodiment.

Although a non-alkali glass, which is one kind of a glass substrate, is used as the single-plate brittle material substrate in the example shown in the first embodiment, the material of the glass substrate may be quartz glass, for example, and another brittle material substrate such as a silicon substrate that is a semiconductor wafer may also be used. In this case, since the material is a rigid, brittle material, even when scribing is performed using the first cutter wheel 21 or the second cutter wheel 40 as the cutter wheel, the vertical cracks formed during scribing are different from the shallow vertical cracks with periodically varied depths formed in the first embodiment, and are continuously shallow.

It should be noted that the brittle material substrate provided with a protective material according to the first embodiment can be severed with the severing apparatus and the severing system disclosed in WO 02/057192. In this case, it is possible to omit, for example, steps (b) and (c) in FIG. 1, as well as the breaking device 203 and the protective material cutting device 204 in FIG. 2.

Next, a case is described where the material of the single-plate brittle material substrate is a semiconductor wafer, and a protective material that protects a brittle material substrate is provided on one side of the single-plate brittle material substrate at the time of severing the brittle material substrate.

In the following, an embodiment of the present invention is described, with reference to the drawings.

Second Embodiment

Figure 3:
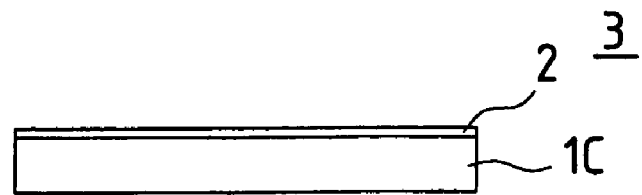
FIG. 3, consisting of FIGS. 3(a) to 3(d), is a process diagram for illustrating a second embodiment of the present invention.
Figure 3:
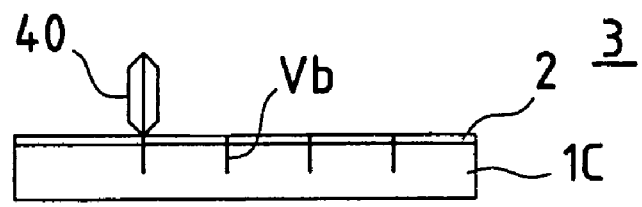
Figure 3:
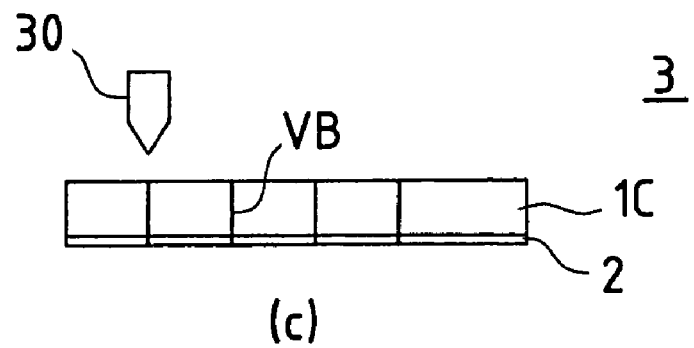
Figure 3:
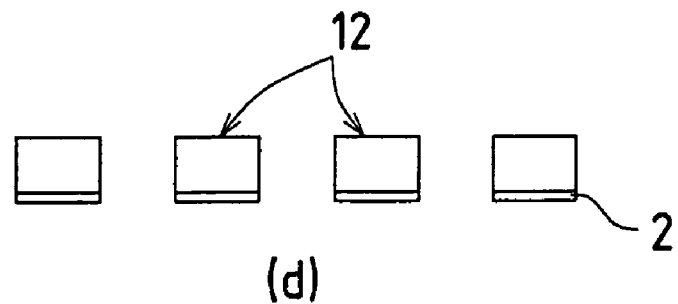
Figure 4:
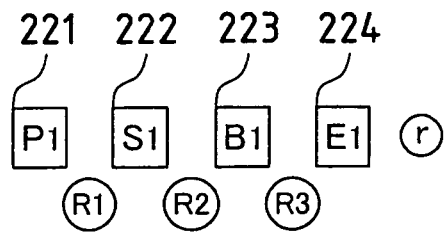
FIG. 4, consisting of FIGS. 4(a) and 4(b), is a diagram schematically showing a configuration of the component devices used in the embodiment shown in FIG. 3.
Figure 4:
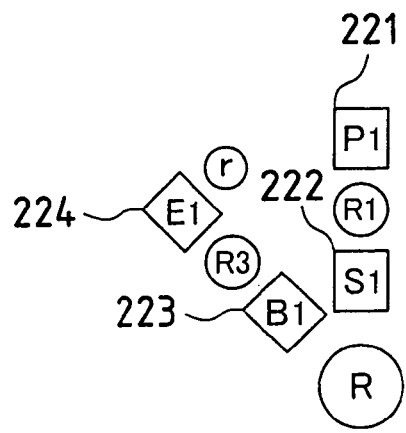

FIGS. 3(a) to (d) are process diagrams for illustrating a second embodiment of the present invention. FIG. 4 includes diagrams schematically showing a configuration of the devices used in such a process. FIG. 4(a) shows an example in which the devices of the process are configured in a simplified line. FIG. 4(b) is an example in which the devices are configured around a transport robot R. The present invention is applied to a process of severing a single-plate brittle material substrate 3, which is one kind of a brittle material substrate.

The single-plate brittle material substrate 3 is a semiconductor wafer, and the material of the semiconductor wafer is a silicon substrate 1C, for example. The silicon substrate 1C is a combination of a glass and a semiconductor wafer, and used as a substrate for reflective-type projectors and the like. In the case of the substrate for reflective-type projectors, a projected light passes through the glass substrate and is reflected on the reflecting surface of the silicon substrate, so that only at least one side (reflecting surface) of the silicon substrate needs to be protected. Furthermore, the cutter wheel used is the second cutter wheel 40 shown in FIG. 25 that can achieve a vertical crack with periodically varied depths in a glass substrate. The vertical cracks formed at the time of scribing the silicon substrate are different from the shallow vertical cracks with periodically varied depths formed in the first embodiment, and are continuously shallow.

(1) First, a protective material processing device 221 is provided with the same mechanisms as the film application mechanisms used in devices for applying polarizing plates in the manufacturing processes of liquid crystal mother glass substrates, or is a film forming device such as a spin coater that forms a film on a substrate by applying a solution of resin on the surface of the substrate while rotating the substrate, or a film forming device that forms a film using a process such as vacuum deposition, and as shown in FIG. 3(a), it applies a protective material 2 on one side of the single-plate brittle material substrate 3. It is preferable that the protective material 2 is applied immediately after performing various processings required for FPD applications on the surface of the above-described substrate and prior to the severing process of the substrate, and that it has a thickness of approximately 10 μm.

(2) Next, the single-plate brittle material substrate 3 is transported by a transport robot R1 to a scribing device 222, and as shown in FIG. 3(b), continuously shallow vertical cracks Vb are formed in the silicon substrate 1C by scribing with the second cutter wheel 40 from the protective material 2 side on the silicon substrate 1C. By forming the shallow vertical cracks Vb, portions of the substrate can be prevented from coming off from the single-plate brittle material substrate when this single-plate brittle material substrate is transported to later devices.

(3) Furthermore, the single-plate brittle material substrate 3 is turned over, and transported by a transport robot R2 to a breaking device 223, and by applying pressure to the upper side of the silicon substrate 1C along the scribe lines Vb with a breaker bar 30 as shown in FIG. 3(c), the continuously shallow vertical cracks Vb formed in the silicon substrate 1C are elongated to vertical cracks VB, and the silicon substrate 1C is severed.

(4) Next, the single-plate brittle material substrate 3 is transported by a transport robot R3 to a separating device 224. The separating device 224 is provided with a spherically shaped table, a suction clamping means that suction-clamps and secures to the table a substrate placed on the table, a thrust-up pin that thrusts up the substrate onto the table, and a robot r that picks up a product, and as shown in FIG. 3(d), the single-plate brittle material substrate 3 is placed on the spherically shaped table (shown as a flat-surface table in FIG. 3 in order to make the separated condition of the substrates easier to understand), and suction-clamped and secured to separate each product 12 individually. Then, a pin is thrust out from the lower side of the spherically shaped table toward the product 12, and the product 12 provided with the protective material 2 is supported and discharged by the robot r.

The above-described process of the second embodiment includes step (1) of providing the thin protective material on one side of the single-plate brittle material substrate 3, and step (2) of performing scribing on the protective material 2. At this time, even if cullets are produced, they are merely scattered in the cut portion and the vicinity of the thin protective material 2, and do not attach to the silicon substrate 1C, and therefore it is possible to avoid causing scratches to the silicon substrate 1C. In step (3), the single-plate brittle material substrate 3 is turned over, and placed on the table of the breaking device, and the silicon substrate 1C is severed with the breaker bar 30.

It should be noted that the protective material 2 may be formed by applying a thin film made of polyethylene on the substrate, or by forming on the substrate a protective coating appropriately selected from a resinous polyimide coating, a metal coating, an ITO coating, a resist coating, an aluminum coating and the like, depending on the application used.

Additionally, when the protective material is provided on the single-plate brittle material substrate in a process prior to the severing process of the brittle material substrate, it is possible to omit step (1) (step (a) in FIG. 3), as well as the protective material processing device 221 in FIGS. 4(a) and (b) in the second embodiment.

In the second embodiment, the product 12 is provided with the protective material 2 in FIG. 3(d); however, when the protective material 2 is not necessary, a process of peeling off the protective material 2 may be appropriately added after the severing process of the present embodiment.

Figure 23:
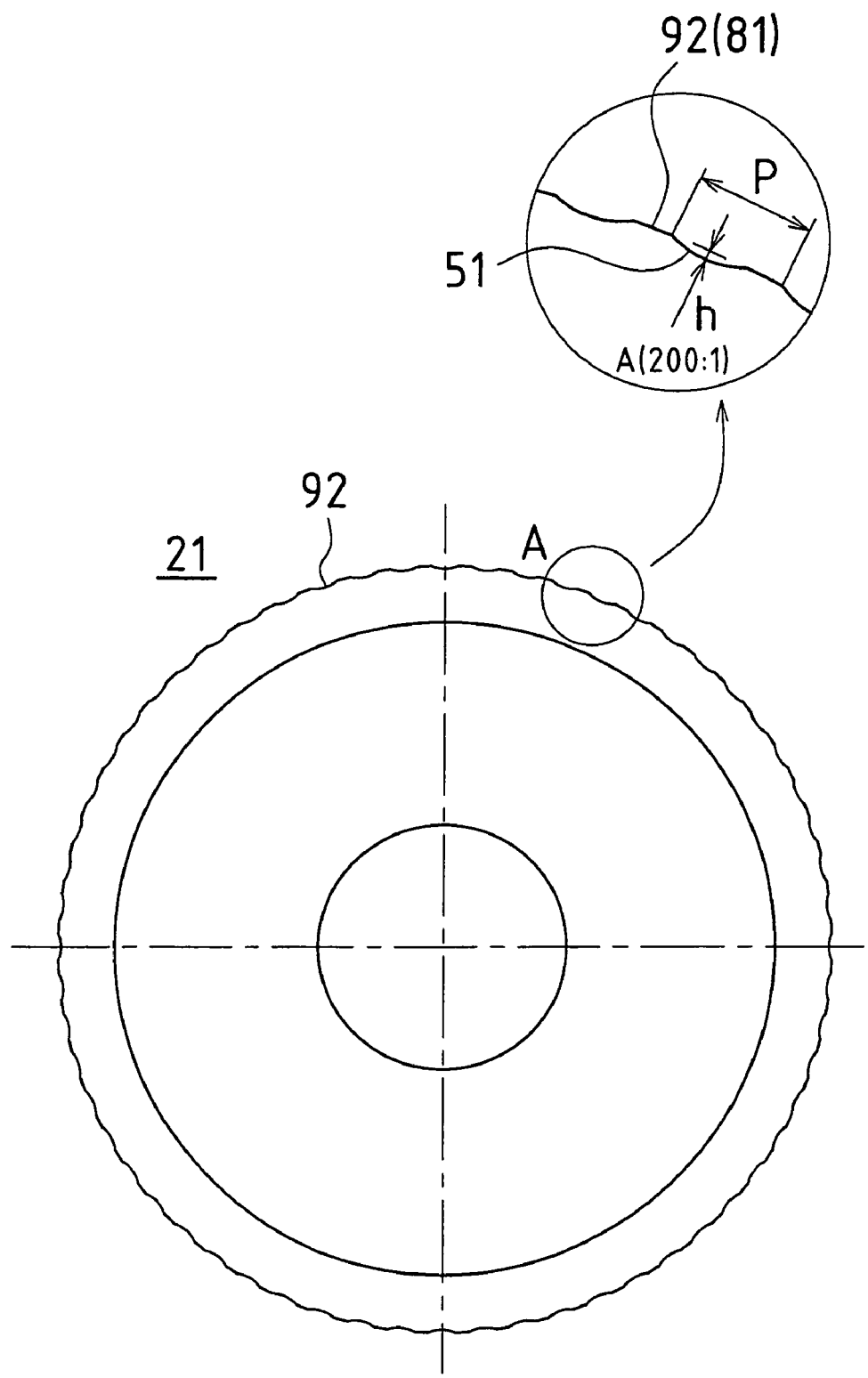
FIG. 23 shows a side view and a partially enlarged view of an example of a first cutter wheel applied to the present invention.
Figure 24:
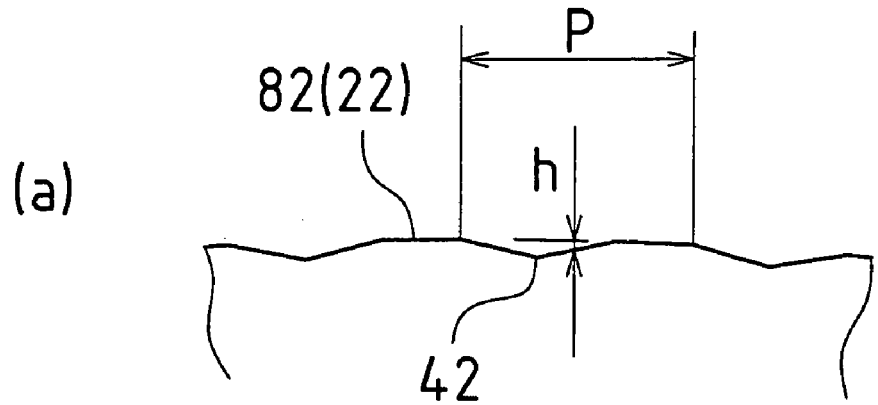
FIG. 24, consisting of FIGS. 24(a) to 24(c), is a partially enlarged view showing other blade-edge forms of a cutter wheel applied to the present invention.
Figure 24:
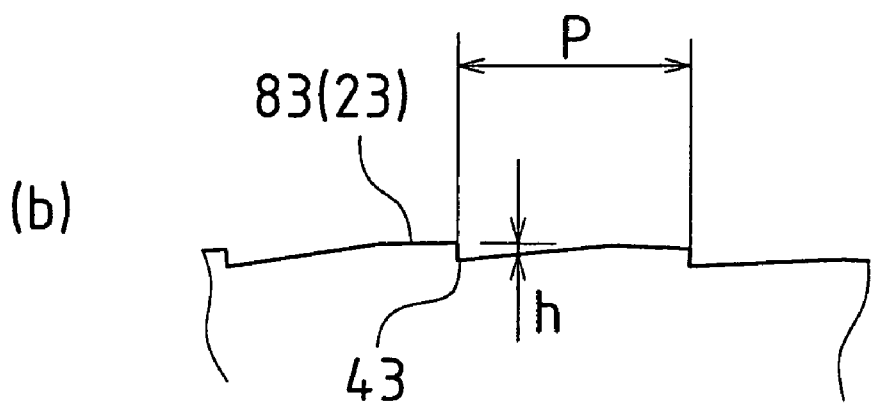
Figure 24:
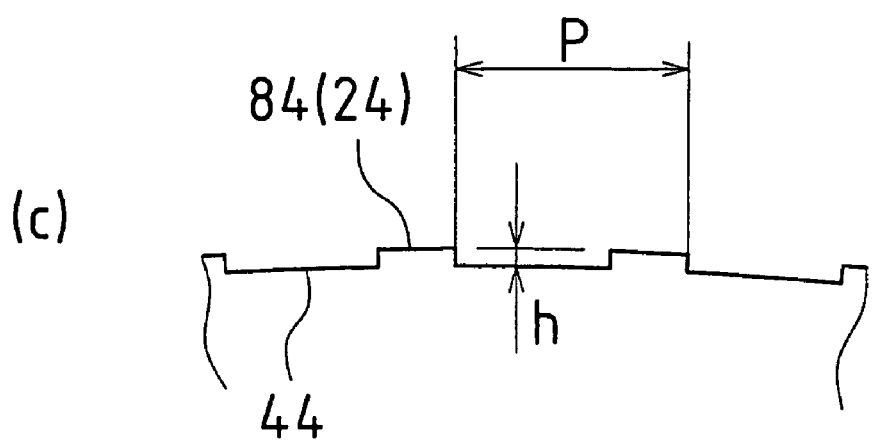
Figure 25:
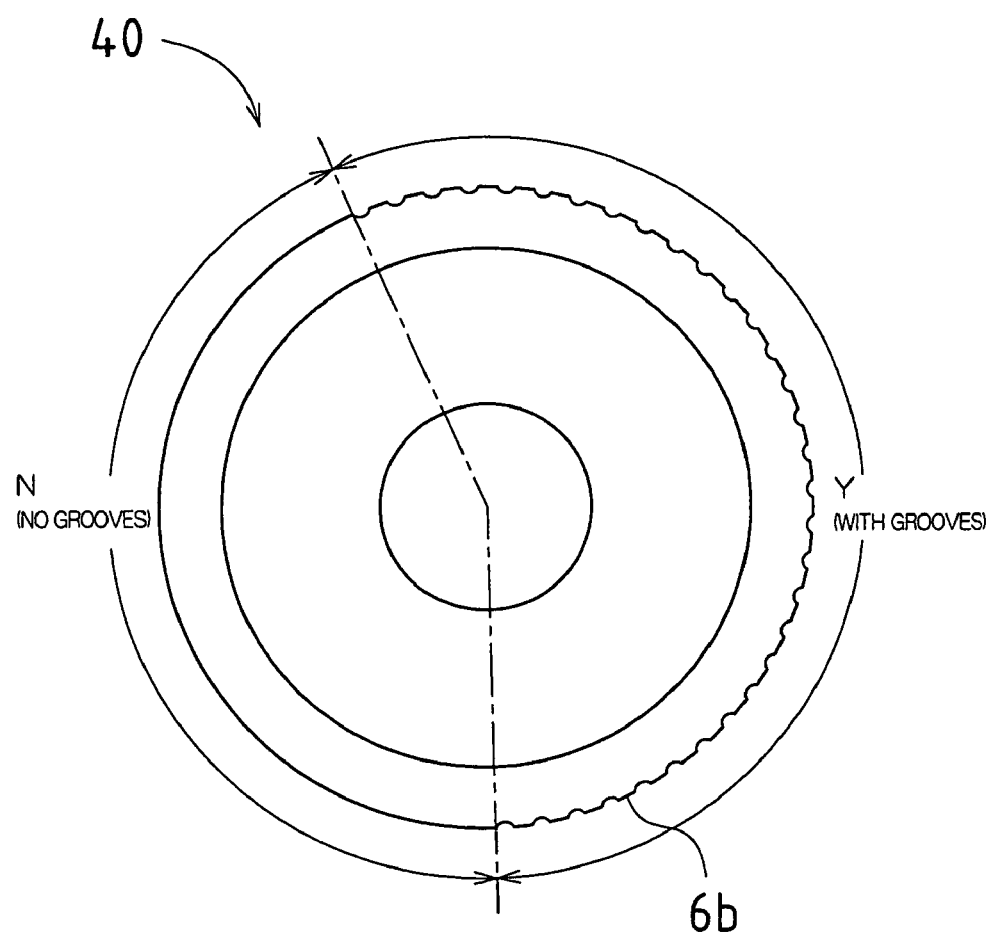
FIG. 25 is a side view showing another example of a second cutter wheel applied to the present invention.
Figure 26:
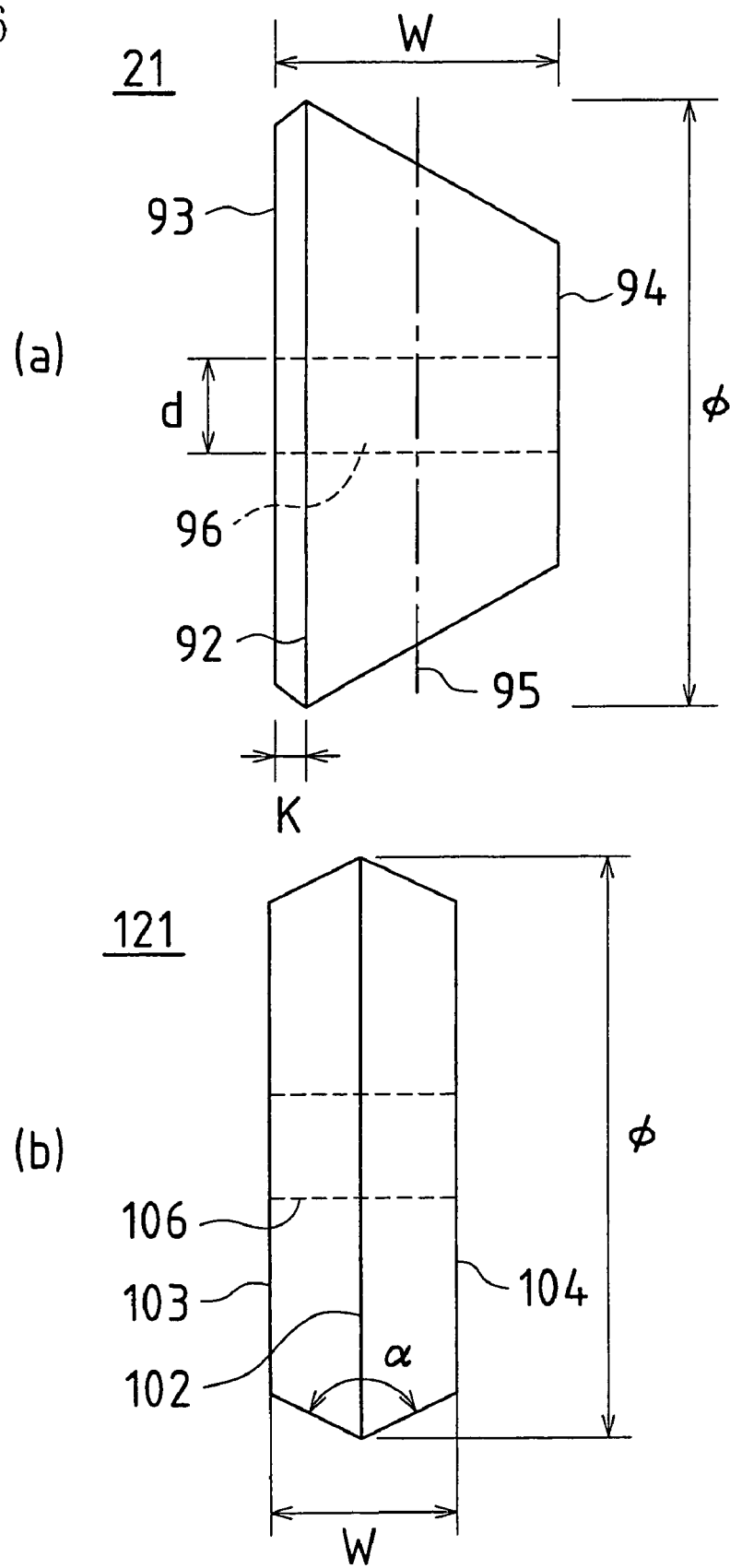
FIG. 26, consisting of FIGS. 26(a) and 26(b), is a diagram showing a form of a blade-edge ridge of a cutter wheel applied to the present invention.
Figure 27:
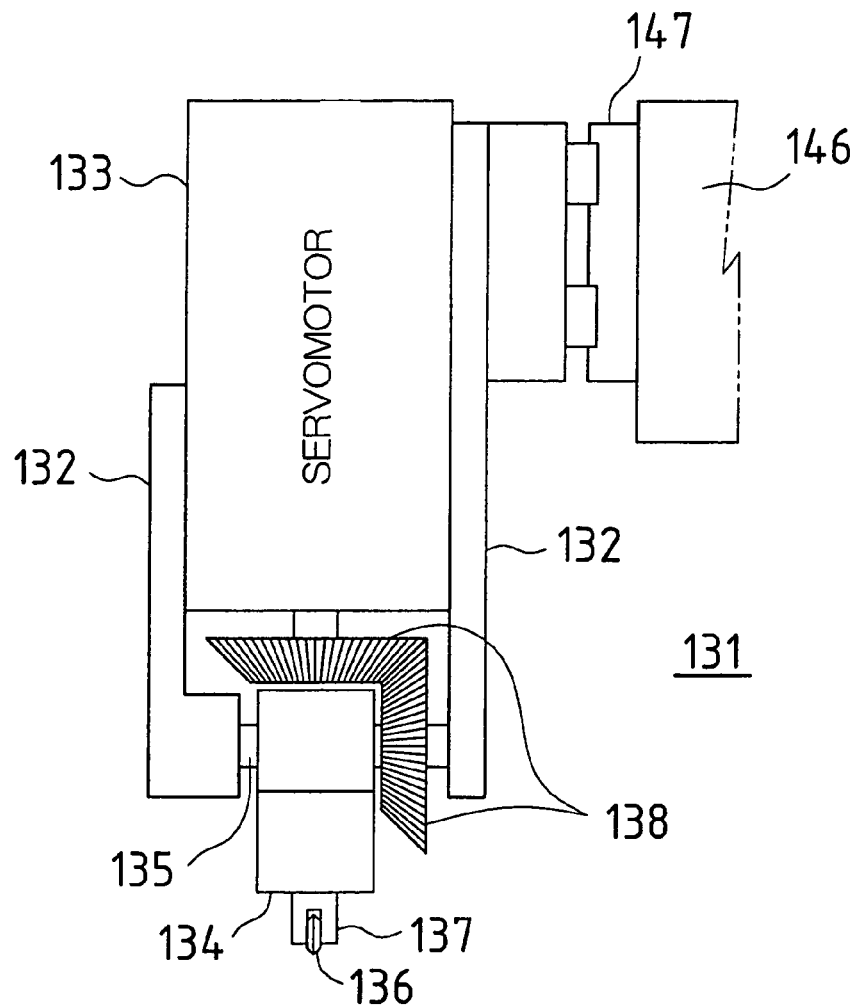
FIG. 27 is a side view of a scribe head using a servomotor that is applied to the present invention.
Figure 28:
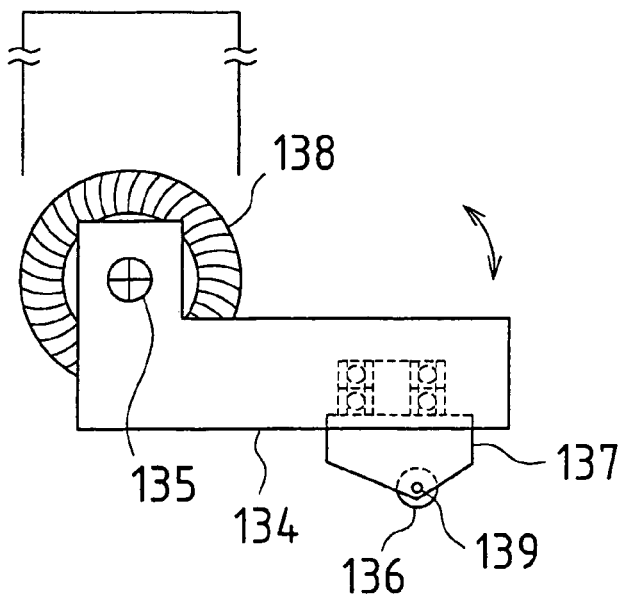
FIG. 28 is a front view of the relevant part of the scribe head using a servomotor that is applied to the present invention.
Figure 29:
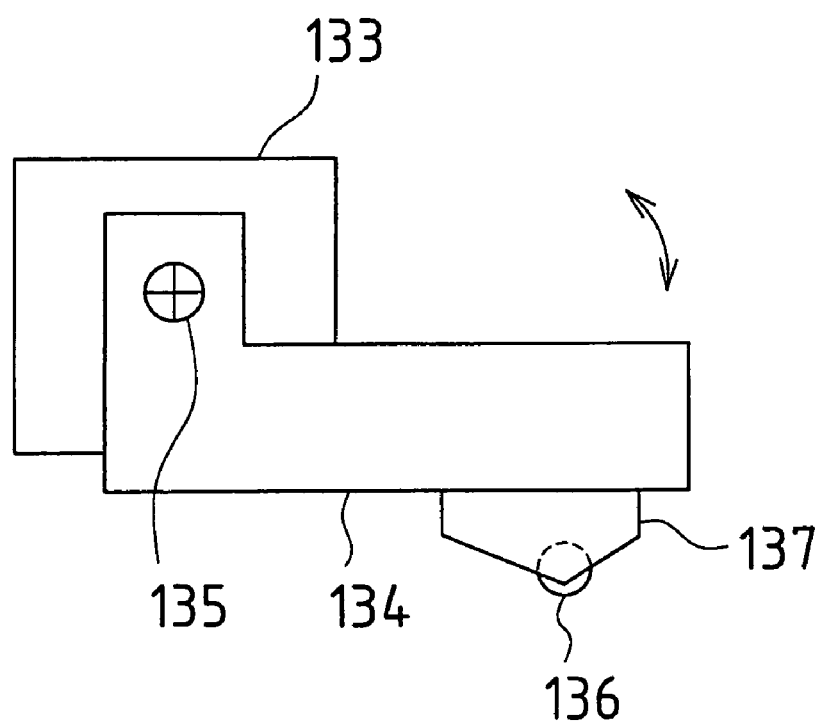
FIG. 29 is a front view showing another example of the scribe head using a servomotor that is applied to the present invention.

In the second embodiment, the cutter wheel used is the second cutter wheel 40 shown in FIG. 25; however, this cutter wheel is not limiting, and it is also possible to use the first cutter wheel 21 shown in FIG. 23, for example.

The vertical cracks formed by scribing the silicon substrate 1C with the first cutter wheel 21 are continuously shallow, and are the same as the vertical cracks obtained by scribing with the second cutter wheel 40.

It should be noted that the brittle material substrate provided with a protective material according to the second embodiment can be severed with the severing apparatus and the severing system disclosed in WO 02/057192. In this case, it is possible to omit, for example, step (c) in FIG. 3 and the breaking device 223 in FIG. 4.

Next, a case is described where at the time of severing a single-plate brittle material substrate, a protective material that protects the brittle material substrate is applied on both sides of the brittle material substrate and a protective film is further applied on the protective material, thus offering better protection for the surface of the single-plate brittle material substrate against scattered cullets and allowing effective removal of scattered cullets.

In the following, an embodiment of the present invention is described, with reference to the drawings.

Third Embodiment

FIGS. 5(a) to (h) are process diagrams for illustrating a third embodiment of the present invention. FIG. 6 includes diagrams schematically showing a configuration of the devices used in such a process. FIG. 6(a) shows an example in which the devices of the process are configured in a simplified line. FIG. 6(b) is an example in which the devices are configured around a transport robot R. The present invention is applied to a process of severing a single-plate brittle material substrate 3, which is one kind of a brittle material substrate. The single-plate brittle material substrate 3 is a glass substrate 1A, and the material of the glass is a non-alkali glass, for example. Furthermore, the cutter wheel used is the second cutter wheel 40 shown in FIG. 25 that can produce a vertical crack with periodically varied depths in a glass substrate.

Figure 5:
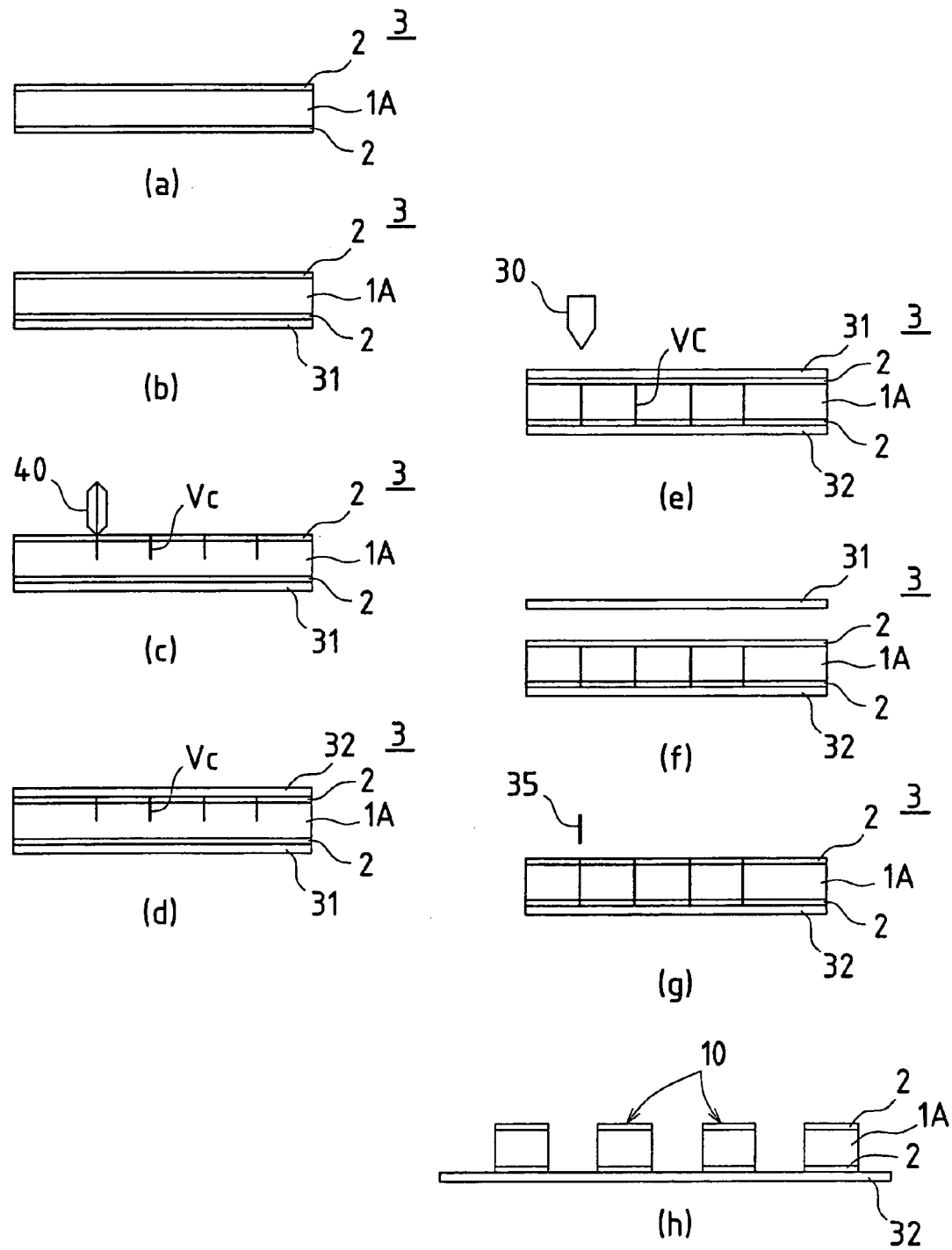
FIG. 5, consisting of FIGS. 5(a) to 5(h), is a process diagram for illustrating a third embodiment of the present invention.
Figure 6:
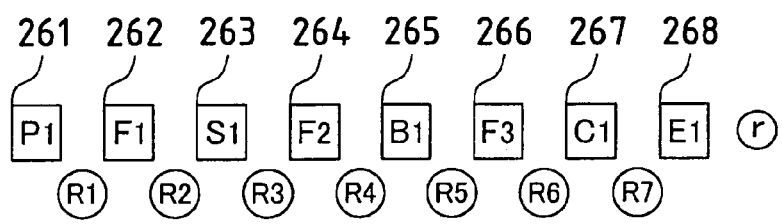
FIG. 6, consisting of FIGS. 6(a) and 6(b), is a diagram schematically showing a configuration of the component devices used in the embodiment shown in FIG. 5.
Figure 6:
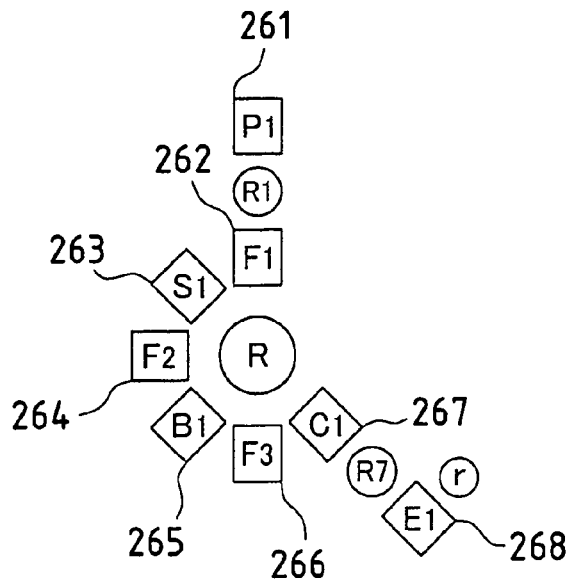

(1) First, a protective material processing device 261 is provided with the same mechanisms as the film application mechanisms used in devices for applying polarizing plates in the manufacturing processes of liquid crystal mother glass substrates, or is a film forming device such as a spin coater that forms a film on a substrate by applying a solution of resin on the surface of the substrate while rotating the substrate, or a film forming device that forms a film using a process such as vacuum deposition, and as shown in FIG. 5(*a*), it applies a protective material 2 on both sides of the single-plate brittle material substrate 3. It is preferable that the thin protective material 2 is applied immediately after performing various processings required for FPD applications on the surface of the above-described substrate and prior to severing, and that it has a thickness of approximately 10 µm.

(2) Next, the single-plate brittle material substrate 3 is transported by a transport robot R1 to a first film processing device 262. The first film processing device 262 is provided with the same mechanisms as the application mechanisms used in devices for applying polarizing plates in the manufacturing processes of liquid crystal mother glass substrates, and as shown in FIG. 5(*b*), it applies a first protective film 31 having a greater thickness and a lesser adhesive strength than the thin protective material 2 on (i.e., to the lower side in FIG. 5(*b*)) the thin protective material 2 on the lower side of the glass substrate 1A. It should be noted that the first protective film 31 has a thickness of 40 to 80 µm.

(3) Next, the single-plate brittle material substrate 3 is transported by a transport robot R2 to a scribing device 263, and as shown in FIG. 5(*c*), shallow vertical cracks Vc with periodically varied depths are formed in the glass substrate 1A by scribing with the second cutter wheel 40 from the side of the protective material 2 on the upper side of the glass substrate 1A. By forming the vertical cracks Vc, portions of the glass substrate can be prevented from coming off from the single-plate brittle material substrate when this single-plate brittle material substrate is transported to later devices, and at the same time it is also possible to simplify the severing operation in the breaking process.

(4) Then, the single-plate brittle material substrate 3 on which the first protective film 31 has been applied is transported by a transport robot R3 to a second film processing device 264. The second film processing device 264 is provided with the same mechanisms as the application mechanisms used in devices for applying polarizing plates in the manufacturing processes of liquid crystal mother glass substrates, and as shown in FIG. 5(*d*), it applies a second protective film 32 having a greater thickness and a lesser adhesive strength than the thin protective material 2 on the upper layer glass substrate 1A. Similarly to the first protective film 31, the second protective film 32 has a thickness of 40 to 80 µm.

(5) Furthermore, the single-plate brittle material substrate 3 is turned over, and transported by a transport robot R4 to a breaking device 265, and by applying pressure to the upper side of the glass substrate 1A along the scribe lines Vc with a breaker bar 30 as shown in FIG. 5(*e*), the shallow vertical cracks Vc with periodically varied depths formed in the glass substrate 1A are elongated to vertical cracks VC, and the glass substrate 1A is severed.

(6) Then, the single-plate brittle material substrate 3 is transported by a transport robot R5 to a third film processing device 266, and one corner of the first protective film 31 is held by suction with a suction pad of a robot provided with at least one suction pad, and the suction pad is moved in a direction diagonal to the single-plate brittle material substrate 3 and also moved up, thus peeling off the first protective film 31.

(7) Then, the single-plate brittle material substrate 3 is transported in this state by a transport robot R6 to a protective material cutting device 267, and the protective material 2 is cut with the film cutter 35 along the scribe lines VC formed in step (3). In this stage, however, the single-plate brittle material substrate 3 is not necessarily completely separated into products 10.

(8) Next, the single-plate brittle material substrate 3 is transported by a transport robot R7 to a separating device 268. The separating device 268 is provided with a spherically shaped table, a suction clamping means that suction-clamps and secures to the table a substrate placed on the table, a thrust-up pin that thrusts up the substrate onto the table, and a robot r that picks up a product, and as shown in FIG. 5(*h*), the single-plate brittle material substrate 3 is placed on the spherically shaped table (shown as a flat-surface table in FIG. 5 in order to make the separated condition of the substrates easier to understand), and suction-clamped and secured to separate each product 10 individually. Then, a pin is thrust out from the lower side of the spherically shaped table toward the product 10, and the product 10 provided with the protective material 2 is supported and discharged by the robot r.

The above-described process of the third embodiment includes step (1) of providing the thin protective material on both sides of the single-plate brittle material substrate 3, and step (2) of applying the first protective film 31 on the protective material 2 on the lower surface of the single-plate brittle material substrate 3, and step (3) of performing scribing on the thin protective material 2 produced on the upper surface of the single-plate brittle material substrate 3 in step (1). At this time, even if cullets are produced, they are merely scattered on the cut surface and in the vicinity of the thin protective material 2, and do not attach to the glass substrate 1A, and therefore it is possible to avoid causing scratches to the glass substrate 1A. Furthermore, the first protective film 31 is applied on (i.e., to the lower side in FIG. 5(*b*)) the thin protective material 2 on the lower side of the glass substrate, and since there is no direct contact during scribing between the glass substrate 1A and the table that supports the single-plate brittle material substrate 3 due to the first protective film 31 positioned on the lower surface of the single-plate brittle material substrate 3, the substrate surface is protected from scratching. In step (4), the second protective film is applied on the glass substrate 1A, and in step (5), the single-plate brittle material substrate 3 is turned over, and placed on the table of the breaking device, and the glass substrate 1A is severed with the breaker bar 30. In step (6), the thin protective material 2 does not peel off from the glass substrate 1B even when the protective film 31 peels off, since the adhesive strength of the first protective film 31 is less than the thin protective material 2 directly below. Furthermore, by this step, the cullets remaining on the glass substrate 1A can be removed together with the protective film 31.

In step (7), the single-plate brittle material substrate 3 from which the glass substrate 1A has been severed is transported to the substrate holding unit of the protective material cutting device provided with a protective material severing step, and the protective material 2 is severed along the scribe lines formed in step (3) with the film cutter 35.

It should be noted that the protective material 2 may be formed by applying a thin film made of polyethylene on the substrate, or by forming on the substrate a protective coating appropriately selected from a resinous polyimide coating, a metal coating, an ITO coating, a resist coating, an aluminum coating and the like, depending on the application used.

Additionally, when the protective material is provided on the single-plate brittle material substrate in a process prior to the severing process of the brittle material substrate, it is possible to omit step (1) (step (a) in FIG. 5), as well as the protective material processing device 261 in FIGS. 6(a) and (b) in the third embodiment.

Furthermore, when the first cutter wheel 21 is used in step (3), that is, the scribing process, a deep vertical crack that almost passes through the glass substrate 1A can be formed. In this case, it is therefore possible to omit the second film processing device 264 in step (4) (step (d) in FIG. 5) and the breaking device 265 in step (5) (step (e) in FIG. 5). In this case, the glass substrate 1A is not turned over, so that the second protective film 32 is on the lower surface side of the single-plate brittle material substrate 3 in step (g) in FIG. 5. Furthermore, since the glass substrate 1A is not turned over, the protective material 2 may be cut from below with the film cutter 35 in step (7) (step (g) in FIG. 5).

In the third embodiment, the product 10 is provided with the protective material 2 in FIG. 5(h); however, when the protective material 2 is not necessary, a process of peeling off the protective material 2 may be appropriately added after the severing process of the present embodiment. Furthermore, when the protective material 2 is a thin film and the adhesive strength of the first protective film 31 and the second protective film 32 is greater than the adhesive strength of the thin film to the substrate, the thin film that is the protective material 2 peels off from the glass substrate 1A at the time of peeling off the first protective film 31 in step (f) in FIG. 5, and at the time of discharging the product 10 in step (h) in FIG. 5; therefore, a plurality of severed glass plates 1A are obtained as the final products in the severing process. In this case, it is possible to omit step (7) (step (g) in FIG. 5) of cutting the protective material.

Furthermore, although a non-alkali glass, which is one kind of a glass substrate, is used as the single-plate brittle material substrate in the example shown in the third embodiment, the material of the glass substrate may be quartz glass, for example, and another brittle material substrate such as a silicon substrate that is a semiconductor wafer may also be used. In this case, since the material is a rigid, brittle material, even when scribing is performed using the first cutter wheel 21 or the second cutter wheel 40 as the cutter wheel, the vertical cracks formed during scribing are different from the shallow vertical cracks with periodically varied depths formed in the third embodiment, and are continuously shallow.

It should be noted that the brittle material substrate provided with a protective material according to the third embodiment can be severed with the separating device and the severing system disclosed in WO 02/057192. In this case, it is possible to omit, for example, steps (e) and (g) in FIG. 5, as well as the breaking device 265 and the protective material cutting device 267 in FIG. 5.

Next, a case is described where the material of the single-plate brittle material substrate is a semiconductor wafer, and at the time of severing of the single-plate brittle material substrate, a protective material that protects a brittle material substrate is applied on one side of the brittle material substrate and a protective film is further applied on the protective material, thus offering better protection for the surface of the single-plate brittle material substrate against scattered cullets and allowing effective removal of scattered cullets.

In the following, an embodiment of the present invention is described, with reference to the drawings.

Fourth Embodiment

Figure 7:
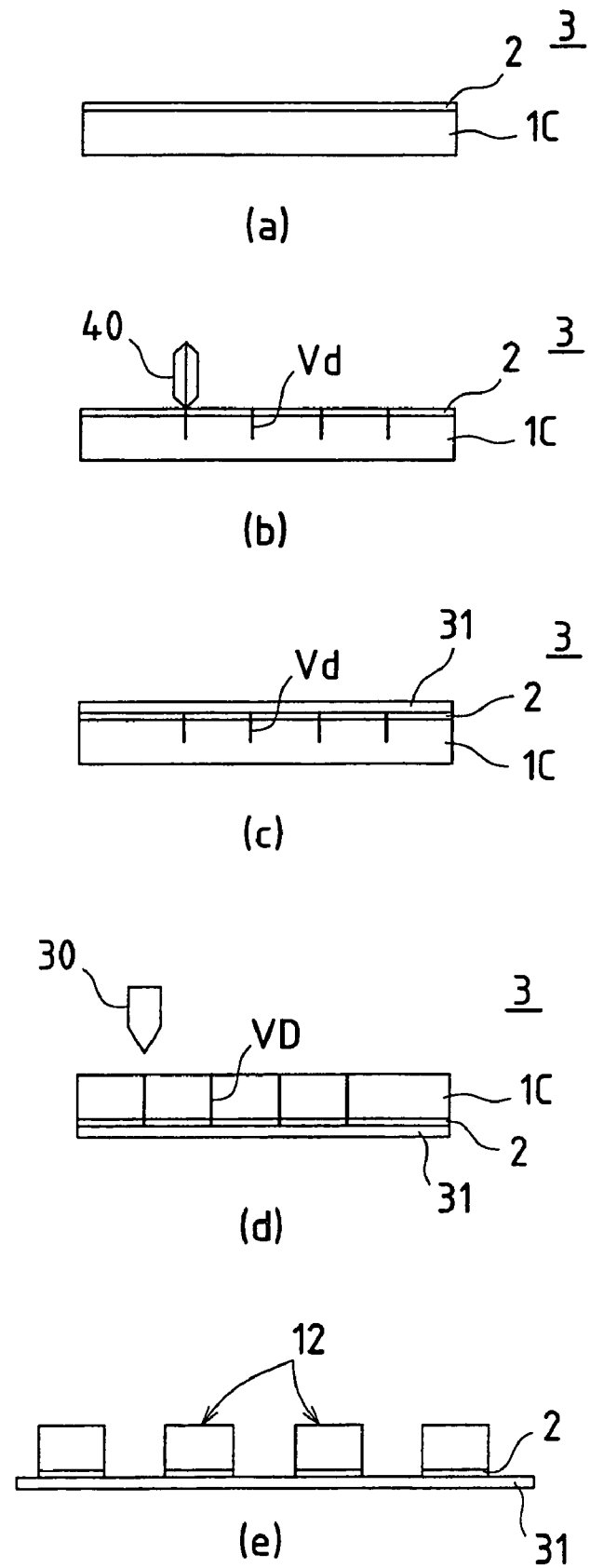
FIG. 7, consisting of FIGS. 7(a) to 7(e), is a process diagram for illustrating a fourth embodiment of the present invention.
Figure 8:
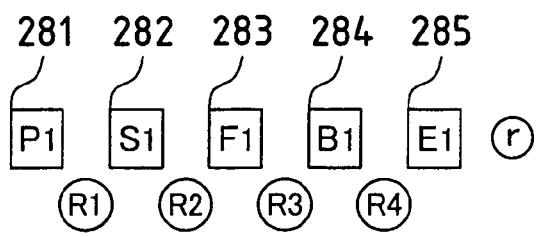
FIG. 8, consisting of FIGS. 7(a) and 7(b), is a diagram schematically showing a configuration of the component devices used in the embodiment shown in FIG. 7.
Figure 8:
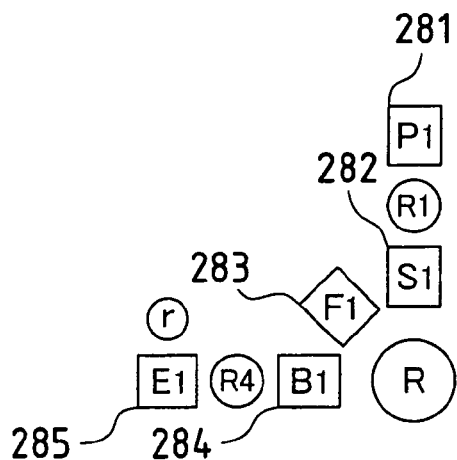

FIGS. 7(a) to (e) are process diagrams for illustrating a fourth embodiment of the present invention. FIG. 8 includes diagrams schematically showing a configuration of the devices used in such a process. FIG. 8(a) shows an example in which the devices of the process are configured in a simplified line. FIG. 8(b) is an example in which the devices are configured around a transport robot R. The present invention is applied to a process of severing a single-plate brittle material substrate 3, which is one kind of a brittle material substrate. The single-plate brittle material substrate 3 is a semiconductor wafer, and the material of the semiconductor wafer is a silicon substrate 1A, for example. The silicon substrate 1A is a combination of a glass and a semiconductor wafer, and used as a reflective-type projector substrate and the like. In the case of a reflective-type projector substrate, a projected light passes through the glass substrate and is reflected on the reflecting surface of the silicon substrate, so that only at least one side (reflecting surface) of the silicon substrate needs to be protected. Furthermore, the cutter wheel used is the second cutter wheel 40 shown in FIG. 25 that can achieve a vertical crack with periodically varied depths in a glass substrate. The vertical cracks formed at the time of scribing the silicon substrate are different from the shallow vertical cracks with periodically varied depths formed in the first embodiment, and are continuously shallow.

(1) First, a protective material processing device 281 is provided with the same mechanisms as the film application mechanisms used in devices for applying polarizing plates in the manufacturing processes of liquid crystal mother glass substrates, or is a film forming device such as a spin coater that forms a film on a substrate by applying a solution of resin on the surface of the substrate while rotating the substrate, or a film forming device that forms a film using a process such as vacuum deposition, and as shown in FIG. 7(a), it applies a protective material 2 on one side of the single-plate brittle material substrate 3. It is preferable that the thin protective material 2 is applied immediately after performing various processings required for FPD applications on the surface of the above-described substrate and prior to the severing process of the substrate, and that it has a thickness of approximately 10 μm.

(2) Next, the single-plate brittle material substrate 3 is transported by a transport robot R1 to a scribing device 282, and as shown in FIG. 7(b), continuously shallow vertical cracks Vd are formed in the silicon substrate 1C by scribing with the second cutter wheel 40 from the side of the protective material 2 on the upper side of the silicon substrate 1C. By forming the vertical cracks Vd, portions of the substrate can be prevented from coming off from the single-plate brittle material substrate when this single-plate brittle material substrate is transported to later devices.

(3) Next, the single-plate brittle material substrate 3 is transported by a transport robot R2 to a first film processing device 283. The first film processing device 283 is provided with the same mechanisms as the application mechanisms used in devices for applying polarizing plates in the manufacturing processes of liquid crystal mother glass substrates, and as shown in FIG. 7(c), it applies a first protective film 31 having a greater thickness and a lesser adhesive strength than the thin protective material 2 on (i.e., to the lower side in FIG. 7(c)) the thin protective material 2 on the lower side of the silicon substrate 1C. It should be noted that the first protective film 31 has a thickness of 40 to 80 μm.

(4) Furthermore, the single-plate brittle material substrate 3 is turned over, and transported by a transport robot R3 to a breaking device 284, and by applying pressure to the upper side of the silicon substrate 1C along the scribe lines Vd with the breaker bar 30 as shown in FIG. 7(d), the continuously shallow vertical cracks Vd formed in the silicon substrate 1C are elongated to vertical cracks VD, and the silicon substrate 1C is severed.

(8) Next, the single-plate brittle material substrate 3 is transported by a transport robot R4 to a separating device 285. The separating device 285 is provided with a spherically shaped table, a suction clamping means that suction-clamps and secures to the table a substrate placed on the table, a thrust-up pin that thrusts up the substrate onto the table, and a robot r that picks up a product, and as shown in FIG. 7(e), the single-plate brittle material substrate 3 is placed on the spherically shaped table (shown as a flat-surface table in FIG. 7 in order to make the separated condition of the substrates easier to understand), and suction-clamped and secured to separate each product 12 individually. Then, a pin is thrust out from the lower side of the spherically shaped table toward the product 12, and the product 12 provided with the protective material 2 is supported and discharged by the robot r.

The above-described process of the fourth embodiment includes step (1) of providing the thin protective material on one side of the single-plate brittle material substrate 3 and step (2) of performing scribing on the protective material 2. At this time, even if cullets are produced, they are merely scattered in the cut surface and in the vicinity of the thin protective material 2, and do not attach to the silicon substrate 1C, and therefore it is possible to avoid causing scratches to the silicon substrate 1C. In step (3), the first protective film is applied on the silicon substrate 1C. In step (4), the single-plate brittle material substrate 3 is turned over, and placed on the table of the breaking device, and the substrate is severed with the breaker bar 30.

It should be noted that the protective material 2 may be formed by applying a thin film made of polyethylene on the substrate, or by forming on the substrate a protective coating appropriately selected from a resinous polyimide coating, a metal coating, an ITO coating, a resist coating, an aluminum coating and the like, depending on the application used.

Additionally, when the protective material is provided on the single-plate brittle material substrate in a process prior to the severing process of the brittle material substrate, it is possible to omit step (1) (step (a) in FIG. 7), as well as the protective material processing device 281 in FIGS. 8(a) and (b) in the fourth embodiment.

In the fourth embodiment, the protective material 2 is provided on one side of the product 12 in FIG. 7(h); however, when the protective material 2 is not necessary, a process of peeling off the protective material 2 may be appropriately added after the severing process of the present embodiment. Furthermore, when the protective material 2 is a thin film and the adhesive strength of the first protective film 31 is greater than the adhesive strength of the thin film to the substrate, a plurality of severed silicon substrates 1C are obtained as the final products in the severing process, since the thin film serving as the protective material 2 peels off from the silicon substrate 1C at the time of discharging the products 12 in step (e) in FIG. 7.

In the fourth embodiment, the cutter wheel used is the second cutter wheel 40; however, this cutter wheel is not limiting, and it is also possible to use the first cutter wheel 21, for example.

The vertical cracks obtained by scribing the silicon substrate 1C with the first cutter wheel 21 are continuously shallow, and are the same as the vertical cracks obtained by scribing with the second cutter wheel 40.

Next, a case is described where a protective material that protects a bonded brittle material substrate is formed at the time of severing a flat display panel mother glass substrate 1 formed by bonding brittle material substrates together.

It should be noted that the brittle material substrate provided with a protective material according to the fourth embodiment can be severed with the severing apparatus and the severing system disclosed in WO 02/057192. In this case, it is possible to omit, for example, step (d) in FIG. 7 and the breaking device 284 in FIG. 8.

In the following, an embodiment of the present invention is described, with reference to the drawings.

Fifth Embodiment

Figure 9:
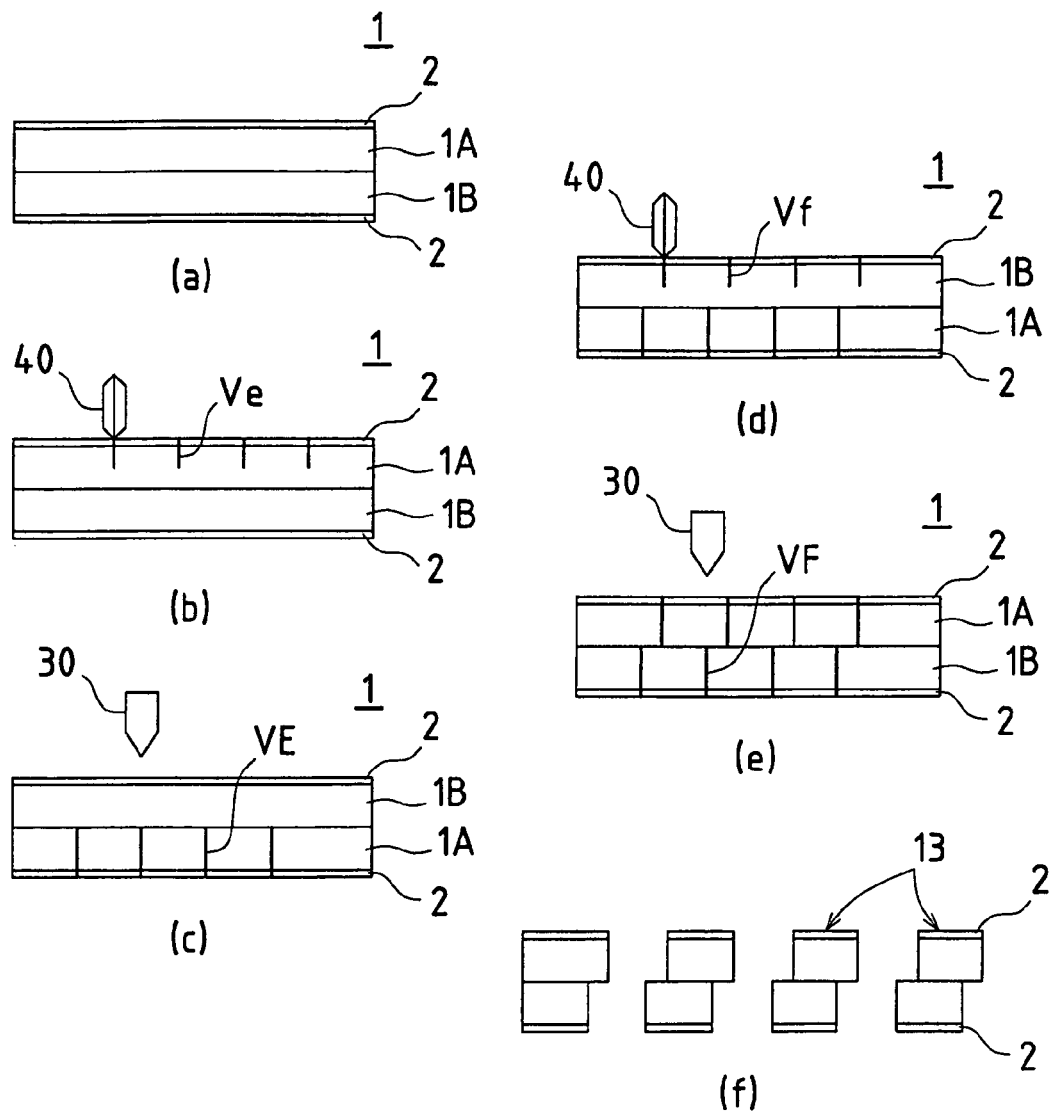
FIG. 9, consisting of FIGS. 9(a) to 9(f), is a process diagram for illustrating a fifth embodiment of the present invention.
Figure 10:
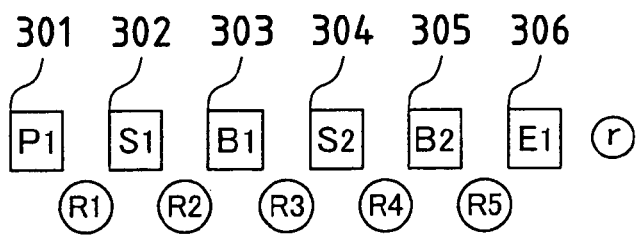
FIG. 10, consisting of FIGS. 10(a) and 10(b), is a diagram schematically showing a configuration showing the component devices used in the embodiment shown in FIG. 9.
Figure 10:
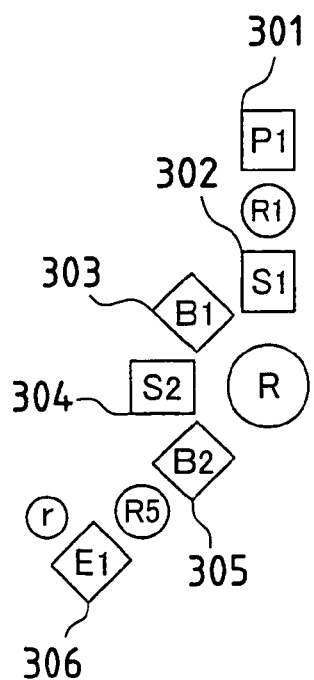

FIGS. 9(a) to (f) are process diagrams for illustrating a fifth embodiment of the present invention. FIG. 10 includes diagrams schematically showing a configuration of the devices used in such a process. FIG. 10(a) shows an example in which the devices of the process are configured in a simplified line. FIG. 10(b) is an example in which the devices are configured around a transport robot R. The present invention is applied to a process of severing a flat display panel mother glass substrate 1, which is one kind of a brittle material substrate. The glass substrate on one side of the flat display panel mother glass substrate 1 is a glass substrate 1A, and the glass substrate on the other side is a glass substrate 1B, and the material of the glass of the glass substrate 1A and the glass substrate 1B is a non-alkali glass, for example. Furthermore, the cutter wheel used is the second cutter wheel 40 shown in FIG. 25 that can achieve a vertical crack with periodically varied depths in a glass substrate.

(1) First, a protective material processing device 301 is provided with the same mechanisms as the film application mechanisms used in devices for applying polarizing plates in the manufacturing processes of liquid crystal mother glass substrates, or is a film forming device such as a spin coater that forms a film on a substrate by applying a solution of resin on the surface of the substrate while rotating the substrate, or a film forming device that forms a film using a process such as vacuum deposition, and as shown in FIG. 9(a), it applies a protective material 2 on both sides of the flat display panel mother glass substrate 1. It is preferable that the thin protective material 2 is applied immediately after performing various processings required for FPD applications on the surface of the above-described substrate and prior to severing, and that it has a thickness of approximately 10 μm.

(2) Next, the flat display panel mother glass substrate 1 is transported by a transport robot R1 to a first scribing device 302, and as shown in FIG. 9(b), shallow vertical cracks Ve with periodically varied depths are formed in the glass substrate 1A by scribing with the second cutter wheel 40 from the side of the protective material 2 on the upper side of the glass substrate 1A. By forming the vertical cracks Ve, portions of the glass substrate can be prevented from coming off from the flat display panel mother glass substrate 1 when this flat display panel mother glass substrate 1 is transported to later devices, and at the same time it is also possible to simplify the severing operation in the breaking process.

(3) Furthermore, the flat display panel mother glass substrate 1 is turned over, and transported by a transport robot R2 to a first breaking device 303, and by applying pressure to the glass substrate 1B side along the scribe lines Ve with the breaker bar 30 as shown in FIG. 9(c), the shallow vertical cracks Ve with periodically varied depths formed in the glass substrate 1A are elongated to vertical cracks VE, and the glass substrate 1A is severed.

(4) Next, the flat display panel mother glass substrate 1 is transported by a transport robot R3 to a second scribing device 304, and by scribing the glass substrate 1B of the flat display panel mother glass substrate 1 with the second cutter wheel 40 from the thin film 2 side as shown in FIG. 9(d), shallow vertical cracks Vf with periodically varied depths are formed in the glass substrate 1B positioned as the upper layer. By forming the vertical cracks Vf, portions of the glass substrate can be prevented from coming off from the flat display panel mother glass substrate when this mother glass substrate is transported to later devices.

(5) Furthermore, the flat display panel mother glass substrate 1 is turned over such that the glass substrate 1B becomes the lower layer, and is transported by a transport robot R4 to a second breaking device 305, and by applying pressure to the glass substrate 1A side that is positioned as the upper layer along the scribe lines Vf with the breaker bar 30 as shown in FIG. 9(e), the shallow vertical cracks Vf with periodically varied depths formed in the glass substrate 1B are elongated to vertical cracks VF, and the glass substrate 1B is severed.

(6) Next, the flat display panel mother glass substrate 1 is transported by a transport robot R5 to a separating device 306. The separating device 306 is provided with a spherically shaped table, a suction clamping means that suction-clamps and secures to the table a substrate placed on the table, a thrust-up pin that thrusts up the substrate onto the table, and a robot r that picks up a product 10, and as shown in FIG. 9(f), the flat display panel mother glass substrate 1 is placed on the spherically shaped table (shown as a flat-surface table in FIG. 9 in order to make the separated condition of the substrates easier to understand), and suction-clamped and secured to separate each product 13 individually, along the vertical cracks VE and VF. Then, a pin is thrust out from the lower side of the spherically shaped table toward the product 13, and the product 13 provided with the protective material 2 is supported and discharged by the robot r.

The above-described process of the fifth embodiment includes step (1) of providing the thin protective material 2 on both sides of the flat display panel mother glass substrate 1 and step (2) of performing scribing on the thin protective material 2. At this time, even if cullets are produced, they are merely scattered on the cut surface and in the vicinity of the thin protective material 2, and do not attach to the glass substrate 1A, and therefore it is possible to avoid causing scratches to the glass substrate 1A. Furthermore, the protective material 2 is also applied on the glass substrate on the lower side, and since there is no direct contact during scribing between the glass substrate 1A and the table that supports the flat display panel mother glass substrate 1 due to the protective material 2 positioned on the lower surface of the flat display panel mother glass substrate 1, the substrate surface is protected from scratching.

It should be noted that the protective material 2 may be formed by applying a thin film made of polyethylene on the substrate, or by forming on the substrate a protective coating appropriately selected from a resinous polyimide coating, a metal coating, an ITO coating, a resist coating, an aluminum coating and the like, depending on the application used.

Additionally, when the protective material is provided on the flat display panel mother glass substrate 1 in a process prior to the severing process of the brittle material substrate, it is possible to omit step (1) (step (a) in FIG. 9), as well as the protective material processing device 301 in FIGS. 10(a) and (b) in the fifth embodiment.

Furthermore, when the first cutter wheel 21 is used in steps (2) and (4), that is, the scribing processes, a deep vertical crack that almost passes through the glass substrate 1A and the glass substrate 1B can be formed. In this case, it is therefore possible to omit the breaking devices 303 and 305 in step (3) (step (c) in FIG. 9) and step (5) (step (e) in FIG. 9). Additionally, the process of turning over the flat display panel mother glass substrate 1 is eliminated in step (3), so that the flat display panel mother glass substrate 1 is turned over and the glass substrate 1B is scribed in step (4) (step (d) in FIG. 9). Furthermore, in this case, the upper and lower positions of the product 13 (the glass substrate 1A and the glass substrate 1B) are reversed in step (6) (step (f) in FIG. 9).

By using the first cutter wheel 21 and the second cutter wheel 40 in an appropriate combination as the cutter wheel of the first scribing device in step (b) in FIG. 9 and the cutter wheel of the second scribing device in step (d) in FIG. 9, it is possible to omit at least one step in the severing process shown in FIGS. 9(a) to (f).

In the fifth embodiment, the product 13 is provided with the protective material 2 in FIG. 9(f); however, when the protective material 2 is not necessary, a process of peeling off the protective material 2 may be appropriately added after the severing process of the present embodiment.

Furthermore, although a non-alkali glass, which is one kind of a glass substrate, is used as the glass substrate 1A and the glass substrate 1B that constitute the flat display panel mother glass substrate 1 in the example shown in the fifth embodiment, the material of the glass substrate may be quartz glass, for example, and other brittle materials as substrates such as a silicon substrate that is a semiconductor wafer may also be used.

Next, a case is described where the flat display panel mother glass substrate 1 formed by bonding brittle material substrates together is a reflective-type projector substrate, and a protective material that protects a bonded brittle material substrate is applied on one side of the brittle material substrate at the time of severing the flat display panel mother glass substrate 1.

It should be noted that the bonded brittle material substrate provided with a protective material according to the fifth embodiment can be severed with the severing apparatus and the severing system disclosed in WO 02/057192. In this case, it is possible to omit, for example, steps (c) and (e) in FIG. 9, as well as the breaking device 303 and the protective material cutting device 305 in FIG. 10.

In the following, an embodiment of the present invention is described, with reference to the drawings.

Sixth Embodiment

Figure 11:
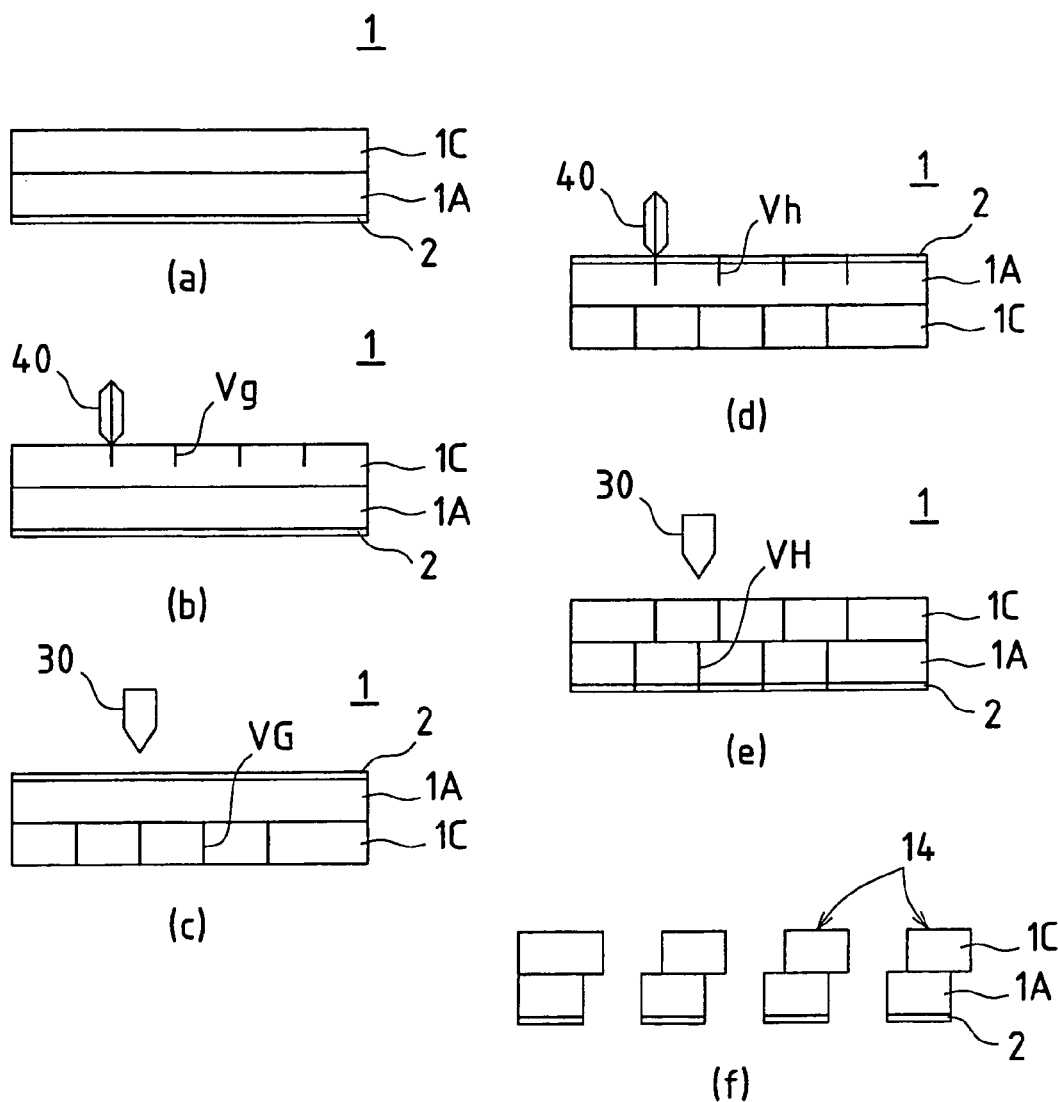
FIG. 11, consisting of FIGS. 11(a) to 11 (f), is a process diagram for illustrating a sixth embodiment of the present invention.
Figure 12:
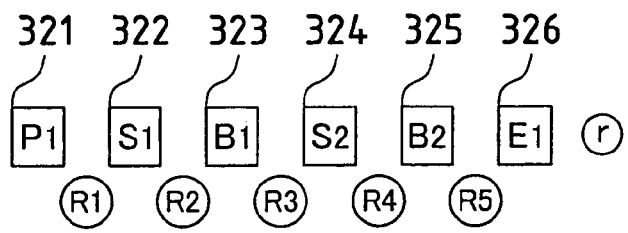
FIG. 12, consisting of FIGS. 12(a) and 12(b), is a diagram schematically showing a configuration of the component devices used in the embodiment shown in FIG. 11.
Figure 12:
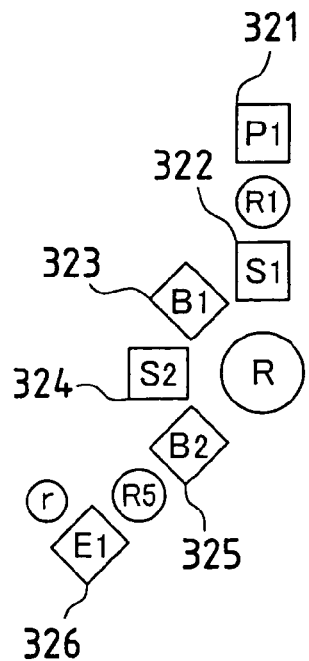

FIGS. 11(a) to (f) are process diagrams for illustrating a sixth embodiment of the present invention. FIG. 12 includes diagrams schematically showing a configuration of the devices used in such a process. FIG. 12(a) shows an example in which the devices of the process are configured in a simplified line. FIG. 12(b) is an example in which the devices are configured around a transport robot R. The present invention is applied to a process of severing a flat display panel mother glass substrate 1, which is one kind of a brittle material substrate.

In the following, an example is described in which the present invention is applied to a process of severing a reflective-type projector substrate, which is one kind of a brittle material substrate, formed by bonding together a glass substrate and a silicon substrate facing each other. The glass substrate on one side of the reflective-type projector substrate is a glass substrate 1A, and the silicon substrate on the other side is a silicon substrate 1C, and the material of the glass of the glass substrate 1A is a non-alkali glass, for example. In the case of a reflective-type projector substrate, a projected light passes through the glass substrate 1A and is reflected on the reflecting surface of the silicon substrate 1C, so that the surface of the silicon substrate 1C that is opposite to the reflecting surface (the silicon substrate side of the reflective-type projector substrate) does not need to be protected. Additionally, since the silicon substrate resists scratching, only at least one side of the glass substrate 1A needs to be protected. Furthermore, the cutter wheel used is the second cutter wheel 40 shown in FIG. 25 that can produce vertical cracks in which the depth of the crack is periodically varied within the glass substrate.

The vertical cracks obtained at the time of scribing the silicon substrate 1C with the second cutter wheel 40 shown in FIG. 25 are continuously shallow.

(1) First, a protective material processing device 321 is provided with the same mechanisms as the film application mechanisms used in devices for applying polarizing plates in the manufacturing processes of liquid crystal mother glass substrates, or is a film forming device such as a spin coater that forms a film on a substrate by applying a solution of resin on the surface of the substrate while rotating the substrate, or a film forming device that forms a film using a process such as vacuum deposition, and as shown in FIG. 3(a), it applies a protective material 2 on the glass substrate 1A of the flat display panel mother glass substrate 1. It is preferable that the thin protective material 2 is applied immediately after performing various processings required for FPD applications on the surface of the above-described substrate and prior to severing, and that it has a thickness of approximately 10 μm.

(2) Next, the single-plate brittle material substrate 3 is transported by a transport robot R1 to a first scribing device 322, and as shown in FIG. 11(b), continuously shallow vertical cracks Vg are formed in the silicon substrate 1C by scribing with the second cutter wheel 40 from the upper side of the silicon substrate 1C. By forming the vertical cracks Vg, portions of the glass substrate can be prevented from coming off from the single-plate brittle material substrate when this single-plate brittle material substrate is transported to later devices.

(3) Furthermore, the flat display panel mother glass substrate 1 is turned over, and transported by a transport robot R2 to a first breaking device 323, and by applying pressure to the glass substrate 1A side along the scribe lines Vg with the breaker bar 30 as shown in FIG. 11(c), the continuously shallow vertical cracks Vg formed in the silicon substrate 1C are elongated to vertical cracks VG, and the silicon substrate 1C is severed.

(4) Next, the flat display panel mother glass substrate 1 is transported by a transport robot R3 to a second scribing device 324, and by scribing the glass substrate 1A of the flat display panel mother glass substrate 1 with the second cutter wheel 40 from the thin film 2 side as shown in FIG. 11(d), shallow vertical cracks Vh with periodically varied depths are formed in the glass substrate 1A positioned as the upper layer. By forming the vertical cracks Vh, portions of the glass substrate can be prevented from coming off from the flat display panel mother glass substrate when this mother glass substrate is transported to later devices.

(5) Further, the flat display panel mother glass substrate 1 is turned over such that the glass substrate 1A becomes the lower layer, and is transported by a transport robot R4 to a second breaking device 325, and by applying pressure to the silicon substrate 1C side that is positioned as the upper layer along the scribe lines Vh with the breaker bar 30 as shown in FIG. 11(e), the shallow vertical cracks Vh with periodically varied depths formed in the glass substrate 1A are elongated to vertical cracks VH, and the glass substrate 1A is severed.

(6) Next, the flat display panel mother glass substrate 1 is transported by a transport robot R5 to a separating device 326. The separating device 326 is provided with a spherically shaped table, a suction clamping means that suction-clamps and secures to the table a substrate placed above the table, a thrust-up pin that thrusts up the substrate onto the table, and a robot r that picks up a product, and as shown in FIG. 11(f), the flat display panel mother glass substrate 1 is placed on the spherically shaped table (shown as a flat-surface table in FIG. 11 in order to make the separated condition of the substrates easier to understand), and suction-clamped and secured to separate each product 14 individually. Then, a pin is thrust out from the lower side of the spherically shaped table toward the product 14, and the product 14 provided with the protective material 2 is supported and discharged by the robot r.

The above-described process of the sixth embodiment includes step (1) of applying the thin protective material on the surface of the glass substrate 1A of the flat display panel mother glass substrate 1. In step (2), scribing is performed on the silicon substrate 1C on the upper side of the flat display panel mother glass substrate 1. Furthermore, the protective material 2 is applied on the glass substrate 1A on the lower side, and since there is no direct contact during scribing between the glass substrate 1A and the table that supports the flat display panel mother glass substrate 1 due to the protective material 2 positioned on the lower surface of the flat display panel mother glass substrate 1, the substrate surface is protected from scratching. In step (3), the flat display panel mother glass substrate 1 is turned over, and then placed on a table of the breaking device, and the silicon substrate 1C is severed with the breaker bar 30. In step (4), the flat display panel mother glass substrate 1 is placed on a table of the scribing device, and the glass substrate 1A is scribed through the thin protective material 2 applied in step (1). At this time, even if cullets are produced, they are merely scattered on the cut surface and in the vicinity of the thin protective material 2, and do not attach to the glass substrate 1A, and therefore it is possible to avoid causing scratches to the glass substrate 1A. In step (5), the flat display panel mother glass substrate 1 is turned over, and then placed on a table of the breaking device, and the glass substrate 1A is severed with the breaker bar 30.

It should be noted that the protective material 2 may be formed by applying a thin film made of polyethylene on the substrate, or by forming on the substrate a protective coating appropriately selected from a resinous polyimide coating, a metal coating, an ITO coating, a resist coating, an aluminum coating and the like, depending on the application used.

Additionally, when the protective material is provided on the flat display panel mother glass substrate 1 in a process prior to the severing process of the brittle material substrate, it is possible to omit step (1) (step (a) in FIG. 11), as well as the protective material processing device 321 in FIGS. 12(a) and (b) in the sixth embodiment.

Furthermore, when the first cutter wheel 21 is used in step (4), that is, the scribing process, a deep vertical crack that almost passes through the glass substrate 1A can be formed, so that it is possible to omit step (5) (step (e) in FIG. 11) and the breaking device 325. In this case, the upper and lower positions of the product 14 (the silicon substrate 1C and the glass substrate 1A) are reversed in step (6) (step (f) in FIG. 11).

By using the first cutter wheel 21 and the second cutter wheel 40 in an appropriate combination as the cutter wheel of the first scribing device in step (b) in FIG. 11 and the cutter wheel of the second scribing device in step (d) in FIG. 11, it is possible to omit at least one of the steps shown in FIGS. 11(a) to (f).

In the sixth embodiment, the product 14 is provided with the protective material 2 in FIG. 11(f); however, when the protective material 2 is not necessary, a process of peeling off the protective material 2 may be appropriately added after the severing process of the present embodiment.

It should be noted that the bonded brittle material substrate provided with a protective material according to the sixth embodiment can be severed with the severing apparatus and the severing system disclosed in WO 02/057192. In this case, it is possible to omit, for example, steps (c) and (e) in FIG. 11, as well as the first breaking device 323 and the second breaking device 325 in FIG. 11.

Furthermore, although a non-alkali glass, which is one kind of a glass substrate, is used as the material of the glass substrate 1A that constitutes the flat display panel mother glass substrate 1 in the example shown in the sixth embodiment, the material of the glass substrate may be quartz glass, for example.

Next, a case is described where at the time of severing a flat display panel mother glass substrate 1 formed by bonding brittle material substrates together, a protective material that protects a bonded brittle material substrate is formed and a protective film is further applied on the protective material, thus offering better protection for the surface of the flat display panel mother glass substrate 1 against scattered cullets and allowing effective removal of scattered cullets.

In the following, an embodiment of the present invention is described, with reference to the drawings.

Seventh Embodiment

FIGS. 13(a) to (j) are process diagrams for illustrating a seventh embodiment of the present invention. FIG. 14 includes diagrams schematically showing a configuration of the devices used in such a process. FIG. 14(a) shows an example in which the devices of the process are configured in a simplified line. FIG. 14(b) is an example in which the devices are configured around a transport robot R. The present invention is applied to a process of severing a flat display panel mother glass substrate 1, which is one kind of a brittle material substrate. The glass substrate on one side of the flat display panel mother glass substrate 1 is a glass substrate 1A, and the glass substrate on the other side is a glass substrate 1B, and the material of the glass of the glass substrate 1A and the glass substrate 1B is a non-alkali glass, for example. Furthermore, the cutter wheel used is the second cutter wheel 40 shown in FIG. 25 that can achieve a vertical crack with periodically varied depths in a glass substrate.

(1) First, a protective material processing device 341 is provided with the same mechanisms as the film application mechanisms used in devices for applying polarizing plates in the manufacturing processes of liquid crystal mother glass substrates, or is a film forming device such as a spin coater that forms a film on a substrate by applying a solution of resin on the surface of the substrate while rotating the substrate, or a film forming device that forms a film using a process such as vacuum deposition, and as shown in FIG. 13(a), it applies a protective material 2 on both sides of the flat display panel mother glass substrate 1. It is preferable that the thin protective material 2 is applied immediately after performing various processings required for FPD applications on the surface of the above-described substrate and prior to severing, and that it has a thickness of approximately 10 μm.

(2) Next, the flat display panel mother glass substrate 1 is transported by a transport robot R1 to a first film processing device 342. The first film processing device 342 is provided with the same mechanisms as the application mechanisms used in devices for applying polarizing plates in the manufacturing processes of liquid crystal mother glass substrates, and as shown in FIG. 13(b), it applies a first protective film 31 having a greater thickness and a lesser adhesive strength than the thin protective material 2 on (i.e., to the lower side in FIG. 13(b)) the thin protective material 2 on the lower side of on the lower layer glass substrate 1B. It should be noted that the first protective film 31 has a thickness of 40 to 80 μm.

(3) Next, the flat display panel mother glass substrate 1 is transported by a transport robot R2 to a scribing device 343, and as shown in FIG. 13(c), shallow vertical cracks Vi with periodically varied depths are formed in the upper layer glass substrate 1A by scribing with the second cutter wheel 40 from the side of the protective material 2 on the upper side of the glass substrate 1A. By forming the vertical cracks Vi, portions of the glass substrate can be prevented from coming off from the flat display panel mother glass substrate 1 when this flat display panel mother glass substrate 1 is transported to later devices, and at the same time it is also possible to simplify the severing operation in the breaking process.

(4) Then, the flat display panel mother glass substrate 1 on which the first protective film 31 has been applied is transported by a transport robot R3 to a second film processing device 344. The second film processing device 344 is provided with the same mechanisms as the application mechanisms used in devices for applying polarizing plates in the manufacturing processes of liquid crystal mother glass substrates, and as shown in FIG. 13(d), it applies a second protective film 32 having a greater thickness and a lesser adhesive strength than the thin protective material 2 on the upper layer glass substrate 1A. Similarly to the first protective film 31, the second protective film 32 has a thickness of 40 to 80 μm.

(5) Furthermore, the flat display panel mother glass substrate 1 is turned over such that the glass substrate 1A becomes the lower layer, and is transported by a transport robot R4 to a first breaking device 345, and by applying pressure to the glass substrate 1B side along the scribe lines Vi with the breaker bar 30 as shown in FIG. 13(e), the shallow vertical cracks Vi with periodically varied depths formed in the glass substrate 1A are elongated to vertical cracks VI, and the glass substrate 1A is severed.

(6) Then, the flat display panel mother glass substrate 1 is transported by a transport robot R5 to a third film processing device 346, and one corner of the first protective film 31 is held by suction with a suction pad of a robot provided with at least one suction pad, and the suction pad is moved in a direction diagonal to the flat display panel mother glass substrate 1B and also moved up, thus peeling off the first protective film 31.

(7) Next, the flat display panel mother glass substrate 1 is transported by a transport robot R6 to a second scribing device 347, and by scribing the glass substrate 1B of the flat display panel mother glass substrate 1 from which the first protective film 31 has been peeled off, with the second cutter wheel 40 from the thin protective material 2 side as shown in FIG. 13(f), shallow vertical cracks Vj with periodically varied depths are formed in the glass substrate 1B positioned as the upper layer. By forming the vertical cracks Vj, portions of the glass substrate can be prevented from coming off from the flat display panel mother glass substrate 1 when this mother glass substrate is transported to later devices.

(8) Then, the flat display panel mother glass substrate 1 is transported by a transport robot R7 to a fourth film processing device 348. The fourth film processing device 348 is provided with the same mechanisms as the application mechanisms used in devices for applying polarizing plates in the manufacturing processes of liquid crystal mother glass substrates, and as shown in FIG. 13(*g*), it further applies a second protective film 33 on the thin protective material 2 on the glass substrate 1B positioned as the upper layer.

Figure 13:
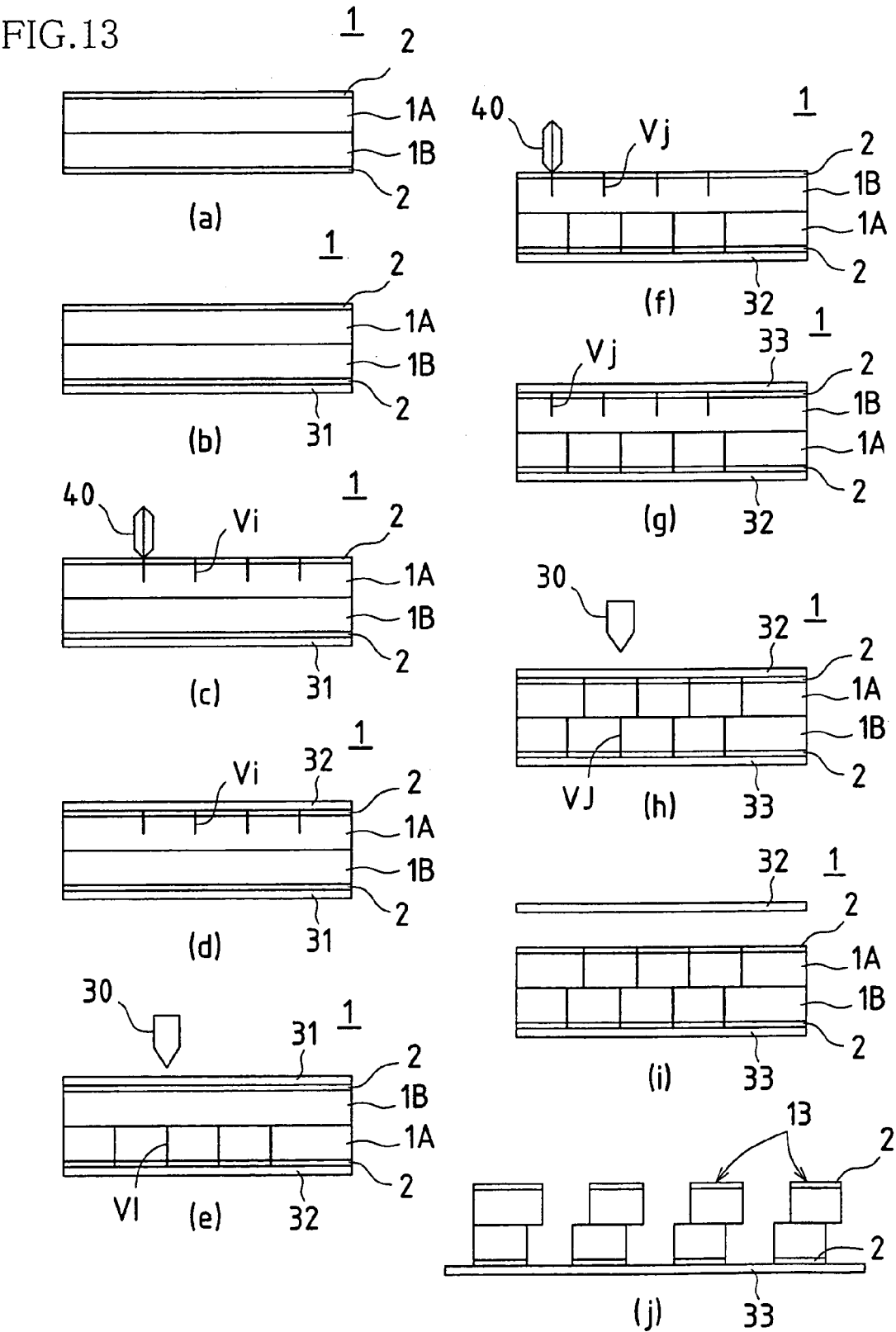
FIG. 13, consisting of FIGS. 13(a) to 13(j), is a process diagram for illustrating a seventh embodiment of the present invention.
Figure 14:
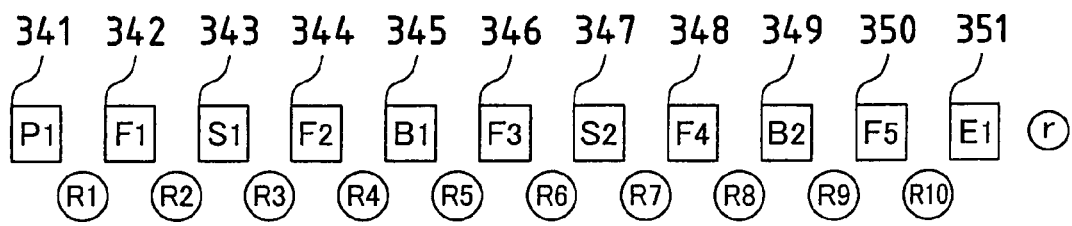
FIG. 14, consisting of FIGS. 14(a) and 14(b), is a diagram schematically showing a configuration of the component devices used in the embodiment shown in FIG. 13.
Figure 14:
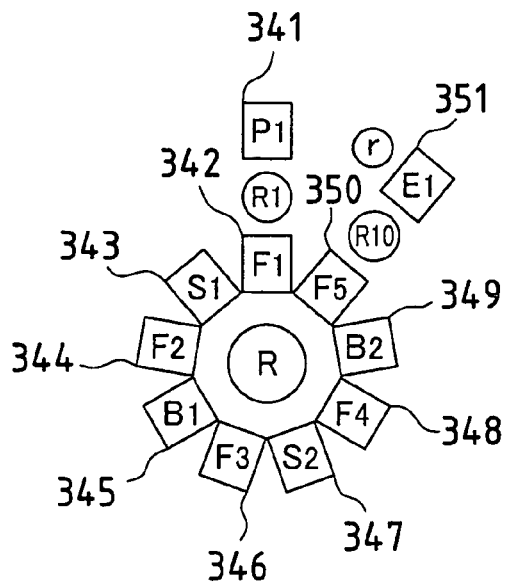

(9) Furthermore, the flat display panel mother glass substrate 1 is turned over such that the glass substrate 1B becomes the lower layer, and is transported by a transport robot R8 to a second breaking device 349, and by applying pressure to the glass substrate 1A side that is positioned as the upper layer along the scribe lines Vj with the breaker bar 30 as shown in FIG. 13(*h*), the shallow vertical cracks Vj with periodically varied depths formed in the glass substrate 1B are elongated to vertical cracks VJ, and the glass substrate 1B is severed.

(10) Next, the flat display panel mother glass substrate 1 is transported by a transport robot R9 to a fifth film processing device 350, and as shown in FIG. 13(*i*), one corner of the second protective film 32 applied on the glass substrate 1A is held by suction with a suction pad of a robot provided with at least one suction pad, and the suction pad is moved in a direction diagonal to the flat display panel mother glass substrate 1 and also moved up, thus peeling off the second protective film 32 from the glass substrate 1A positioned as the upper layer.

(11) Next, the flat display panel mother glass substrate 1 is transported by a transport robot R10 to a separating device 351. The separating device 351 is provided with a spherically shaped table, a suction clamping means that suction-clamps and secures to the table a substrate placed on the table, a thrust-up pin that thrusts up the substrate onto the table, and a robot r that picks up a product, and as shown in FIG. 13(*j*), the flat display panel mother glass substrate 1 is placed on the spherically shaped table (shown as a flat-surface table in FIG. 13 in order to make the separated condition of the substrates easier to understand), and suction-clamped and secured to separate each product 13 individually, along the scribe lines VI and VJ. Then, although not shown in the figure, UV light is irradiated to weaken the adhesive strength of the second protective film 32 and the thin protective material 2 that are applied on the glass substrate 1B, and a pin thrusts out from the lower side of the spherically shaped table toward the product 13, and the product 13 provided with the protective material 2 is supported and discharged by the robot r.

The above-described process of the seventh embodiment includes step (1) of providing the thin protective material on both sides of the flat display panel mother glass substrate 1, step (2) of applying the first protective film 31 on the protective material 2 on the lower layer glass substrate 1B of the flat display panel mother glass substrate 1 and step (3) of performing scribing on the glass substrate 1A through the thin protective material 2 provided in step (1). At this time, even if cullets are produced, they are merely scattered on the cut surface and in the vicinity of the thin protective material 2, and do not attach to the glass substrate 1A, and therefore it is possible to avoid causing scratches to the glass substrate 1A. Furthermore, the first protective film 31 is applied on the glass substrate 1B on the lower side, and since there is no direct contact during scribing between the glass substrate 1B and the table that supports the flat display panel mother glass substrate 1 due to the first protective film 31 positioned on the lower surface of the flat display panel mother glass substrate 1, the substrate surface is protected from scratching. In step (4), the second protective film is applied on the glass substrate 1A, and in step (5), the flat display panel mother glass substrate 1 is turned over such that the glass substrate 1A becomes the lower layer, and then placed on the table of the first breaking device, and the glass substrate 1A is severed with the breaker bar 30. In step (6), the thin protective material 2 does not peel off from the glass substrate 1B although the protective film 31 is peeled off, since the adhesive strength of the first protective film 31 is less than the thin protective material 2 directly below. In step (8), the second protective film 32 is applied on the glass substrate 1B, and by turning over the flat display panel mother glass substrate 1 in this state, the second protective film 32 is positioned on the lower surface of the flat display panel mother glass substrate 1, and since there is no direct contact between the glass substrate 1A and the table that supports the flat display panel mother substrate due to the second protective film 32, the substrate surface is protected from scratching. In step (10), when the second protective film 32 is peeled off from the glass substrate 1A, the thin protective material 2 directly below does not peel off from the glass substrate 1A, since the adhesive strength of the second protective film 32 is less than that of the thin protective material 2 directly below. By this step, the cullets remaining on the glass substrate 1A can be removed together with the second protective film 32.

It should be noted that the protective material 2 may be formed by applying a thin film made of polyethylene on the substrate, or by forming on the substrate a protective coating appropriately selected from a resinous polyimide coating, a metal coating, an ITO coating, a resist coating, an aluminum coating and the like, depending on the application used.

Additionally, when the protective material is provided on the flat display panel mother glass substrate 1 in a process prior to the severing process of the brittle material substrate, it is possible to omit step (1) (step (a) in FIG. 13), as well as the protective material processing device 341 in FIGS. 14(*a*) and (*b*) in the seventh embodiment.

Furthermore, when the first cutter wheel 21 is used in steps (3) and (7), that is, the scribing processes, a deep vertical crack that almost passes through the glass substrate 1A and the glass substrate 1B can be formed. In this case, it is therefore possible to omit the breaking devices 345 and 347 in step (5) (step (e) in FIG. 13) and step (9) (step (h) in FIG. 13), as well as the film processing devices 348 and 350 in step (8) (step (g) in FIG. 13) and step (10) (step (i) in FIG. 13). Additionally, the process of turning over the flat display panel mother glass substrate 1 is eliminated in step (5), so that the flat display panel mother glass substrate 1 is turned over and the glass substrate 1B is scribed in step (6) (step (f) in FIG. 13). Furthermore, in this case, the upper and lower positions of the product 13 (the glass substrate 1A and the glass substrate 1B) are reversed in step (11) (step (j) in FIG. 13).

By using the first cutter wheel 21 and the second cutter wheel 40 in an appropriate combination as the cutter wheel of the first scribing device in step (c) in FIG. 13 and the cutter wheel of the second scribing device in step (f) in FIG. 13, it is possible to omit at least one step in the severing process shown in FIGS. 13(*a*) to (*j*).

In the seventh embodiment, the product 13 is provided with the protective material 2 in FIG. 13(*j*); however, when the protective material 2 is not necessary, a process of peeling off the protective material 2 may be appropriately added after the severing process of the present embodiment. Furthermore, when the protective material 2 is a thin film and the adhesive strength of the second film 32 and the third film 33 is a greater than the adhesive strength of the thin film to the substrate, the thin film that is the protective material 2 peels off from the glass substrate 1A at the time of peeling off the second protective film 32 in step (i) in FIG. 13, and it peels off from the glass substrate 1B at the time of discharging the products 13 in step (j) in FIG. 13; therefore, a plurality of severed substrates in each of which the glass substrate 1A and the glass substrate 1B are bonded are obtained as the final products in the severing process.

Furthermore, although a non-alkali glass, which is one kind of a glass substrate, is used as the glass substrate 1A and the glass substrate 1B that constitute the flat display panel mother glass substrate 1 in the example shown in the seventh embodiment, the material of the glass substrate may be quartz glass, for example, and another brittle material substrate such as a silicon substrate that is a semiconductor wafer may also be used.

It should be noted that the bonded brittle material substrate provided with a protective material according to the seventh embodiment can be severed with the severing apparatus and the severing system disclosed in WO 02/057192. In this case, it is possible to omit, for example, at least one of steps (b), (d), (e), (g), (h) and (i) in FIG. 13, as well as at least one of the first film processing device 342, the second film processing device 344, the first breaking device 345, the third film processing device 346, the fourth film processing device 348, the second breaking device 349, and the fifth film processing device 350 in FIG. 14.

Next, a case is described where the flat display panel mother glass substrate 1 formed by bonding brittle material substrates together is a reflective-type projector substrate, and at the time of severing the flat display panel mother glass substrate 1, a protective material that protects a bonded brittle material substrate is formed on one side of the brittle material substrate and a protective film is further applied on the protective material, thus offering better protection for the surface of the flat display panel mother glass substrate 1 against scattered cullets and allowing effective removal of scattered cullets.

In the following, an embodiment of the present invention is described, with reference to the drawings.

Eighth Embodiment

FIGS. 15(a) to (h) are process diagrams for illustrating an eighth embodiment of the present invention. FIG. 16 includes diagrams schematically showing a configuration of the devices used in such a process. FIG. 16(a) shows an example in which the devices of the process are configured in a simplified line. FIG. 16(b) is an example in which the devices are configured around a transport robot R. In the following, an example is described in which the present invention is applied to a method of severing a reflective-type projector substrate, which is one kind of a brittle material substrate, formed by bonding together a glass substrate and a silicon substrate facing each other. The glass substrate on one side of the reflective-type projector substrate is a glass substrate 1A, and the silicon substrate on the other side is silicon substrate 1C, and the material of the glass of the glass substrate 1A is a non-alkali glass, for example. In the case of a reflective-type projector substrate, a projected light passes through the glass substrate 1A and is reflected on the reflecting surface of the silicon substrate 1C, so that the surface of the silicon substrate 1C that is opposite to the reflecting surface (the silicon substrate side of the reflective-type projector substrate) does not need to be protected. Additionally, since the silicon substrate resists scratching, only at least one side of the glass substrate 1A needs to be protected. Furthermore, the cutter wheel used is the second cutter wheel 40 shown in FIG. 25 that can produce vertical cracks in which the depth of the crack is periodically varied within the glass substrate.

The vertical cracks obtained at the time of scribing the silicon substrate 1C with the second cutter wheel 40 shown in FIG. 25 are continuously shallow.

(1) First, a protective material processing device 361 is provided with the same mechanisms as the film application mechanisms used in devices for applying polarizing plates in the manufacturing processes of liquid crystal mother glass substrates, or is a film forming device such as a spin coater that forms a film on a substrate by applying a solution of resin on the surface of the substrate while rotating the substrate, or a film forming device that forms a film using a process such as vacuum deposition, and as shown in FIG. 15(a), it applies a protective material 2 on the glass substrate 1A of the flat display panel mother glass substrate 1. It is preferable that the thin protective material 2 is applied immediately after performing various processings required for FPD applications on the surface of the above-described substrate and prior to severing, and that it has a thickness of approximately 10 µm.

(2) Next, the flat display panel mother glass substrate 1 is transported by a transport robot R1 to a first film processing device 362. The first film processing device 362 is provided with the same mechanisms as the application mechanisms used in devices for applying polarizing plates in the manufacturing processes of liquid crystal mother glass substrates, and as shown in FIG. 15(b), it applies a first protective film 31 having a greater thickness and a lesser adhesive strength than the thin protective material 2 on (i.e., to the lower side in FIG. 15(b)) the thin protective material 2 on the lower layer glass substrate 1A. It should be noted that the first protective film 31 has a thickness of 40 to 80 µm.

(3) Next, the flat display panel mother glass substrate 1 is transported by a transport robot R2 to a first scribing device 363, and as shown in FIG. 15(c), continuously shallow vertical cracks Vk are formed in the silicon substrate 1C by scribing through the silicon substrate 1C with the second cutter wheel 40. By forming the vertical cracks Vk, portions of the glass substrate can be prevented from coming off from the flat display panel mother glass substrate 1 when this flat display panel mother glass substrate 1 is transported to later devices.

(4) Furthermore, the flat display panel mother glass substrate 1 is turned over, and transported by a transport robot R3 to a first breaking device 364, and by applying pressure to the glass substrate 1A side along the scribe lines Vk with the breaker bar 30 as shown in FIG. 15(d), the continuously shallow vertical cracks Vk formed in the silicon substrate 1C are elongated to vertical cracks VK, and the silicon substrate 1C is severed.

(5) Then, the flat display panel mother glass substrate 1 is transported by a transport robot R4 to a second film processing device 365, and one corner of the first protective film 31 is held by suction with a suction pad of a robot provided with at least one suction pad, and the suction pad is moved in a direction diagonal to the flat display panel mother glass substrate 1A and also moved up, thus peeling off the first protective film 31.

(6) Next, the flat display panel mother glass substrate 1 is transported by a transport robot R5 to a second scribing device 366, and by scribing the glass substrate 1A of the flat display panel mother glass substrate 1 with the second cutter wheel 40 from the side of the thin film 2 as shown in FIG. 15(e), shallow vertical cracks Vl with periodically varied depths are formed in the glass substrate 1A positioned as the upper layer. By forming the vertical cracks Vl, portions of that substrate can be prevented from coming off from the flat display panel mother glass substrate 1 when this mother glass substrate is transported to later devices.

(7) Then, the flat display panel mother glass substrate 1 is transported by a transport robot R6 to a third film processing device 367. The third film processing device 367 is provided with the same mechanisms as the application mechanisms used in devices for applying polarizing plates in the manufacturing processes of liquid crystal mother glass substrates, and as shown in FIG. 15(*f*), it further applies a second protective film 32 on the thin protective material 2 on the glass substrate 1A positioned as the upper layer.

Figure 15:
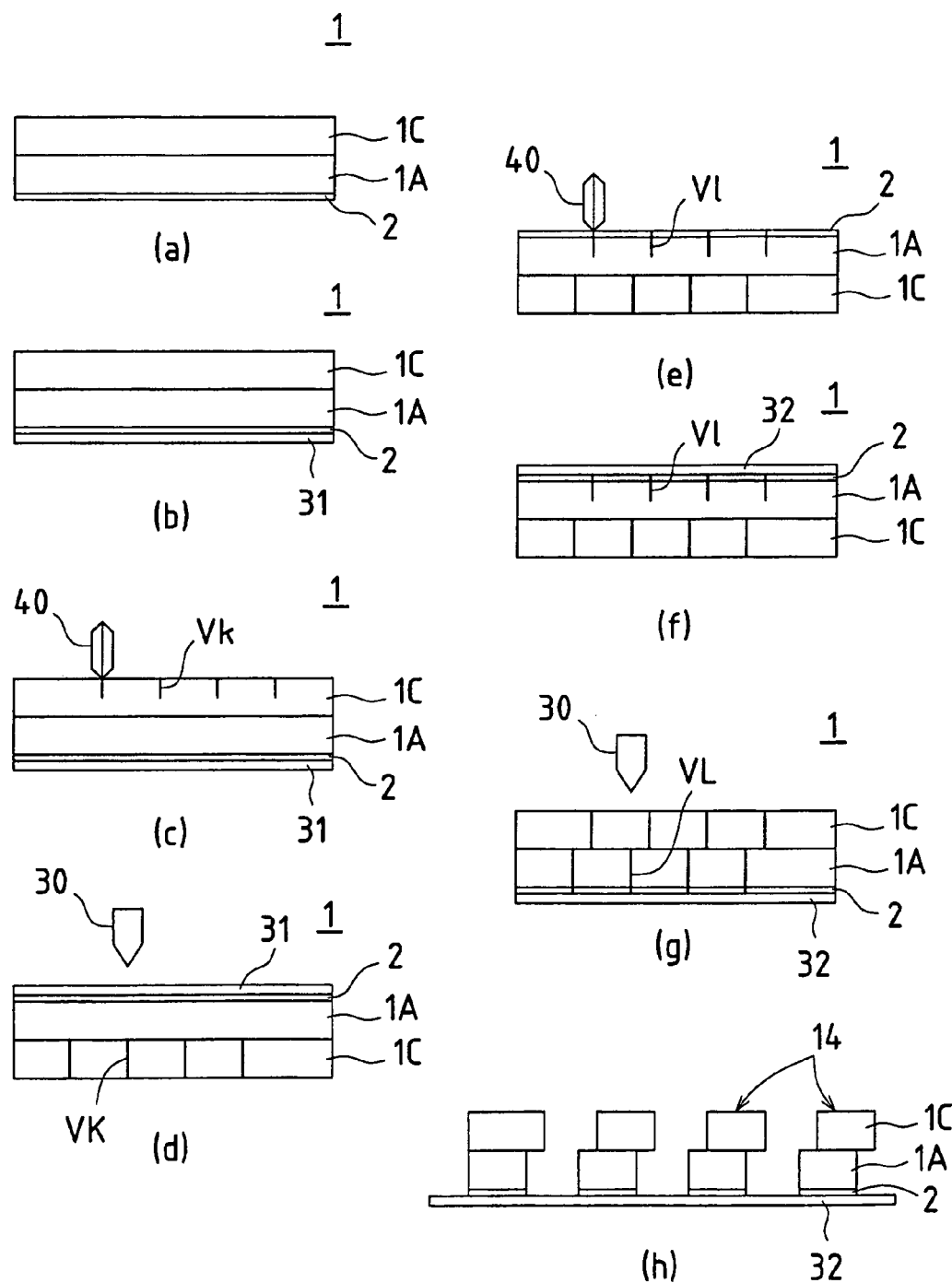
FIG. 15, consisting of FIGS. 15(a) to 15(h), is a process diagram for illustrating an eighth embodiment of the present invention.
Figure 16:
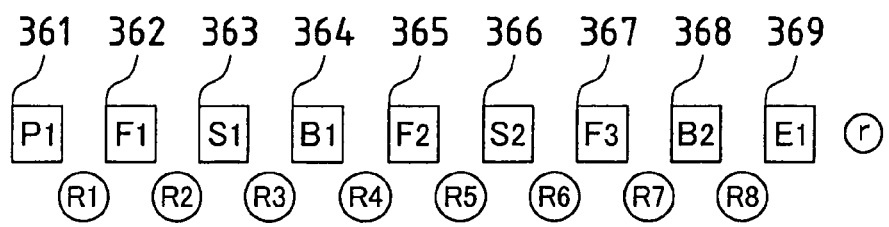
FIG. 16, consisting of FIGS. 16(a) and 16(b), is a diagram schematically showing a configuration of the component devices used in the embodiment shown in FIG. 15.
Figure 16:
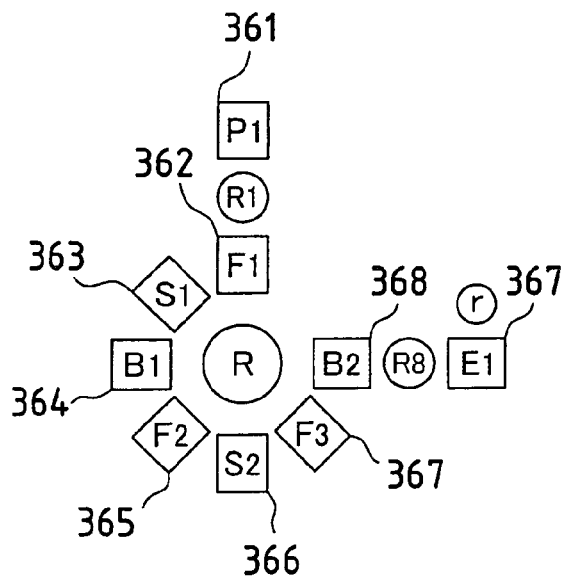

(8) Further, the flat display panel mother glass substrate 1 is turned over such that the glass substrate 1A becomes the lower layer, and is transported by a transport robot R7 to a second breaking device 368, and by applying pressure to the silicon substrate 1C side that is positioned as the upper layer along the scribe lines V1 with the breaker bar 30 as shown in FIG. 15(*g*), the shallow vertical cracks V1 with periodically varied depths formed in the glass substrate 1A are elongated to vertical cracks VL, and the glass substrate 1A is severed.

(9) Next, the flat display panel mother glass substrate 1 is transported by a transport robot R8 to a separating device 369. The separating device 369 is provided with a spherically shaped table, a suction clamping means that suction-clamps and secures to the table a substrate placed on the table, a thrust-up pin that thrusts up the substrate onto the table, and a robot r that picks up a product, and as shown in FIG. 15(*h*), the flat display panel mother glass substrate 1 is placed on the spherically shaped table (shown as a flat-surface table in FIG. 15 in order to make the separated condition of the substrates easier to understand), and suction-clamped and secured to separate each product 14 individually. Then, a pin is thrust out from the lower side of the spherically shaped table toward the product 14, and the product 14 provided with the protective material 2 is supported and discharged by the robot r.

The above-described process of the eighth embodiment includes step (1) of providing the thin protective material on the surface of the glass substrate 1A of the flat display panel mother glass substrate 1, and step (2) of applying the first protective film 31 on the protective material 2 on the lower layer glass substrate 1A of the flat display panel mother glass substrate 1. In step (3), scribing is performed on the silicon substrate on the upper side of the flat display panel mother glass substrate 1. Furthermore, the protective material 2 is applied on the glass substrate 1A on the lower side, and since there is no direct contact during scribing between the glass substrate 1A and the table that supports the flat display panel mother glass substrate 1 due to the first protective film 31 positioned on the lower surface of the flat display panel mother glass substrate 1, the substrate surface is protected from scratching. In step (4), the flat display panel mother glass substrate 1 is turned over, and then placed on a table of the breaking device, and the silicon substrate 1C is severed with the breaker bar 30. In step (5), the thin protective material 2 does not peel off from the glass substrate 1A even when the protective film 31 is peeled off, since the adhesive strength of the first protective film 31 is less than the thin protective material 2 directly below. In step (6), the flat display panel mother glass substrate 1 from which the silicon substrate 1C has been severed is placed on a table of the scribing device, and the glass substrate 1A is scribed through the thin protective material 2 applied in step (1). At this time, even if cullets are produced, they are merely scattered on the cut surface and in the vicinity of the thin protective material 2, and do not attach to the glass substrate 1A, and therefore it is possible to avoid causing scratches to the glass substrate 1A. In step (7), the second protective film 32 is applied on the glass substrate 1A, and by turning over the flat display panel mother glass substrate 1 in this state, the second protective film 32 is positioned on the lower surface of the flat display panel mother glass substrate 1, and since there is no direct contact between the glass substrate 1A and the table that supports the flat display panel mother glass substrate due to the second protective film 32, the substrate surface is protected from scratching. In step (8), the flat display panel mother glass substrate 1 is turned over, and then placed on a table of the breaking device, and the glass substrate 1A is severed with the breaker bar 30.

It should be noted that the protective material 2 may be formed by applying a thin film made of polyethylene on the substrate, or by forming on the substrate a protective coating appropriately selected from a resinous polyimide coating, a metal coating, an ITO coating, a resist coating, an aluminum coating and the like, depending on the application used.

Additionally, when the protective material is provided on the flat display panel mother glass substrate 1 in a process prior to the severing process of the brittle material substrate, it is possible to omit step (1) (step (a) in FIG. 15), as well as the protective material processing device 361 in FIGS. 16(*a*) and (*b*) in the eighth embodiment.

Furthermore, when the first cutter wheel 21 is used in step (6), that is, the scribing process, a deep vertical crack that almost passes through the glass substrate 1A can be formed, so that it is possible to omit the breaking device 368 of step (8) (step (g) in FIG. 15) and the film processing device 367 of step (7) (step (f) in FIG. 15). In this case, the upper and lower positions of the product 14 (the silicon substrate 1C and the glass substrate 1A) are reversed in step (9) (step (h) in FIG. 15).

By using the first cutter wheel 21 and the second cutter wheel 40 in an appropriate combination as the cutter wheel of the first scribing device in step (c) in FIG. 15 and the cutter wheel of the second scribing device in step (e) in FIG. 15, it is possible to omit at least one of the steps shown in FIGS. 15(*a*) to (*h*).

In the eighth embodiment, the product 14 is provided with the protective material 2 in FIG. 15(*h*); however, when the protective material 2 is not necessary, a process of peeling off the protective material 2 may be appropriately added after the severing process of the present embodiment. Furthermore, when the protective material 2 is a thin film and the adhesive strength of the second film 32 is greater than the adhesive strength of the thin film to the substrate, the thin film that is the protective material 2 peels off from the glass substrate 1A at the time of discharging the products 14 in step (h) in FIG. 15; therefore, a plurality of severed substrates in each of which the silicon substrate 1C and the glass substrate 1A are bonded are obtained as the final products in the severing process.

Furthermore, although a non-alkali glass, which is one kind of a glass substrate, is used as the material of the glass substrate 1A that constitutes the flat display panel mother glass substrate 1 in the example shown in the eighth embodiment, the material of the glass substrate may be quartz glass, for example.

It should be noted that the bonded brittle material substrate provided with a protective material according to the eighth embodiment can be severed with the severing apparatus and the severing system disclosed in WO 02/057192. In this case, it is possible to omit, for example, at least one of steps (b), (d), (f) and (g) in FIG. 15, as well as at least one of the first film processing device 362, the first breaking device 364, the second film processing device 365, the third film processing device 367 and the second breaking device 368 in FIG. 16.

The severing methods of the embodiments of the present invention have been described above for the case where scribing is performed from an outer substrate surface that has not undergone special processing, in the process of severing a large-dimension mother substrate, which is a bonded brittle material substrate formed by bonding two substrates together, into a plurality of small-dimension flat display panels. However, there may also be cases where scribing is performed from an inner substrate surface that has undergone special processing. Examples of such special processing include, the formation of an aluminum film, a resist film and the like used during the formation of an electronic control circuit formed on the opposing surfaces of a bonded brittle material substrate, as well as the formation of an ITO film, a chromium-plated film and the like formed inside a substrate at terminal portions serving as current-conducting means for supplying power or signals to a bonded brittle material substrate. Other examples include the formation in advance of an aluminum thin film on the opposing surfaces of a bonded brittle material substrate in order to make full use of the necessary displaying functions and the application of a thin polyimide film. In order to precisely sever portions that have undergone such film forming processings in a desired location, while avoiding the peeling of the film at the severed location, it is necessary to perform scribing from the side where the film is formed. The cutter wheel disclosed in the present application can effectively respond to such a requirement.

When scribing is performed from the substrate surface of a brittle material substrate on which a functional layer (the above-described aluminum film, resist film, ITO film, chromium-plated film or polyimide film) is provided by undergoing the above-described special processing, scribing is carried out on a pair of single-plate brittle material substrates before they are bonded together and they are severed in a plurality of single-plate brittle material substrates of predetermined dimensions.

Figure 30:
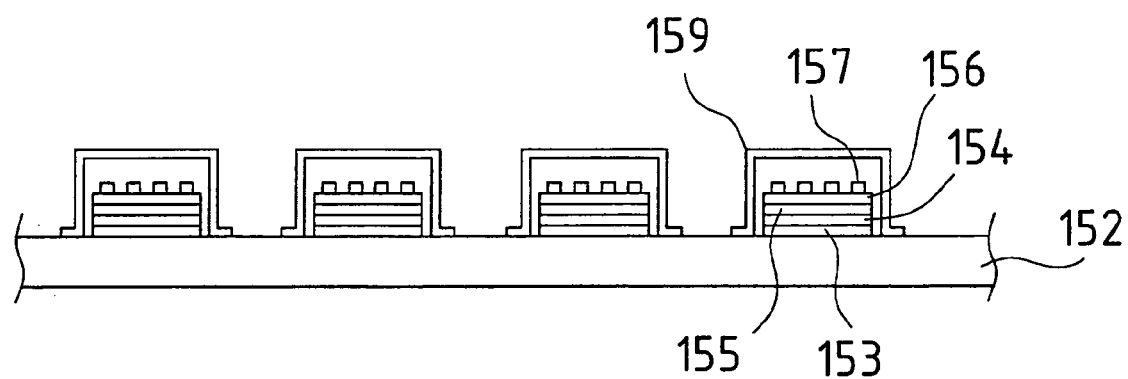
FIG. 30 is a cross-sectional view of a mother substrate formed by a plurality of organic EL display panels.
Figure 31:
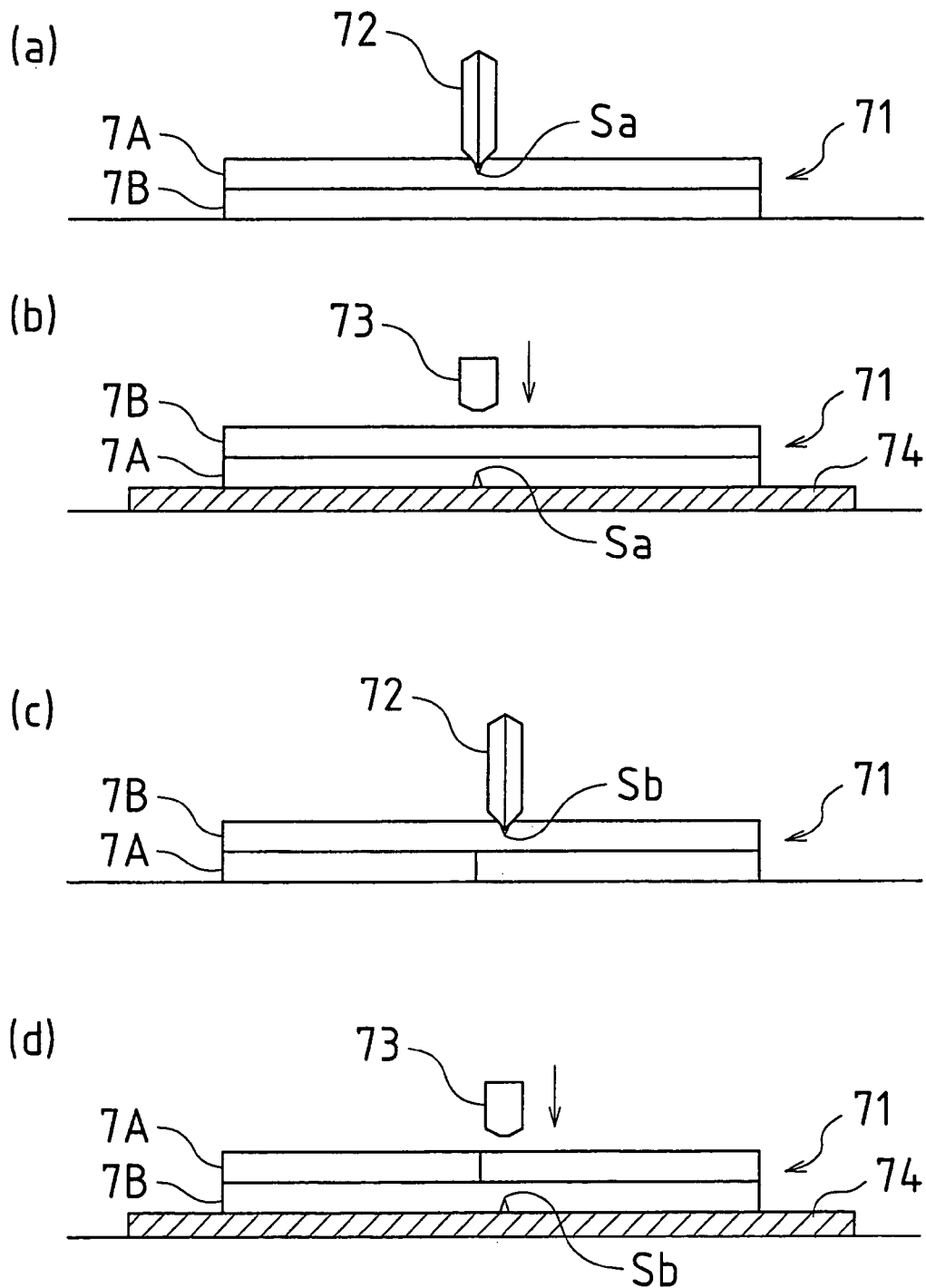
FIG. 31, consisting of FIGS. 31(a) to 31(d), is a diagram for illustrating a conventional process for severing bonded brittle material substrates.

FIG. 30 is a cross-sectional view of a mother substrate formed by a plurality of organic EL display panels, and the substrate includes a transparent glass substrate 152, on which anode layers 153 are disposed. A hole transport layer 154, an organic light-emitting layer 155 and an electron transport layer 156 are laminated in this order in each of the anode layers 153, and a cathode electrode 157 is disposed on the electron transport layer 156, which is the top layer. Then, a sealing cap 159 is provided for shielding these layers from the atmosphere, since they are extremely vulnerable to moisture. The brittle material substrate provided with a functional layer by undergoing special processing includes the above-described organic EL display panels, and the above-described anode layer 153, hole transport layer 154, organic light-emitting layer 155, electron transport layer 156, cathode electrode 157 and sealing cap 159 are regarded as functional layers 5 in the following explanation.

In the following, a case is described where at the time of severing a brittle material substrate 4 provided with a functional layer 5 by special processing, a protective material that protects the brittle material substrate 4 provided with the functional layer 5 is applied on both sides of the brittle material substrate 4 provided with the functional layer 5 and a protective film is further applied on the protective material, thus offering better protection for the surface of the single-plate brittle material substrate against scattered cullets and allowing effective removal of scattered cullets.

Ninth Embodiment

Figure 17:
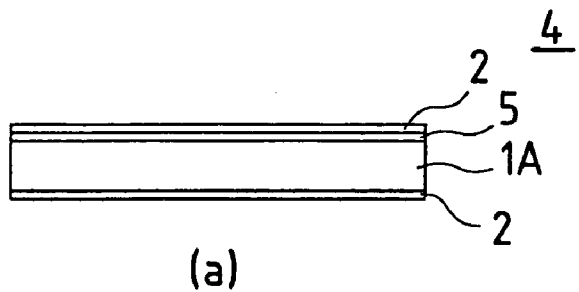
FIG. 17, consisting of FIGS. 17(a) to 17(e), is a process diagram for illustrating a ninth embodiment of the present invention.
Figure 17:
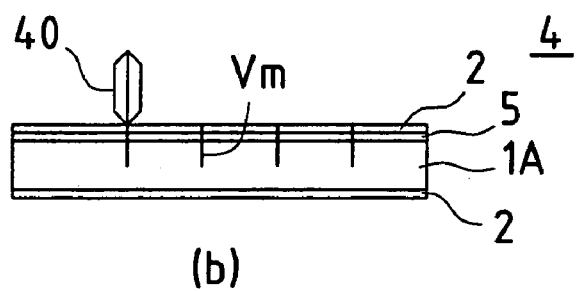
Figure 17:
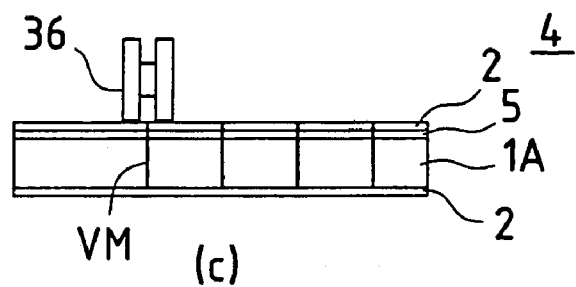
Figure 17:
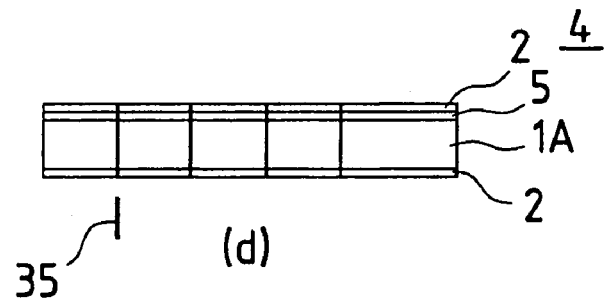
Figure 17:
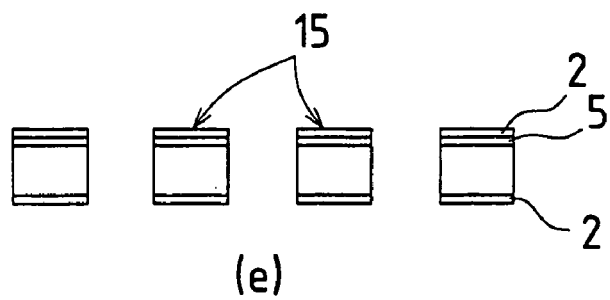
Figure 18:
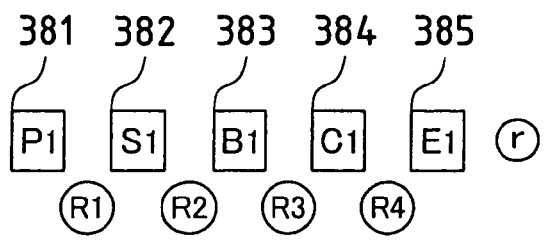
FIG. 18, consisting of FIGS. 18(a) and 18(b), is a diagram schematically showing a configuration of the component devices used in the embodiment shown in FIG. 17.
Figure 18:
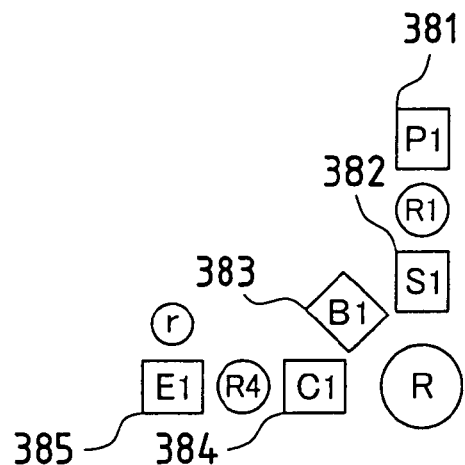

FIGS. 17(a) to (e) are process diagrams for illustrating a ninth embodiment of the present invention. FIG. 18 includes diagrams schematically showing a configuration of the devices used in such a process. FIG. 18(a) shows an example in which the devices of the process are configured in a simplified line. FIG. 18(b) is an example in which the devices are configured around a transport robot R. A functional layer 5 is provided on a surface of a glass substrate 1A, and the material of the glass of the glass plate 1A is a non-alkali glass, for example. Furthermore, the cutter wheel used is the second cutter wheel 40 shown in FIG. 25 that can achieve a vertical crack with periodically varied depths in a glass substrate.

(1) First, a protective material processing device 381 is provided with the same mechanisms as the film application mechanisms used in devices for applying polarizing plates in the manufacturing processes of liquid crystal mother glass substrates, or is a film forming device such as a spin coater that forms a film on a substrate by applying a solution of resin on the surface of the substrate while rotating the substrate, or a film forming device that forms a film using a process such as vacuum deposition, and as shown in FIG. 17(a), it forms a protective material 2 on both sides of the glass substrate 1A provided with the functional layer 5.

(2) Next, the glass substrate 1A provided with the functional layer 5 on which the protective material has been formed is transported by a transport robot R1 to a scribing device 382, and as shown in FIG. 17(b), shallow vertical cracks Vm with periodically varied depths are formed in the glass substrate 1A by scribing with the second cutter wheel 40 from the protective material 2 on the functional layer 5 side of the glass substrate 1A. By forming the vertical cracks Vm, portions of the glass substrate can be prevented from coming off from the glass substrate 1A provided with the functional layer 5 when this mother substrate is transported to later devices, and at the same time it is also possible to simplify the severing operation in the breaking process.

(3) Then, the glass substrate 1A provided with the functional layer 5 on which the scribe lines have been formed is transported in this state by a transport robot R2 to a breaking device 383.

Since there is a risk of damaging the functional layer 5 when the side of the glass substrate 1A that is provided with the functional layer 5 is brought into contact with, for example, a table surface and is held by suction, it is not possible to turn over the glass substrate 1A and to sever the glass plate 1A by pressing a breaker bar against it. For this reason, the glass substrate 1A is severed along the scribe lines by press-rolling a roller 36 shown in FIG. 17(c) along the scribe lines, since a distance of about 6 mm to about 12 mm centered at each scribe line is an area that can be brought into contact with and pressed by a member, in the vicinity of the scribe lines formed by scribing from the functional layer 5 side. The roller 36 is provided with a depression around the entire perimeter, with its outer periphery being cut out at the center, and is pressed against two areas sandwiching the each scribe line such that a force is exerted on the two areas sandwiching the scribe line in a direction opposite to the direction towards the scribe lines, thus extending the two areas. Consequently, the shallow vertical cracks Vm formed in the glass substrate 1A with periodically varied depth are elongated to vertical cracks VM, and the glass substrate 1A is severed.

(4) Then, the severed glass substrate 1A provided with the functional layer 5 is transported in this state by a transport robot R3 to a protective material cutting device 384, and as shown in FIG. 17(d), the protective material 2 on the lower side of the glass substrate 1A is cut with a film cutter 35 along the scribe lines.

(5) Next, the glass substrate 1A provided with the functional layer 5 is transported by a transport robot R4 to a separating device 385. The separating device 385 is provided with a spherically shaped table, a suction clamping means that suction-clamps and secures to the table a substrate placed on the table, a thrust-up pin that thrusts up the substrate onto the table, and a robot r that picks up a product, and as shown in FIG. 17(e), the glass substrate 1A provided with the functional layer 5 is placed on the spherically shaped table (shown as a flat-surface table in FIG. 17 in order to make the separated condition of the substrates easier to understand), and suction-clamped and secured to separate each product 15 individually. Then, a pin is thrust out from the lower side of the spherically shaped table toward the product 15, and the product 15 is supported and discharged by the robot r.

The above-described process of the ninth embodiment includes step (1) of providing the thin protective material 2 on both sides of the glass substrate 1A provided with the functional layer 5, and step (2) of performing scribing on the thin protective material 2. At this time, even if cullets are produced, they are merely scattered on the cut surface and in the vicinity of the thin protective material, and do not attach to the glass substrate 1A, and therefore it is possible to avoid causing scratches to the glass substrate 1A. Furthermore, since there is no direct contact between the glass substrate 1A and the table that supports the glass substrate 1A due to the protective material 2, the substrate surface is protected from scratching. In step (3), the scribed glass substrate 1A is placed in that state on the table of the breaking device, and the glass substrate 1A is severed with the roller 36. In step (4), the protective material 2 provided on the lower surface of the glass substrate 1A is cut from the lower surface of the glass substrate 1A along the scribe lines.

It should be noted that the protective material 2 may be formed by applying a thin film made of polyethylene on the substrate, or by forming on the substrate a protective coating appropriately selected from a resinous polyimide coating, a metal coating, an ITO coating, a resist coating, an aluminum coating and the like, depending on the application used.

Additionally, when the protective material is provided on the brittle material substrate provided with the functional layer by special processing in a process prior to the severing process of the brittle material substrate provided with the functional layer, it is possible to omit step (1) (step (a) in FIG. 17), as well as the protective material processing device 381 in FIGS. 18(a) and (b) in the ninth embodiment.

Furthermore, when the first cutter wheel 21 is used in step (2), that is, the scribing process, a deep vertical crack that almost passes through the glass substrate 1A can be formed. In this case, it is therefore possible to omit step (3) (step (c) in FIG. 17) and the breaking device 383 in FIGS. 18(a) and (b).

Furthermore, when the brittle material substrate provided with the functional layer by undergoing special processing is the mother substrate shown in FIG. 30 that is formed by a plurality of organic EL display panels, the functional layer can be protected from scattered cullets without providing the protective material on the functional layer, since the functional layer on the upper surface of the glass substrate is sealed by the sealing cap 159; accordingly, it is not necessary to provide the protective material 2 on the functional layer side of the glass substrate in FIG. 17.

Additionally, the protective material 2 on the product 15 discharged in step (5) may in some cases be peeled off in a process after the severing process of the ninth embodiment.

It should be noted that the brittle material substrate provided with a functional layer on which a protective material is provided according to the ninth embodiment can be severed with the severing apparatus and the severing system disclosed in WO 02/057192. In this case, it is possible to omit, for example, at least one of steps (c) and (d) in FIG. 17, as well as the first breaking device 383 and the protective material cutting device 384 in FIG. 18.

Tenth Embodiment

Figure 19:
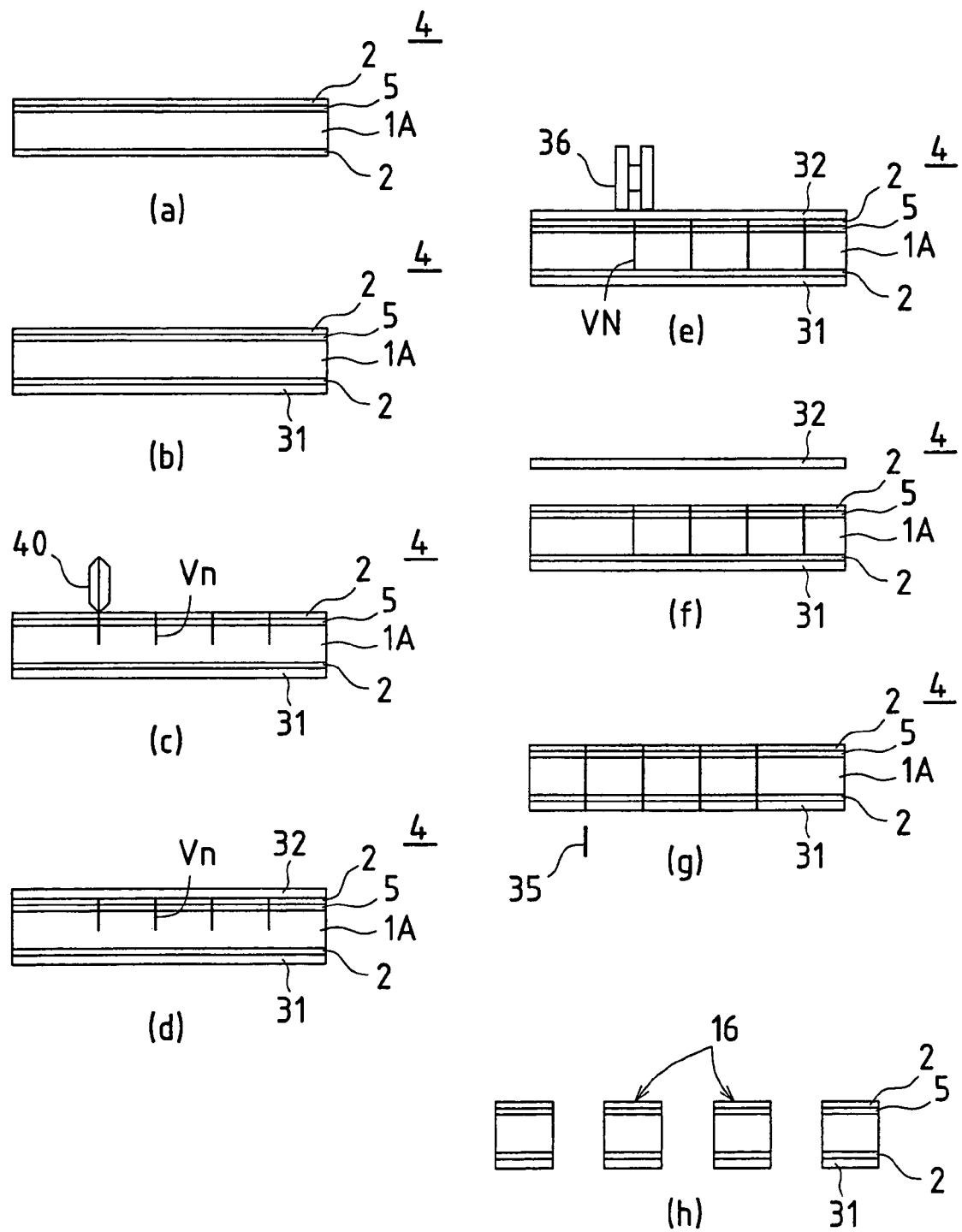
FIG. 19, consisting of FIGS. 19(a) to 19(h), is a process diagram for illustrating a tenth embodiment of the present invention.
Figure 20:
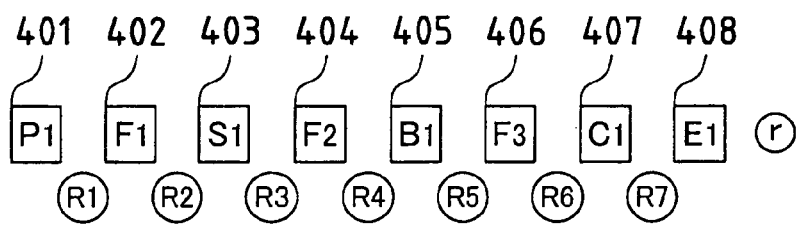
FIG. 20, consisting of FIGS. 20(a) and 20(b), is a diagram schematically showing a configuration of the component devices used in the embodiment shown in FIG. 19.
Figure 20:
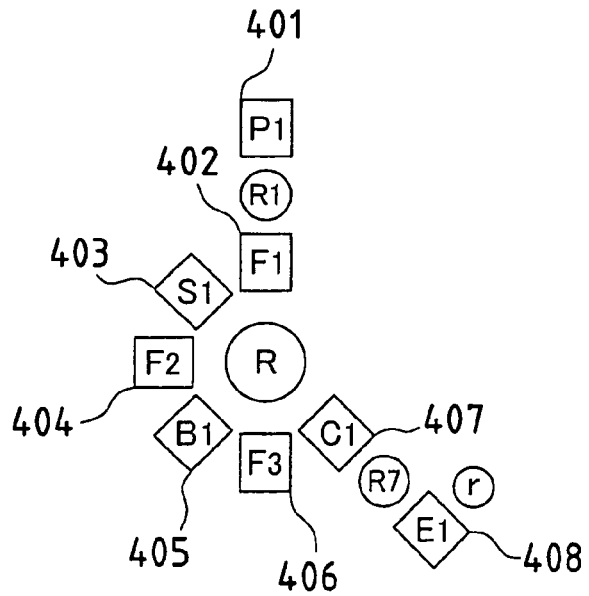

FIGS. 19(a) to (h) are process diagrams for illustrating a tenth embodiment of the present invention. FIG. 20 includes diagrams schematically showing a configuration of the devices used in such a process. FIG. 20(a) shows an example in which the devices of the process are configured in a simplified line. FIG. 20(b) is an example in which the devices are configured around a transport robot R. A functional layer 5 is provided on a surface of a glass substrate 1A, and the material of the glass of the glass plate 1A is a non-alkali glass, for example. Furthermore, the cutter wheel used is the second cutter wheel 40 shown in FIG. 25 that can achieve a vertical crack with periodically varied depths in a glass substrate.

(1) First, a protective material processing device 401 is provided with the same mechanisms as the film application mechanisms used in devices for applying polarizing plates in the manufacturing processes of liquid crystal mother glass substrates, or is a film forming device such as a spin coater that forms a film on a substrate by applying a solution of resin on the surface of the substrate while rotating the substrate, or a film forming device that forms a film using a process such as vacuum deposition, and as shown in FIG. 19(a), it forms a protective material 2 on both sides of the glass substrate 1A provided with the functional layer 5.

(2) Next, the glass substrate 1A provided with the functional layer 5 is transported by a transport robot R1 to a first film processing device 402. The first film processing device 402 is provided with the same mechanisms as the application mechanisms used in devices for applying polarizing plates in the manufacturing processes of liquid crystal mother glass substrates, and as shown in FIG. 19(b), it applies a first protective film 31 having a greater thickness and a lesser adhesive strength than the protective material 2 on the surface of the protective material 2 on the lower surface of the glass substrate 1A provided with the functional layer 5. It should be noted that the first protective film 31 has a thickness of 40 to 80 μm.

(3) Next, the glass substrate 1A provided with a functional layer 5 on which the first protective material 31 has been applied is transported by a transport robot R2 to a scribing device 403, and as shown in FIG. 19(c), shallow vertical cracks Vn with periodically varied depths are formed in the glass substrate 1A by scribing with the second cutter wheel 40 from the protective material 2 on the upper side of the glass substrate 1A. By forming the vertical cracks Vn, portions of the glass substrate can be prevented from coming off from the glass substrate 1A provided with the functional layer 5 when this mother substrate is transported to later devices, and at the same time it is also possible to simplify the severing operation in the breaking process.

(4) Then, the scribed glass substrate 1A provided with the functional layer 5 is transported by a transport robot R3 to a second film processing device 404. The second film processing device 404 is provided with the same mechanisms as the application mechanisms used in devices for applying polarizing plates in the manufacturing processes of liquid crystal mother glass substrates, and as shown in FIG. 19(d), it applies a second protective film 32 having a greater thickness and a lesser adhesive strength than the protective material 2 on the protective material 2 on the upper surface of the glass substrate 1A. Similarly to the first protective film 31, the second protective film 32 has a thickness of 40 to 80 μm.

(5) Then, the glass substrate 1A provided with a functional layer 5 on which the second protective film 32 has been applied is transported in this state by a transport robot R4 to a breaking device 405.

Since there is a risk of damaging the functional layer 5 when the functional layer 5 side of the glass substrate 1A provided with the functional layer 5 is brought into contact with, for example, a table surface and is held by suction, it is not possible to turn over the glass substrate 1A and to sever the glass plate 1A by pressing a breaker bar against it. For this reason, the glass substrate 1A is severed along the scribe lines by press-rolling a roller 36 shown in FIG. 19(e) along the scribe lines, since a distance of about 6 mm to about 12 mm centered at the scribe lines in the vicinity of the scribe lines formed from the functional layer 5 side is an area that can be brought into contact with and pressed by a member. The roller 36 is provided with a depression around the entire perimeter, with its outer periphery being cut out at the center, and is pressed against two areas sandwiching each scribe line such that a force is exerted on the two areas sandwiching the scribe line in a direction opposite to the direction towards the scribe lines, thus extending the areas. Consequently, the shallow vertical cracks Vn formed in the glass substrate 1A with periodically varied depth are elongated to vertical cracks VN, and the glass substrate 1A is severed.

(6) Then, the severed glass substrate 1A provided with the functional layer 5 is transported in this state by a transport robot R5 to a third film processing device 406. In the third film processing device 406, one corner of the second protective film 32 is held by suction with a suction pad of a robot provided with at least one suction pad, and the suction pad is moved in a direction diagonal to the glass substrate 1A and also moved up, thus peeling off the second protective film 32.

(7) Then, the glass substrate 1A provided with the functional layer 5 is transported in this state by a transport robot R6 to a protective material cutting device 407, and as shown in FIG. 19(g), the protective material 2 on the lower side of the glass substrate 1A and the first protective film 31 are cut with a film cutter 35 along the scribe lines.

(8) Next, the glass substrate 1A provided with the functional layer 5 is transported by a transport robot R7 to a separating device 408. The separating device 408 is provided with a spherically shaped table, a suction clamping means that suction-clamps and secures to the table a substrate placed on the table, a thrust-up pin that thrusts up the substrate onto the table, and a robot r that picks up a product, and as shown in FIG. 19(h), the glass substrate 1A provided with the functional layer 5 is placed on the spherically shaped table (shown as a flat-surface table in FIG. 19 in order to make the separated condition of the substrates easier to understand), and suction-clamped and secured to separate each product 16 individually. Then, a pin is thrust out from the lower side of the spherically shaped table toward the product 16, and the product 16 is supported and discharged by the robot r.

The above-described process of the tenth embodiment includes step (1) of applying the protective material 2 on both sides of the glass substrate 1A provided with a functional layer 5, step (2) of applying the first protective film 31 on the surface of the protective material on the lower surface of the glass substrate 1A provided with the functional layer 5, and step (3) of performing scribing on the protective material. At this time, even if cullets are produced, they are merely scattered on the cut surface and in the vicinity of the thin film 2, and do not attach to the glass substrate 1A, and therefore it is possible to avoid causing scratches to the glass substrate 1A. Furthermore, the first protective film 31 is applied on the lower side of the glass substrate. Since there is no direct contact during scribing between the glass substrate 1A and the table that supports the glass substrate 1A provided with the functional layer 5 due to the first protective film 31 positioned on the lower surface of the glass substrate 1A provided with a functional layer 5, the substrate surface is protected from scratching. In step (4), the second protective film 32 is applied on the protective material 2 on the functional layer side of the glass substrate 1A provided with a functional layer 5, and in step (5), the glass substrate 1A provided with the functional layer 5 on which the second protective film 32 has been applied is placed in that state on the table of the breaking device, and the glass substrate 1A is severed with the roller 36. In step (6), the protective material 2 does not peel off from the glass substrate 1A provided with a functional layer 5 even when the second protective film 32 is peeled off, since the adhesive strength of the second protective film 32 is less than the protective material 2 directly below. In step (7), the protective material 2 on the lower side of the glass substrate 1A and the first protective film 31 are cut with the film cutter 35 along the scribe lines.

It should be noted that the protective material 2 may be formed by applying a thin film made of polyethylene on the substrate, or by forming on the substrate a protective coating appropriately selected from a resinous polyimide coating, a metal coating, an ITO coating, a resist coating, an aluminum coating and the like, depending on the application used.

Further, it is preferable to use polyethylene as the material of the protective film.

Furthermore, when the protective material is provided on the brittle material substrate provided with the functional layer by special processing in a process prior to the severing process of the brittle material substrate provided with the functional layer, it is possible to omit step (1) (step (a) in FIG. 19), as well as the protective material processing device 401 in FIGS. 20(a) and (b) in the tenth embodiment.

Furthermore, when the first cutter wheel 21 is used in step (3), that is, the scribing process, a deep vertical crack that almost passes through the glass substrate 1A can be formed. In this case, it is therefore possible to omit step (4) (step (d) in FIG. 19), step (5) (step (e) in FIG. 19) and step (6) (step (f) in FIG. 19), as well as the second film processing device 404, the breaking device 405 and the third film processing device 406 in FIGS. 20(a) and (b).

Additionally, the protective material 2 on the product 16 discharged in step (8) may in some cases be peeled off in a process after the severing process of the tenth embodiment.

Furthermore, when the protective material 2 is a thin film and the adhesive strength of the first protective film 31 and the second protective film 32 is greater than the adhesive strength of the thin film to the substrate, the thin film that is the protective material 2 peels off from the glass substrate 1A provided with a functional layer 5 at the time of peeling off the second protective film 32 in step (f) in FIG. 19, and at the time of discharging the product 16 in step (h) in FIG. 19; therefore, a plurality of severed glass substrates provided with the functional layer are obtained as the final products in the severing process.

Furthermore, when the brittle material substrate provided with a functional layer by undergoing special processing is the mother substrate formed by a plurality of organic EL display panels shown in FIG. 30, the functional layer can be protected from scattered cullets without applying the protective material 2 and the second protective film 32 on the functional layer, since the functional layer on the upper surface of the glass substrate is sealed by the sealing cap 159; accordingly, it is not necessary to provide the protective material 2 and the second protective film on the functional layer side of the glass substrate in FIGS. 19(a) to (h), and it is possible to omit steps (4) and (6).

It should be noted that the brittle material substrate provided with the functional layer provided on which the protective material is provided according to the tenth embodiment can be severed with the severing apparatus and the severing system disclosed in WO 02/057192. In this case, it is possible to omit, for example, at least one of steps (b), (d), (e), (f) and (g) in FIG. 19, as well as the first film device 402, the second film device 404, the first breaking device 405, the third film device 406 and the protective material cutting device 407 in FIG. 20.

Eleventh Embodiment

Figure 21:
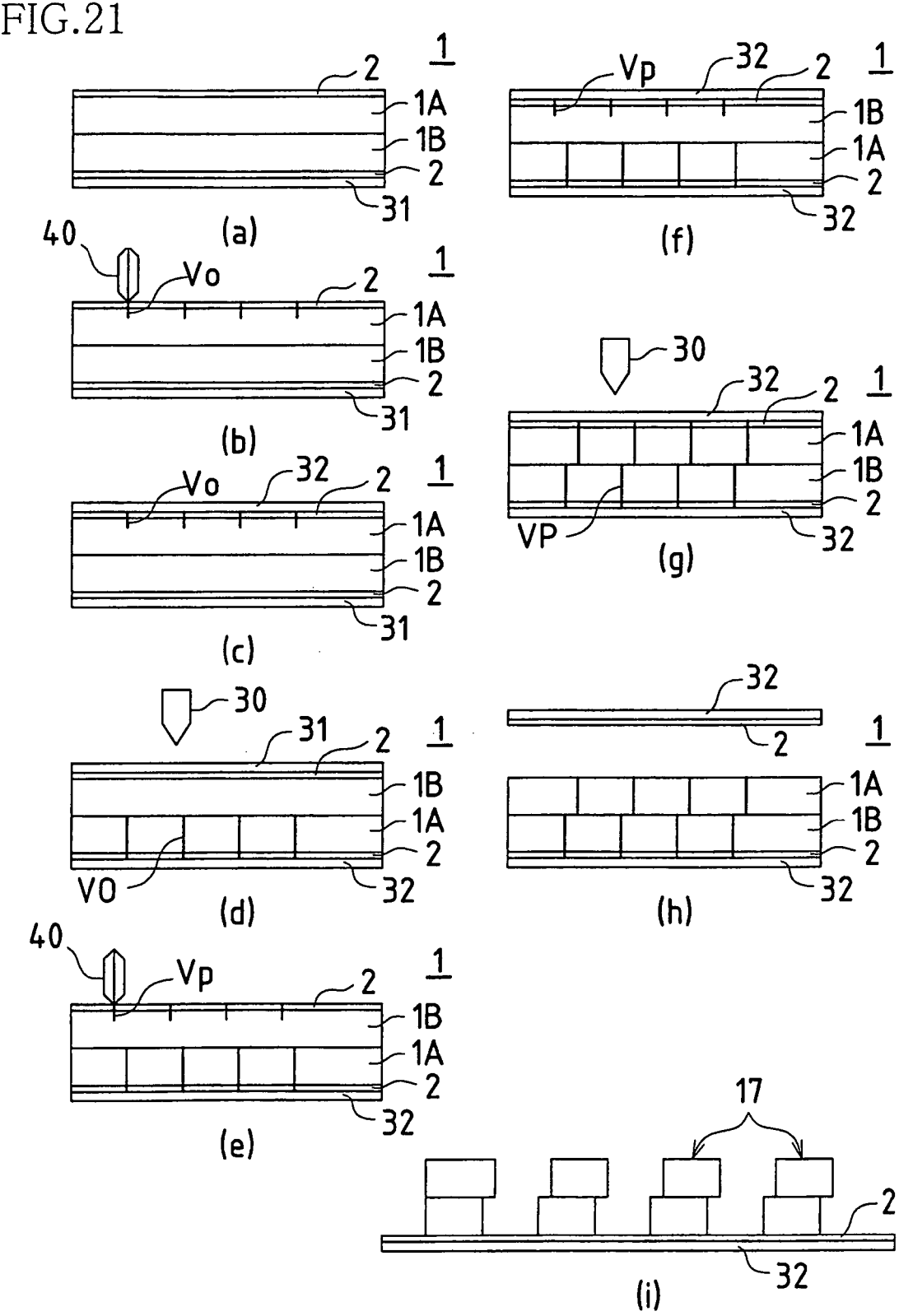
FIG. 21, consisting of FIGS. 21(a) to 21(i), is a process diagram for illustrating an eleventh embodiment of the present invention.
Figure 22:
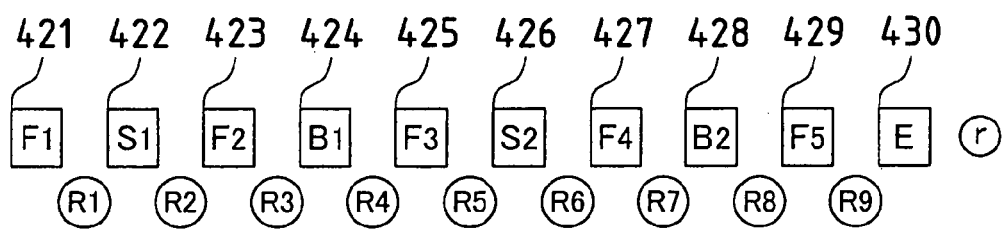
FIG. 22, consisting of FIGS. 22(a) and 22(b), is a diagram schematically showing a configuration of the component devices used in the embodiment shown in FIG. 21.
Figure 22:
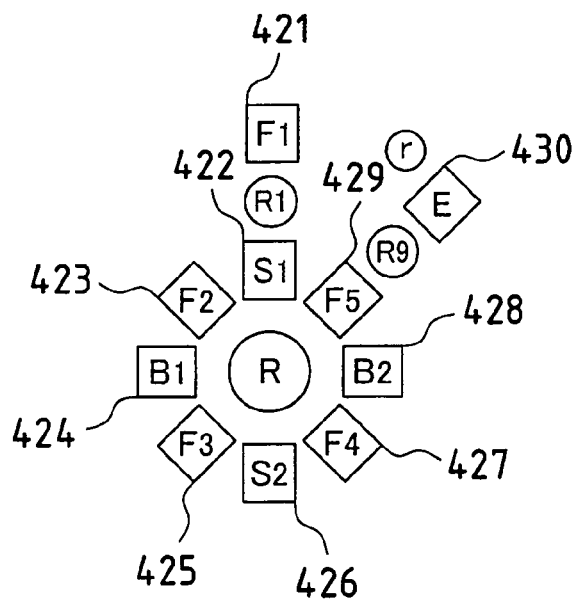

FIGS. 21(a) to (h) are process diagrams for illustrating an eleventh embodiment of the present invention. FIG. 22 includes diagrams schematically showing a configuration of the devices used in such a process. FIG. 22(a) shows an example in which the devices of the process are configured in a simplified line. FIG. 22(b) is an example in which the devices are configured around a transport robot R. The present invention is applied on a process of severing a flat display panel mother glass substrate 1, which is one kind of a brittle material substrate. The glass substrate on one side of the flat display panel mother glass substrate 1 is a glass substrate 1A, and the glass substrate on the other side is a glass substrate 1B, and the material of the glass of the glass substrate 1A and the glass substrate 1B is a non-alkali glass, for example. Furthermore, the cutter wheel used is the second cutter wheel 40 shown in FIG. 25 that can achieve a vertical crack with periodically varied depths in a glass substrate.

(1) First, a first film processing device 421 is provided with the same mechanisms as the film application mechanisms used in devices for applying polarizing plates in the manufacturing processes of liquid crystal mother glass substrates, and as shown in FIG. 21(a), it applies a thin film of a thin protective material 2 on both sides of the flat display panel mother glass substrate 1. It is preferable that the thin film of the thin protective material 2 is applied immediately after performing various processings required for FPD applications on the surface of the above-described substrate and prior to severing, and that it has a thickness of approximately 10 μm. Furthermore, it applies a first protective film 31 having a greater thickness and a lesser adhesive strength than the thin film of the thin protective material 2 on the thin film of the thin protective material 2 on the lower layer glass substrate 1B side. It should be noted that the first protective film 31 has a thickness of 40 to 80 μm.

(2) Next, the flat display panel mother glass substrate 1 is transported by a transport robot R1 to a first scribing device 422, and as shown in FIG. 21(b), shallow vertical cracks Vo with periodically varied depths are formed in the upper layer glass substrate 1A by scribing with the second cutter wheel 40 from the side of the thin film of the thin protective material 2 on the upper layer glass substrate side. By forming the vertical cracks Vo, portions of the glass substrate can be prevented from coming off from the flat display panel mother glass substrate 1 when this mother glass substrate is transported to later devices, and at the same time it is also possible to simplify the severing operation in the breaking process.

(3) Then, the flat display panel mother glass substrate 1 on which the first protective film 31 has been applied is transported by a transport robot R2 to a second film processing device 423. The second film processing device 423 is provided with the same mechanisms as the application mechanisms used in devices for applying polarizing plates in the manufacturing processes of liquid crystal mother glass substrates, and as shown in FIG. 21(c), it applies a second protective film 32 having a greater thickness and a greater adhesive strength than the thin film of the thin protective material 2 on the upper layer glass substrate 1A. Similarly to the first protective film 31, the second protective film 32 has a thickness of 40 to 80 μm.

(4) Furthermore, the flat display panel mother glass substrate 1 is turned over such that the glass substrate 1A becomes the lower layer, and is transported by a transport robot R3 to a first breaking device 424, and by applying pressure to the glass substrate 1B side with the breaker bar 30 as shown in FIG. 21(d), the shallow vertical cracks Vo with periodically varied depths formed in the glass substrate 1A are elongated to vertical cracks VO, and the glass substrate 1A is severed.

(5) Then, the flat display panel mother glass substrate 1 is transported by a transport robot R4 to a third film processing device 425, and one corner of the first protective film 31 is held by suction with a suction pad of a robot provided with at least one suction pad, and the suction pad is moved in a direction diagonal to the flat display panel mother glass substrate 1 and also moved up, thus peeling off the first protective film 31.

(6) Next, the flat display panel mother glass substrate 1 is transported by a transport robot R5 to a second scribing device 426, and by scribing the glass substrate 1B of the flat display panel mother glass substrate 1 from which the first protective film 31 has been peeled off, with the second cutter wheel 40 from the side of the thin film of the thin protective material 2 as shown in FIG. 21(e), shallow vertical cracks Vp with periodically varied depths are formed in the glass substrate 1B positioned as the upper layer. By forming the vertical cracks Vp, portions of the glass substrate can be prevented from coming off from the flat display panel mother glass substrate when this mother glass substrate is transported to later devices.

(7) Then, the flat display panel mother glass substrate 1 is transported by a transport robot R6 to a fourth film processing device 427. The fourth film processing device 427 is provided with the same mechanisms as the application mechanisms used in devices for applying polarizing plates in the manufacturing processes of liquid crystal mother glass substrates, and as shown in FIG. 21(f), it further applies a second protective film 32 on the thin film of the thin protective material 2 on the glass substrate 1B positioned as the upper layer.

(8) Furthermore, the flat display panel mother glass substrate 1 is turned over such that the glass substrate 1B becomes the lower layer, and is transported by a transport robot R7 to a second breaking device 428, and by applying pressure to the glass substrate 1A side that is positioned as the upper layer with the breaker bar 30 as shown in FIG. 21(g), the shallow vertical cracks Vp with periodically varied depths formed in the glass substrate 1B are elongated to vertical cracks VP, and the glass substrate 1B is severed.

(9) Next, the flat display panel mother glass substrate 1 is transported by a transport robot R8 to a fifth film processing device 429, and as shown in FIG. 21(h), one corner of the second protective film 32 applied on the glass substrate 1A is held by suction with a suction pad of a robot provided with at least one suction pad, and the suction pad is moved in a direction diagonal to the flat display panel mother glass substrate and also moved up, thus peeling off the second protective film 32 from the glass substrate 1A positioned as the upper layer, together with the thin film of the thin protective material 2.

(10) Next, the flat display panel mother glass substrate 1 is transported by a transport robot R9 to a separating device 430. The separating device 430 is provided with a spherically shaped table, a suction clamping means that suction-clamps and secures to the table a substrate placed on the table, a thrust-up pin that thrusts up the substrate onto the table, and a robot r that picks up a product, and as shown in FIG. 21(*i*), the flat display panel mother glass substrate 1 is placed on the spherically shaped table (shown as a flat-surface table in FIG. 21 in order to make the separated condition of the substrates easier to understand), and suction-clamped and secured to separate each product 17 individually, along the vertical cracks VO and VP. Then, although not shown in the figure, UV light is irradiated to weaken the adhesive strength of the second protective film 32 and the thin film of the protective material 2 that are applied on the glass substrate 1B, and a pin thrusts out from the lower side of the spherically shaped table toward the product 17, and the product 17 is supported and discharged by the robot r.

The above-described process of the eleventh embodiment includes step (1) of applying the thin film of the thin protective material 2 on both sides of the flat display panel mother glass substrate 1, and step (2) of performing scribing on the thin film of the thin protective material 2. At this time, even if cullets are produced, they are merely scattered on the cut surface and in the vicinity of the thin film of the thin protective material 2, and do not attach to the glass substrate 1A, and therefore it is possible to avoid causing scratches to the glass substrate 1A. Furthermore, the first protective film 31 is applied on the glass substrate on the lower side, and since there is no direct contact during scribing between the glass substrate 1B and the table that supports the flat display panel mother glass substrate due to the first protective film 31 positioned on the lower surface of the flat display panel mother glass substrate 1, the substrate surface is protected from scratching. In step (3), the second protective film is applied on the glass substrate 1A, and in step (4), the flat display panel mother glass substrate is turned over such that the glass substrate 1A becomes the lower layer, and then placed on the table of the first breaking device, and the glass substrate 1A is severed with the breaker bar 30. In step (5), the thin film of the thin protective material 2 does not peel off from the glass substrate 1B although the protective film 31 is peeled off, since the adhesive strength of the first protective film 31 is less than that of the thin film of the thin protective material 2 directly below. In step (7), the second protective film 32 is applied on the glass substrate 1B, and by turning over the flat display panel mother glass substrate 1 in this state, the second protective film 32 is positioned on the lower surface of the flat display panel mother glass substrate 1, and since there is no direct contact between the glass substrate 1A and the table that supports the flat display panel mother substrate due to the second protective film 32, the substrate surface is protected from scratching. Furthermore, in step (9), when the second protective film that has been applied is peeled off from the glass substrate 1A, the second protective film 32 peels off from the glass substrate 1A together with the thin protective material 2 directly below, since the adhesive strength of the second protective film 32 is greater than that of the thin film of the thin protective material 2 directly below. By this step, the cullets remaining on the glass substrate 1A are removed together with the second protective film 32.

Twelfth Embodiment

In the following, an embodiment is described in which the present invention is applied to a method of severing a reflective-type projector substrate, which is one kind of a brittle material substrate, formed by bonding together a glass substrate and a silicon substrate facing each other. The glass substrate on one side of the reflective-type projector substrate is a glass substrate 1A, and the silicon substrate on the other side is silicon substrate 1C, and the material of the glass of the glass substrate 1A is a non-alkali glass, for example. Furthermore, the cutter wheel used is the second cutter wheel 40 shown in FIG. 25 that can produce a vertical crack in which the depth of the crack is periodically varied within a glass substrate.

The vertical cracks obtained at the time of scribing the silicon substrate 1C with the second cutter wheel 40 shown in FIG. 25 are continuously shallow.

Accordingly, the severing process under the above-described conditions is the same as the severing process of FIG. 21 in which the first embodiment is shown, except that the silicon substrate 1C is substituted for the glass substrate 1B in FIG. 21. For this reason, the description of the severing process will be omitted here.

Thirteenth Embodiment

In the following, an embodiment is described in which the present invention is applied to a process of severing a transmissive-type projector substrate, which is one kind of a brittle material substrate, formed by bonding together a glass substrate and a glass substrate facing each other. The glass substrate on one side of the transmissive-type projector substrate is a glass substrate 1A, and the glass substrate on the other side is a glass substrate 1B, and the material of the glass of the glass substrate 1A and the glass substrate 1B is quartz glass, for example. Furthermore, the cutter wheel used is the first cutter wheel 21 shown in FIG. 23, or the second cutter wheel 40 shown in FIG. 25.

As the material of the glass substrate 1A and the glass substrate 1B shown in FIG. 21 is a rigid, brittle material such as quartz, the vertical cracks formed during scribing are different from the shallow cracks with periodically varied depths formed in the first embodiment, and are continuously shallow.

The severing process under the above-described conditions is the same as the severing process of FIG. 21 in which the eleventh embodiment is shown. For this reason, the description of the severing process will be omitted here.

Fourteenth Embodiment

In the following, an embodiment is described in which the present invention is applied to a method of severing a reflective-type projector substrate, which is one kind of a brittle material substrate, formed by bonding together a glass substrate and a silicon substrate facing each other. The glass substrate on one side of the reflective-type projector substrate is a glass substrate 1A, and the silicon substrate on the other side is silicon substrate 1C, and the material of the glass of the glass substrate 1A is quartz glass, for example. Furthermore, the cutter wheel used is the first cutter wheel 21 shown in FIG. 23 or the second cutter wheel 40 shown in FIG. 25.

Since the material of the glass substrate 1A shown in FIG. 21 is a rigid, brittle material such as quartz, the vertical cracks formed during the scribing of the glass substrate 1A are different from the shallow vertical cracks with periodically varied depths formed in the eleventh embodiment, and are continuously shallow, and the vertical cracks formed in the silicon substrate 1C are also continuously shallow.

Accordingly, the severing process under the above-described conditions is the same as the severing process of FIG.

21 in which the eleventh embodiment is shown. For this reason, the description of the severing process will be omitted here.

Fifteenth Embodiment

In the following, an embodiment is described in which the present invention is applied to a method of severing a flat display panel mother glass substrate 1 formed by bonding together glass substrates that are one kind of a brittle material substrate. The glass substrate on one side of the flat display panel mother glass substrate 1 is a glass substrate 1A, and the glass substrate on the other side is a glass substrate 1B, and the material of the glass of the glass substrate 1A and the glass substrate 1B is a non-alkali glass, for example. Furthermore, the cutter wheel used is the first cutter wheel 21 shown in FIG. 23 that can produce long vertical cracks that almost pass through the glass substrate in the thickness direction.

The severing process under the above-described conditions does not require steps (d) and (g) from FIG. 21 in which the severing process of the eleventh embodiment is shown, and the upper and lower positions of the glass substrates 1A and 1B are swapped in steps (h) and (i), with the glass substrate 1B becoming the upper layer substrate, and the glass substrate 1A becoming the lower layer substrate. Furthermore, long vertical cracks that almost pass through the glass substrate 1A and the glass substrate 1B in the thickness direction can be obtained in steps (b) and (e) (the scribing processes).

Sixteenth Embodiment

In the following, an embodiment is described in which the present invention is applied to a method of severing a reflective-type projector substrate, which is one kind of a brittle material substrate, formed by bonding together a glass substrate and a silicon substrate facing each other. The substrate on one side of the reflective-type projector substrate 11 is a glass substrate 1A, and the substrate on the other side is silicon substrate 1C, and the material of the glass of the glass substrate 1A is a non-alkali glass, for example. Furthermore, the cutter wheel used is the first cutter wheel 21 shown in FIG. 23 that can produce long vertical cracks that almost pass through the glass substrate in the thickness direction.

Long vertical cracks that almost pass through the glass substrate in the thickness direction are obtained when the glass substrate 1A is scribed under the above-described conditions, whereas continuously shallow vertical cracks are obtained when the silicon substrate 1C is scribed.

In the severing process under the above-described conditions, the silicon substrate 1C is substituted for the glass substrate 1B in FIG. 21 in which the severing process of the eleventh embodiment is shown, and in step (a), the thin film of the thin protective material 2 and the first protective film 31 that are applied on the silicon substrate 1C are omitted. Also, steps (d), (f), and (h) are unnecessary, and from step (g), the projector substrate is turned over and placed on a table of a separating device.

Furthermore, in the example shown in the sixteenth embodiment, the silicon substrate 1C is scribed and broken after the glass substrate 1A is scribed; however, the glass substrate 1A may be scribed after the silicon substrate 1C is scribed and broken first.

Further still, in order to reduce to a minimum the influence of cullets produced during scribing, it is preferable that a thin film or protective film is applied as procedurally appropriate on the surface of the silicon substrate 1C as well.

Although polyethylene is used in the present invention as the material for the thin film of the thin protective material 2, the first protective film 31, the second protective film 32 and the third protective film 33, a film material other than polyethylene may be used, as long as it has elasticity.

In accordance with the process for severing a flat display panel mother glass substrate shown in the eleventh embodiment, FIG. 22(a) is a diagram showing severing equipment for a bonded brittle material substrate, with the equipment included in this severing process arranged in a straight line. The actions of this severing equipment will be omitted since these have already been described in the description of the steps of the eleventh embodiment.

Furthermore, when there is an unnecessary step such as in the fifteenth embodiment and the sixteenth embodiment, the processing device for the unnecessary step and the transport robot that transports to that processing device are excluded from the automatic severing equipment line shown in FIG. 22(a).

In FIG. 22(b), the various processing devices of the severing equipment shown in FIG. 22(a) are arranged in a cluster-type configuration, with eight processing devices, from the first scribing device 422 to the fifth film processing device 429, arranged in a circle. Transport between the eight processing devices is performed by a single transport robot R, while the transport from the first film processing device 421 to the first scribing device 422 is performed by a transport robot R1, and the transport from the fifth film processing device 429 to the separating device 430 is performed by a transport robot R9.

In FIG. 22(b), the eight processing devices from the scribing device 422 to the fifth film processing device 429 are ordered in a counter-clockwise configuration, but in order to improve the processing cycle time of the automatic severing equipment line, and to restrict the facility space of each device in the configuration that makes up the line equipment, the eight processing devices do not necessarily need to be arranged in this order. Furthermore, when there is an unnecessary step such as in the fifteenth embodiment and the sixteenth embodiment, the processing device for the unnecessary step and the transport robot that transports to that processing device do not have to be included in equipment configuration of the automatic severing equipment line shown in FIG. 22(b).

It should be noted that the bonded brittle material substrate provided with a thin film (protective material) according to the thirteenth to the sixteenth embodiment can be severed with the severing apparatus and the severing system disclosed in WO 02/057192. In this case, it is possible to omit, for example, at least one of steps (a), (c), (d), (f), (g) and (h) in FIG. 21, as well as the first film processing device 421, the second film processing device 423, the first breaking device 424, the third film processing device 425, the fourth film processing device 427, the second breaking device 428 and the fifth film processing device 429 in FIG. 22.

INDUSTRIAL APPLICABILITY

As described above, with the method for severing a brittle material substrate and the severing apparatus using the method according to the present invention, cullets produced in the scribing process do not attach to a brittle material substrate and thus do not cause scratching to the brittle material substrate. The method and the apparatus are useful in that they can provide highly reliable products as a result. Furthermore, they are also useful in that they make it possible to perform severing in accordance with the material characteristics of a brittle material substrate on which a film is applied, and to change as appropriate the form in which vertical cracks are produced, thus achieving highly reliable products with high yield.

The invention claimed is:

1. A method for severing a brittle material substrate by inscribing a scribe line on a brittle material substrate, while simultaneously forming a vertical crack extending from the scribe line in a thickness direction of the brittle material substrate, wherein the scribe line is formed with a scribe head comprising a cutter wheel with grooves formed in a blade-edge ridge thereof and a tip holder that rotatably supports the cutter wheel; and wherein the method comprises a first scribing step of pressing and rolling the cutter wheel on a protective material by moving the tip holder in a horizontal direction, in a state in which the protective material is provided on at least one substrate surface of the brittle material substrate, thereby inscribing a scribe line on the brittle material substrate, while simultaneously forming a vertical crack extending from the scribe line in a thickness direction of the brittle material substrate, and wherein rolling the cutter wheel on the protective material comprises moving the cutter wheel along a surface of the protective material by rotation without sliding.

2. The method for severing a brittle material substrate according to claim 1, further comprising a protective material processing step of providing a protective material on at least one substrate surface of the brittle material substrate, before the scribing step.

3. The method for severing a brittle material substrate according to claim 1 or 2, wherein the brittle material substrate is a single-plated brittle material substrate.

4. The method for severing a brittle material substrate according to claim 3, further comprising a breaking step of breaking the brittle material substrate, after the scribing step.

5. The method for severing a brittle material substrate according to claim 4, further comprising a protective material cutting step of cutting the protective material, after the breaking step.

6. The method for severing a brittle material substrate according to claim 3, wherein the protective material is provided on both sides of the brittle material substrate, and wherein the method further comprises a protective material cutting step of cutting the protective material on a non-scribed side of the brittle material substrate, after the scribing step.

7. The method for severing a brittle material substrate according to claim 3, further comprising a first film processing step of applying a first protective film on the protective material on the side of a first substrate surface that has been scribed, after the scribing step and before breaking the brittle material substrate.

8. The method for severing a brittle material substrate according to claim 7, further comprising a breaking step of breaking the brittle material substrate, after applying the first protective film.

9. The method for severing a brittle material substrate according to claim 8, further comprising a third film processing step of peeling off the second protective film, after the breaking step.

10. The method for severing a brittle material substrate according to claim 3, further comprising a second film processing step of applying a second protective film on a second substrate surface that is different from the first substrate surface that is to be scribed, before the scribing step.

11. The method for severing a brittle material substrate according to claim 10, further comprising a protective material cutting step of cutting the protective material and/or the protective film provided on the second substrate surface.

12. The method for severing a brittle material substrate according to claim 1 or 2, wherein the brittle material substrate is a bonded brittle material substrate formed by bonding together a first substrate and a second substrate.

13. The method for severing a brittle material substrate according to claim 12, wherein the scribe line is formed with a scribe head comprising a cutter wheel with grooves formed in a blade-edge ridge thereof and a tip holder that rotatably supports the cutter wheel, and wherein the method further comprises, before scribing the first substrate in the first scribing step, a second scribing step of pressing and rolling the cutter wheel on a protective material by moving the tip holder in a horizontal direction, in a state in which the protective material is provided on a surface of at least one of the first substrate and the second substrate, thereby inscribing a scribe line on the second substrate, while simultaneously forming a vertical crack extending from the scribe line in a thickness direction of the brittle material substrate.

14. The method for severing a brittle material substrate according to claim 13, further comprising a first breaking step of breaking the second substrate, after scribing the second substrate in the first scribing step.

15. The method for severing a brittle material substrate according to claim 13, further comprising a second breaking step of breaking the first substrate, after scribing the first substrate in the first scribing step.

16. The method for severing a brittle material substrate according to claim 15, further comprising a second film processing step of applying a second protective film on the second substrate, after scribing the second substrate in the second scribing step and before breaking the scribed second substrate in the first breaking step.

17. The method for severing a brittle material substrate according to claim 15, further comprising a third film processing step of applying a third protective film on the first substrate, after scribing the first substrate in the first scribing step and before breaking the first substrate in the first breaking step.

18. The method for severing a brittle material substrate according to claim 13, further comprising: a first film processing step of applying a first protective film on the second substrate, before scribing the second substrate in the second scribing step; and a second film processing step of peeling off the first protective film from the second substrate, before scribing the first substrate in the first scribing step.

19. The method for severing a brittle material substrate according to claim 1 or 2, wherein the brittle material substrate is a brittle material substrate provided with a functional layer.

20. The method for severing a brittle material substrate according to claim 19, further comprising a breaking step of breaking the brittle material substrate provided with the functional layer, after the scribing in the first scribing step.

21. The method for severing a brittle material substrate according to claim 20, wherein the protective material is provided on both sides of the brittle material substrate, and wherein the method further comprises a protective material cutting step of cutting the protective material on a non-scribed side of the brittle material substrate, after breaking the brittle material substrate provided with the functional layer in the breaking step.

22. The method for severing a brittle material substrate according to claim 19, further comprising: a first film processing step of applying a first protective film on a surface of the brittle material substrate provided with the functional layer that is different from a surface on which the functional layer is provided, before the scribing in the first scribing step; and a protective material cutting step of cutting the protective material and/or the first protective film.

23. The method for severing a brittle material substrate according to claim 22, further comprising a breaking step of breaking the brittle material substrate provided with the functional layer, after the scribing in the first scribing step.

24. The method for severing a brittle material substrate according to claim 23, further comprising: a second film processing step of applying a second protective film on that surface of the brittle material substrate provided with the functional layer on which the functional layer is provided, after the scribing in the first scribing step and before breaking the brittle material substrate provided with the functional layer in the breaking step; and a third film processing step of peeling off the second protective film, after breaking the brittle material substrate provided with the functional layer in the breaking step.

25. The method for severing a brittle material substrate according to claim 19, wherein the functional layer is a protective material also having a function to protect the brittle material substrate.

26. The method for severing a brittle material substrate according to claim 1, wherein the protective material provided on a surface of the brittle material substrate is a film.

27. The method for severing a brittle material substrate according to claim 1, wherein the protective material provided on a surface of the brittle material substrate is a coating.

28. The method for severing a brittle material substrate according to claim 1,
wherein the cutter wheel with grooves formed in the ridge thereof has protrusions, and the protrusions are brought into contact with the brittle material substrate while applying intermittent shocks to the brittle material substrate, at the time of inscribing the scribe line on the brittle material substrate by pressing and rolling on the protective material, thereby facilitating inscribing of the scribe line.

29. The method for severing a brittle material substrate according to claim 1,
wherein rolling the cutter wheel on the protective material comprises rolling manually the cutter wheel along the surface of the protective material.

30. A severing apparatus for a brittle material substrate that inscribes a scribe line on a brittle material substrate while simultaneously forming a vertical crack extending from the scribe line in a thickness direction of the brittle material substrate,
wherein the scribe line is formed with a scribe head comprising a cutter wheel with grooves formed in a blade-edge ridge thereof and a tip holder that rotatably supports the cutter wheel, and
wherein the apparatus comprises a first scribing device that presses and rolls the cutter wheel on a protective material by moving the tip holder in a horizontal direction, in a state in which the protective material is provided on at least one substrate surface of the brittle material substrate, thereby inscribing a scribe line on the brittle material substrate, while simultaneously forming a vertical crack extending from the scribe line in a thickness direction of the brittle material substrate, and
wherein the cutter wheel is configured to move alone a surface of the protective material by rotation without sliding.

31. The severing apparatus for a brittle material substrate according to claim 30, further comprising a protective material processing device that applies the protective material on at least one substrate surface of the brittle material substrate.

32. The severing apparatus for a brittle material substrate according to claim 30 or 31, wherein the brittle material substrate is a single-plate brittle material substrate.

33. The severing apparatus for a brittle material substrate according to claim 32, further comprising a breaking step of breaking the brittle material substrate.

34. The severing apparatus for a brittle material substrate according to claim 33, further comprising a protective material cutting device that cuts the protective material.

35. The severing apparatus for a brittle material substrate according to claim 32, further comprising a protective material cutting device that cuts the protective material.

36. The severing apparatus for a brittle material substrate according to claim 32, further comprising a first film processing device that applies a first protective film on a first substrate surface that is to be scribed.

37. The severing apparatus for a brittle material substrate according to claim 36, further comprising a breaking device that breaks the brittle material substrate.

38. The severing apparatus for a brittle material substrate according to claim 32, further comprising a second film processing device that applies a second protective film on a second substrate surface that is different from the first substrate surface.

39. The severing apparatus for a brittle material substrate according to claim 38, further comprising a third film processing device that peels off the second protective film.

40. The severing apparatus for a brittle material substrate according to claim 38, further comprising a protective material cutting device that cuts the protective material and/or the protective film provided on the second substrate surface.

41. The severing apparatus for a brittle material substrate according to claim 30 or 31, wherein the brittle material substrate is a bonded brittle material substrate formed by bonding together a first substrate and a second substrate.

42. The severing apparatus for a brittle material substrate according to claim 41,
wherein the scribe line is formed with a scribe head comprising a cutter wheel with grooves formed in a blade-edge ridge thereof and a tip holder that rotatably supports the cutter wheel, and
wherein the apparatus further comprises a second scribing device that presses and rolls the cutter wheel on a protective material by moving the tip holder in a horizontal direction, in a state in which the protective material is provided on a surface of at least one of the first substrate and the second substrate, at the same time of inscribing the scribing line on the first substrate with the first scribing device and before forming the vertical crack extending from the scribe line in a thickness direction of the brittle material substrate, thereby inscribing a scribe line on the second substrate, while simultaneously forming a vertical crack extending from the scribe line in a thickness direction of the brittle material substrate.

43. The severing apparatus for a brittle material substrate according to claim 42, further comprising a first breaking device that breaks the second substrate.

44. The severing apparatus for a brittle material substrate according to claim 42, further comprising a second breaking device that breaks the first substrate.

45. The severing apparatus for a brittle material substrate according to claim 44, further comprising a second film processing device that applies a second protective film on the second substrate.

46. The severing apparatus for a brittle material substrate according to claim 44, further comprising a third film processing device that applies a third protective film on the first substrate.

47. The severing apparatus for a brittle material substrate according to claim 42, further comprising: a first film processing device that applies a first protective film on the second substrate; and a second film processing device that peels off the first protective film from the second substrate.

48. The severing apparatus for a brittle material substrate according to claim 30 or 31, wherein the brittle material substrate is a brittle material substrate provided with a functional layer.

49. The severing apparatus for a brittle material substrate according to claim 48, further comprising a breaking device that breaks the brittle material substrate provided with the functional layer.

50. The severing apparatus for a brittle material substrate according to claim 49, further comprising a protective material cutting device that cuts the protective material.

51. The severing apparatus for a brittle material substrate according to claim 48, further comprising: a first film processing device that applies a first protective film on a surface of the brittle material substrate provided with the functional layer that is different from a surface on which the functional layer is provided; and a protective material cutting device that cuts the protective material and/or the first protective film.

52. The severing apparatus for a brittle material substrate according to claim 51, further comprising a breaking device that breaks the brittle material substrate provided with the functional layer.

53. The severing apparatus for a brittle material substrate according to claim 52, further comprising: a second film processing device that applies a second protective film on that surface of the brittle material substrate provided with the functional layer on which the functional layer is provided; and a third film processing device that peels off the second protective film.

54. The severing apparatus for a brittle material substrate according to claim 48, wherein the functional layer is a protective material also having a function to protect the brittle material substrate.

55. The severing apparatus for a brittle material substrate according to claim 30, wherein the protective material provided on the surface of brittle material substrate is a film.

56. The severing apparatus for a brittle material substrate according to claim 30,
wherein the cutter wheel with grooves formed in the ridge thereof has protrusions, and the protrusions are brought into contact with the brittle material substrate while applying intermittent shocks to the brittle material substrate, at the time of inscribing the scribe line on the brittle material substrate by pressing and rolling on the protective material, thereby facilitating inscribing of the scribe line.

57. The severing apparatus for a brittle material substrate according to claim 30,
wherein the first scribing device presses and rolls manually the cutter wheel on the protective material.

* * * * *